(12) United States Patent
Meyers et al.

(10) Patent No.: US 7,814,093 B2
(45) Date of Patent: Oct. 12, 2010

(54) METHOD AND SYSTEM FOR BUILDING A REPORT FOR EXECUTION AGAINST A DATA STORE

(75) Inventors: Aaron Stephen Meyers, Provo, UT (US); Robert Alan Meyers, Orem, UT (US); Eric Stephen Meyers, Provo, UT (US)

(73) Assignee: Microsoft Corporation, Redmond, WA (US)

( * ) Notice: Subject to any disclaimer, the term of this patent is extended or adjusted under 35 U.S.C. 154(b) by 2208 days.

(21) Appl. No.: 10/627,180

(22) Filed: Jul. 25, 2003

(65) Prior Publication Data

US 2005/0039033 A1 Feb. 17, 2005

(51) Int. Cl.
*G06F 7/00* (2006.01)

(52) U.S. Cl. .................. 707/714; 707/802; 707/803; 707/804

(58) Field of Classification Search .................. 713/168, 713/185, 189
See application file for complete search history.

(56) References Cited

U.S. PATENT DOCUMENTS

| | | | |
|---|---|---|---|
| 5,603,025 A | 2/1997 | Tabb et al. |
| 5,787,416 A | 7/1998 | Tabb et al. |
| 5,926,463 A | 7/1999 | Ahearn et al. |
| 6,016,394 A | 1/2000 | Walker |
| 6,189,004 B1 | 2/2001 | Rassen et al. |
| 6,526,399 B1 | 2/2003 | Coulson |
| 6,578,027 B2 | 6/2003 | Cambot |
| 6,609,123 B1 | 8/2003 | Cazemier et al. |
| 6,633,885 B1 | 10/2003 | Agrawal et al. |
| 6,636,853 B1 | 10/2003 | Stephens, Jr. |
| 6,658,407 B1 | 12/2003 | Bailey |
| 6,963,826 B2 | 11/2005 | Hanaman et al. |
| 7,051,038 B1 | 5/2006 | Yeh et al. |
| 7,062,502 B1 | 6/2006 | Kesler |
| 7,146,376 B2 | 12/2006 | Dettinger et al. |
| 7,178,129 B2 | 2/2007 | Katz |
| 7,386,549 B2 | 6/2008 | Bickford et al. |
| 2001/0034733 A1 | 10/2001 | Prompt et al. |
| 2003/0110129 A1 | 6/2003 | Frazier et al. |
| 2003/0149659 A1 | 8/2003 | Danaher et al. |
| 2003/0187864 A1 | 10/2003 | McGoveran |
| 2004/0075683 A1 | 4/2004 | Savage |
| 2005/0080801 A1 | 4/2005 | Kothandaraman et al. |

OTHER PUBLICATIONS http://msdn.microsoft.com/library/?url=/library/en-us/tsqlref/ts_tsqlcon_6lyk.asp?frame=true.

Rowe, et al. "Data Abstraction, Views and Updates in RIGEL," ACM 1979, pp. 71-81. http://portal.acm.org/citation.cfm?id=582107. Last accessed Apr. 6, 2010, 11 pages.

(Continued)

*Primary Examiner*—Hung Q Pham
(74) *Attorney, Agent, or Firm*—Turocy & Watson, LLP

(57) ABSTRACT

A data query and reporting method and system are provided. The method and system allow non-technical computer users to build and execute complex database queries. The method and system accommodate the need for a simple, easy-to-understand interactive and iterative means for generating and validating database queries. The method and system reduce the complexity and costs associated with retrieving useful information for organizations of all sizes, especially smaller businesses. The method and system support a robust security model, enabling organizations to protect sensitive data while providing broad data access.

22 Claims, 55 Drawing Sheets

OTHER PUBLICATIONS

A.H.F. Laender, et al. "An Interactive Database End User Facility for the Definition and Manipulation of Forms," Annual ACM Conference on Research and Development in Information Retrieval, Proceedings of the 7th Annual International ACM SIGIR, 1984, pp. 41-54. http://portal.acm.org/citation.cfm?id=636808. Last accessed Apr. 6, 2010, 14 pages.

Microsoft Corp. "Getting Results with Microsoft Office 97," Microsoft Corp. 1997, pp. 169-178, 448-457, 563-573. Published online at [http://www.compu-rx.com/office/cont1.htm], retrieved Apr. 7, 2010.

Office Action dated May 31, 2006 for U.S. Appl. No. 10/765,232, 18 page.

Office Action dated Oct. 18, 2007 for U.S. Appl. No. 10/765,232, 39 pages.

Customer View

| Metadata Name | Metadata Type | Source(s) | Source Name(s) | Source Type(s) |
|---|---|---|---|---|
| Company Name | Field | Customers | CompanyName | Field |
| Contact Name | Field | Customers | ContactName | Field |
| Contact Title | Field | Customers | ContactTitle | Field |
| Address | Field | Customers | Address | Field |
| City | Field | Customers | City | Field |
| Region | Field | Customers | Region | Field |
| Postal Code | Field | Customers | PostalCode | Field |
| Country | Relation | Customers/Country | CountryID | Field/Key |
| Phone | Field | Customers | Phone | Field |
| Fax | Field | Customers | Fax | Field |
| Frequent Shopper | Field | Customers | FrequentShopper | Field |
| Customers | Aggregation Field | Customer View | Customers | Aggregation Field |
| Orders | Relation | Customers/Orders | CustomerID | Field/Key Field |

Employee View

| Metadata Name | Metadata Type | Source(s) | Source Name(s) | Source Type(s) |
|---|---|---|---|---|
| Full Name | Field | Employees | FullName | Field |
| First Name | Field | Employees | FirstName | Field |
| Last Name | Field | Employees | LastName | Field |
| Title of Courtesy | Field | Employees | TitleOfCourtesy | Field |
| Title | Field | Employees | City | Field |
| Hire Date | Field | Employees | HireDate | Field |
| Birth Date | Field | Employees | BirthDate | Field |
| Address | Relation | Employees | Address | Field |
| City | Field | Employees | City | Field |
| Region | Field | Employees | Region | Field |
| Postal Code | Field | Employees | PostalCode | Field |
| Country | Relation | Employees/Country | CountryID | Field/Key Field |
| Home Phone | Field | Employees | HomePhone | Field |
| Extension | Field | Employees | Extension | Field |
| Insurance | Field | Employees | Insurance | Field |
| Part Time | Field | Employees | PartTime | Field |
| Employees | Aggregation Field | Employee View | Employees | Aggregation Field |
| Employee Territories | Relation | Employees/EmployeeTerritories | EmployeeID | Key Field/Key Field |
| Orders | Relation | Employees/Orders | EmployeeID | Key Field/Field |
| Reports To | Relation | Employees/Employees | ReportsTo | Field/Key Field |
| Subordinates | Relation | Employee View | EmployeeID | Field |

Employee Territories View

| Metadata Name | Metadata Type | Source(s) | Source Name(s) | Source Type(s) |
|---|---|---|---|---|
| Employee Territories | Aggregation Field | EmployeeTerritories | Employee Territories | Aggregation Field |
| Employee | Relation | EmployeeTerritories/Employees | EmployeeID | Key Field/Key Field |
| Territory | Relation | EmployeeTerritories/Territories | TerritoryID | Key Field/Key Field |

Fig. 3A (47)

| Orders View | | | | |
|---|---|---|---|---|
| Metadata Name | Metadata Type | Source(s) | Source Name(s) | Source Type(s) |
| Order Date | Field | Orders | OrderDate | Field |
| Required Date | Field | Orders | RequiredDate | Field |
| Shipped Date | Field | Orders | ShippedDate | Field |
| Ship Name | Field | Orders | ShipName | Field |
| Ship Address | Field | Orders | ShipAddress | Field |
| Ship City | Field | Orders | ShipCity | Field |
| Ship Region | Field | Orders | ShipRegion | Field |
| Ship Postal Code | Field | Orders | ShipPostalCode | Field |
| Ship Country | Relation | Orders/Country | ShipCountryID/ CountryID | Field/Key Field |
| Shipper | Relation | Orders/Shippers | ShipVia/ShipperID | Field/Key Field |
| Freight | Field | Orders | Freight | Field |
| Order Total | Expression | Order View | Order Details\Sum Item Amount + Freight | |
| Orders | Aggregation Field | Order View | Orders | Aggregation Field |
| Sum Freight | Aggregation Field | Orders | Freight | Aggregation Field |
| Sum Order Total | Aggregation Field | Orders/Order Details/Products | OrderID/OrderID /ProductID/UnitPrice | Aggregation Field |
| Avg Freight | Aggregation Field | Orders | Freight | Aggregation Field |
| Avg Order Total | Aggregation Field | Order View | Order Total | Aggregation Field |
| Avg #Items per Order | Aggregation Field | Orders/Order Detail | OrderDetailID | Aggregation Field |
| First Order Date | Aggregation Field | Orders | OrderDate | Aggregation Field |
| Last Order Date | Aggregation Field | Orders | OrderDate | Aggregation Field |
| First Required Dated | Aggregation Field | Orders | RequiredDate | Aggregation Field |
| Last Required Date | Aggregation Field | Orders | RequiredDate | Aggregation Field |
| First Shipped Date | Aggregation Field | Orders | ShippedDate | Aggregation Field |
| Last Shipped Date | Aggregation Field | Orders | ShippedDate | Aggregation Field |
| Customer | Relation | Orders/Customers | CustomerID | Field/Key Field |
| Employee | Relation | Orders/Employees | EmployeeID | Field/Key Field |
| Order Details | Relation | Orders/Order Details | OrderID | Key Field/Key Field |

(48) — Customer row
(52) — Order Details row (51)

| Order Detail View | | | | |
|---|---|---|---|---|
| Metadata Name | Metadata Type | Source(s) | Source Name(s) | Source Type(s) |
| Unit Price | Field | Order Details | UnitPrice | Field |
| Quantity | Field | Order Details | Quantity | Field |
| Discount | Field | Order Details | Discount | Field |
| Item Amount | Expression | Order Detail View | Unit Price * Quantity * (1 – Discount) | |
| Order Details | Aggregate Field | Order Details | OrderDetailID | Aggregation Field |
| Sum Item Amount | Aggregate Field | Order Detail View | Item Amount | Aggregation Field |
| Avg Item Amount | Aggregation Field | Order Details/ Order Detail View | OrderDetailID/ Item Amount | Aggregation Field |
| Avg Quantity | Aggregation Field | Order Details/ Order Detail View | Quantity/Order Details | Aggregation Field |
| Avg Discount | Aggregation Field | Order Details/ Order Detail View | Discount/Order Details | Aggregation Field |
| Order | Relation | Order Details/Orders | OrderID | Key Field/Key Field |
| Product | Relation | Order Details/ Products | ProductID | Key Field/Key Field |

Fig. 3B

| Product View (55) | | | | |
|---|---|---|---|---|
| Metadata Name | Metadata Type | Source(s) | Source Name(s) | Source Type(s) |
| Product Name | Field | Products | ProductName | Field |
| Unit Price | Field | Products | UnitPrice | Field |
| Units In Stock | Field | Products | UnitsInStock | Field |
| Units On Order | Field | Products | UnitsOnOrder | Field |
| Quantity Per Order | Field | Products | QuantityPerOrder | Field |
| Reorder Level | Field | Products | ReorderLevel | Field |
| Discontinued | Field | Products | Discontinued | Field |
| Products | Aggregation Field | Products | ProductID | Aggregation Field |
| Sum Unit Price | Aggregation Field | Products | UnitPrice | Aggregation Field |
| Avg Unit Price | Aggregation Field | Products/Product View | UnitPrice/Products | Aggregation Field |
| Avg Units In Stock | Aggregation Field | Products/Product View | UnitsInStock/Products | Aggregation Field |
| Avg Units On Order | Aggregation Field | Products/Product View | UnitsOnOrder/Products | Aggregation Field |
| Category | Relation | Products/Categories | CategoryID | Field/Key Field |
| Supplier | Relation | Products/Suppliers | SupplierID | Field/Key Field |
| Order Details | Relation | Products/Order Details | ProductID | Key Field/Key Field |

| Supplier View (56) | | | | |
|---|---|---|---|---|
| Metadata Name | Metadata Type | Source(s) | Source Name(s) | Source Type(s) |
| Company Name | Field | Suppliers | CompanyName | Field |
| Contact Name | Field | Suppliers | ContactName | Field |
| Contact Title | Field | Suppliers | ContactTitle | Field |
| Address | Field | Suppliers | Address | Field |
| City | Field | Suppliers | City | Field |
| Region | Field | Suppliers | Region | Field |
| Postal Code | Field | Suppliers | PostalCode | Field |
| Phone | Field | Suppliers | Phone | Field |
| Fax | Field | Suppliers | Fax | Field |
| Suppliers | Aggregation Field | Suppliers | SupplierID | Aggregation Field |
| Country | Relation | Suppliers/Country | CountryID | Field/Key Field |
| Products | Relation | Suppliers/Products | SupplierID | Key Field/Field |

Fig. 3C

| Table 50 – Database Object Properties | | |
|---|---|---|
| No. | Name | Contents and Purpose |
| D01 | dbUtilityTypeName | "string" containing the name of the object type used to access the referenced database |
| D02 | connectionString | "string" containing location, access method and security associated with the referenced database |

| Table 51 – View Object Properties | | |
|---|---|---|
| No. | Name | Contents and Purpose |
| V01 | databaseID | Contains the name or token of the associated database |
| V02 | sourceTable | Contains the name of the table in the associated database |
| V03 | requireFilterForDetails | "true" or "false" – Determines if a query using the view requires a filter before processing a query. Usually set to "false" if the number of records in the associated database are voluminous |
| V04 | primaryKey keyColumn | Identifies a primary key column of the associated table |
| V05 | primaryKey dataType | Identifies the data type of a primary key column |
| | defaultFields | Identifies the field(s) used by the system as the default field(s) when a view associated with a relation is included in a report without following the relation |
| V06 | defaultAggregateFields | Identifies the field(s) used by the system as the default field(s) when a view associated with a relation is included in a report without following the relation, and the relation path includes at least one to-many relationship |

| Table 52 – Field Object Properties | | |
|---|---|---|
| No. | Name | Contents and Purpose |
| F01 | databaseID | Name or token of associated database |
| F02 | viewID | Name or token of associated view |
| F03 | sourceColumn | Name of column in associated view |
| F04 | dataType | "text", "numeric", "dateTime" or "boolean" – Type of data of records returned based upon field. |
| F05 | allowAsGroupField | "true" or "false" – Identifies whether field may be used for grouping |
| F06 | allowDrill | "true" or "false" – Identifies whether field may be used to create a drill report |
| F07 | field type | "aggregate" – Used for aggregation or summary fields. "expression" – Used for calculated expression fields |
| F08 | field function | Function name – Used to identify the aggregate function to be applied to field values |
| F09 | description | Custom description of field |

| Table 53 – Relation Object Properties | | |
|---|---|---|
| No. | Name | Contents and Purpose |
| R01 | databaseID | Name or token of associated database |
| R02 | viewID | Name or token of associated view |
| R03 | toViewID | Metadata view object to be used to display the fields and relations for a followed relation |
| R04 | reverseID | Metadata relation object representing the reverse direction of this relation |
| R05 | relationType | "OneToMany," "OneToOne" or "ManyToOne" – Defines the cardinality of the relation from the perspective of the "from" view |
| R06 | joinType | "LeftOuterJoin" or "InnerJoin" – Default value is LeftOuterJoin. InnerJoin is generally set for ManyToOne relationships, while LeftOuterJoin is set for OnetToMany relationships. |
| R07 | joinKey sourceColumn | Join key column of the database table associated with the transferring view |
| R08 | joinKey destColumn | Join key column of the database table associated with the transferred to view |
| R09 | joinKey dataType | "text," "numeric," "dateTime," "boolean" – Data type of the join key column |

Fig. 3D

Database Object (60)

```xml
<?xml version="1.0" encoding="utf-8" ?>
<object xmlns:xsi="http://www.w3.org/2001/XMLSchema-instance"
        xsi:type="database"
(61)    dbUtilityTypeName="ActiveViews.Server.SQLProviders
                .SqlServerProvider.SqlServerDbUtility, ServerLibrary"
(62)    connectionString="Initial Catalog=AVnwcomplete;
                Data Source=(local);Integrated Security=true">
    <dbUtilityProperties q:commandTimeout="180"
        xmlns:q="http://activeviews.net/SQLProviders/DbUtility/Generic" />
</object>
```

Customer View Object (63)

```xml
<?xml version="1.0" encoding="utf-8" ?>
<object xmlns:xsi="http://www.w3.org/2001/XMLSchema-instance"
(64)    xsi:type="view"
        databaseID="1218"
(65)    sourceTable="Customers"
        requireFilterForDetails="false">
(66)    <primaryKey keyColumn="CustomerID" dataType="Text" />
        <defaultFields>
(67)(68)    <field ref="northwind\Customer\Company Name" />
        </defaultFields>
(69)    <defaultAggregateFields>
            <!-- Customer\Customers (count) -->
(70)(71)    <field ref="1228" type="aggregate" />
        </defaultAggregateFields>
</object>
```

Address Source Field Object (72)

```xml
<?xml version="1.0" encoding="utf-8" ?>
(73) <object xmlns:xsi="http://www.w3.org/2001/XMLSchema-instance"
        xsi:type="savedSourceField"
(74)    databaseID="1218" viewID="northwind\Customer"
        sourceColumn="Address" dataType="Text">
(75)    <field allowAsGroupField="false" />
</object>
```

Orders Relation Object (76)

```xml
<?xml version="1.0" encoding="utf-8" ?>
(77) <object xmlns:xsi="http://www.w3.org/2001/XMLSchema-instance"   (78)
        xsi:type="relation" databaseID="1218"
(79)    viewID="northwind\Customer" toViewID="northwind\Order"
(80)    reverseID="northwind\Order\Customer" relationType="OneToMany">
        <join joinType="LeftOuterJoin">
(82)        <joinKey sourceColumn="CustomerID" destColumn="CustomerID" dataType="Text" />
        </join>                                                     (81)
</object>
```

Customer Relation Object (83)

```xml
<?xml version="1.0" encoding="utf-8" ?>
<object xmlns:xsi="http://www.w3.org/2001/XMLSchema-instance"
(84)    xsi:type="relation" databaseID="1218"
        viewID="northwind\Order"                         (86)
(85)    toViewID="northwind\Customer"
        reverseID="northwind\Customer\Orders" relationType="ManyToOne">
        <join joinType="InnerJoin">
(87)        <joinKey sourceColumn="CustomerID" destColumn="CustomerID" dataType="Text" />
        </join>
</object>    (88)
```

Fig. 3E

XML Report Definition Table (324)

```xml
<?xml version="1.0" encoding="utf-8" ?>
<reportDefinition baseViewID="Order" name="Report1" type="detail">
  <detailFields>
    <field id="3" ref="Order Date" />
    <field id="4" ref="Country">
      <relationPath relationID="Ship Country" />
    </field>
  </detailFields>
  <groupFields axis="1">
    <field id="2" type="rowRef">
      <relationPath relationID="Customer" />
      <detailFields>
        <field id="1" ref="Company Name" />
      </detailFields>
    </field>
  </groupFields>
  <measureFields>
    <field id="5" type="aggregate" ref="Orders" totalsOnly="true">
      <relationPath />
    </field>
  </measureFields>
  <filter type="primary">
    <field ref="Order Date">
      <filterValue operator="between">1/1/1996;12/31/1996</filterValue>
    </field>
    <field type="rowRef" showDeepSubfilterOption="true">
      <relationPath relationID="Ship Country" />
      <filterValue operator="in">
        <item key0="Spain" />
        <item key0="Sweden" />
        <item key0="Switzerland" />
        <item key0="UK" />
        <item key0="USA" />
      </filterValue>
    </field>
  </filter>
  <reportOptions>
    <displayTotals hierarchyRows="true" />
  </reportOptions>
</reportDefinition>
```

Fig. 12C

```
XML Report Definition Table
<?xml version="1.0" encoding="utf-8" ?>
<reportDefinition baseViewID="Order" name="Report2" type="detail">
    <detailFields>
        <field id="1" ref="Order Date" />
        <field id="2" type="expression" ref="Order Total" dataType="numeric" />
    </detailFields>
    <groupFields axis="1">
        <field id="4" type="rowRef">
            <relationPath relationID="Ship Country" />
            <detailFields>
                <field id="3" ref="Country" />
            </detailFields>
        </field>
    </groupFields>
    <filter type="primary">
        <filterGroup operator="and">
            <field ref="Order Date">
                <filterValue operator="greaterThan">1/1/1997</filterValue>
            </field>
            <field type="rowRef" showDeepSubfilterOption="true">
                <relationPath relationID="Shipper" />
                <filterValue operator="equals">
                    <item key0="Federal Shipping" />
                </filterValue>
            </field>
        </filterGroup>
        <filterGroup operator="or" not="true">
            <field type="rowRef" showDeepSubfilterOption="true">
                <relationPath relationID="Ship Country" />
                <filterValue operator="equals">
                    <item key0="USA" />
                </filterValue>
            </field>
        </filterGroup>
    </filter>
</reportDefinition>
```
— 398

```
SQL Query Table
SELECT q0.f4_k0 AS f4_k0,
    GROUPING(q0.f4_k0) AS f4_g,
    bv.OrderID AS fpk_k0,
    GROUPING(bv.OrderID) AS fpk_g,
    CASE WHEN GROUPING(q0.f4_k0)=0 THEN MIN(q0.f3) ELSE NULL END AS f3,
    CASE WHEN GROUPING(bv.OrderID)=0 THEN MIN(bv.OrderDate) ELSE NULL END AS f1,
    CASE WHEN GROUPING(bv.OrderID)=0 THEN MIN((q1.auto8) + (bv.Freight))) ELSE NULL
END AS f2
FROM Orders bv INNER JOIN
    /* Ship Country */
    (SELECT bv.CountryName AS f3,
        bv.CountryID AS f4_k0,
        bv.CountryID AS jk0
    FROM Country bv
    ) q0 ON bv.ShipCountryID = q0.jk0

LEFT OUTER JOIN
    /* Order Details */
    (SELECT SUM(((bv.UnitPrice) * (bv.Quantity) * (1-(bv.Discount)))) AS auto8,
        bv.OrderID AS jk0
    FROM [Order Details] bv
    GROUP BY bv.OrderID
    ) q1 ON bv.OrderID = q1.jk0

WHERE ((bv.OrderDate >'1997-01-01T00:00:00' AND (bv.ShipVia =3)) AND (NOT
((bv.ShipCountryID =24))))
GROUP BY q0.f4_k0, bv.OrderID WITH ROLLUP
HAVING NOT(GROUPING(q0.f4_k0)=1 AND GROUPING(bv.OrderID)=1)
ORDER BY f4_g, f4_k0, fpk_g,-fpk_x0
```

Fig. 13I

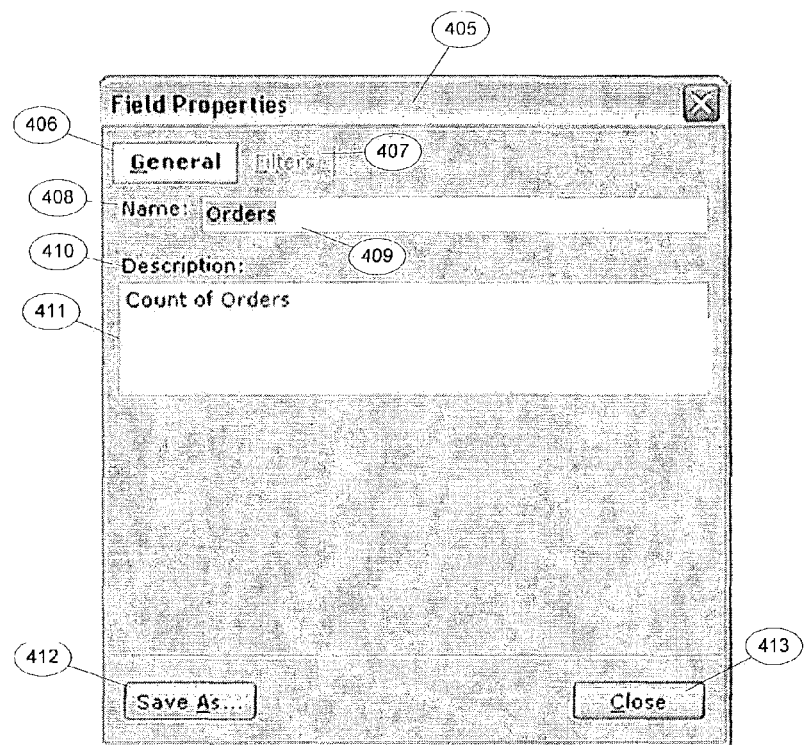
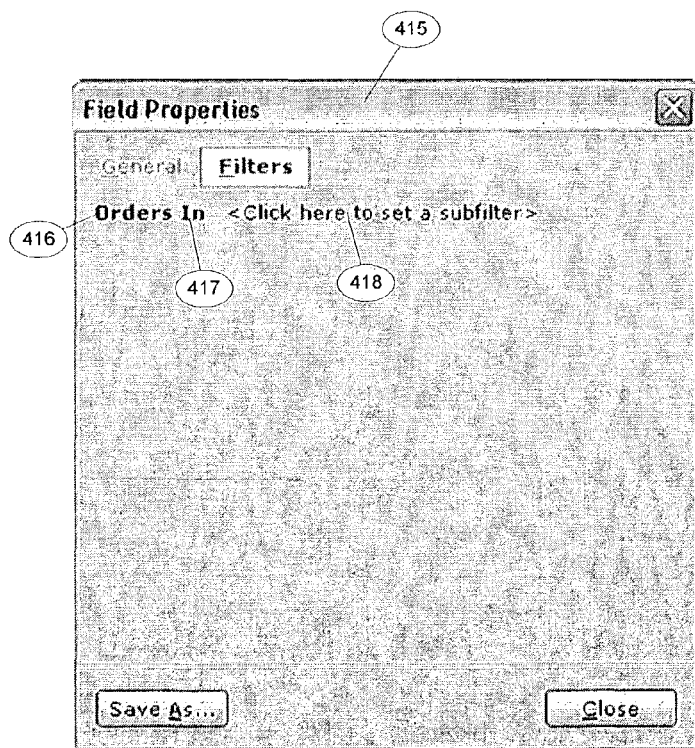
Fig. 14B

| Country | Company Name | Orders | Orders Shipped by United Package in 1997 |
|---|---|---|---|
| Argentina | Cactus Comidas para llevar | 6 | 1 |
| | Océano Atlántico Ltda. | 5 | 0 |
| | Rancho grande | 5 | 2 |
| Austria | Ernst Handel | 30 | 5 |
| | Piccolo und mehr | 10 | 3 |
| Belgium | Maison Dewey | 7 | 1 |
| | Suprêmes délices | 12 | 0 |
| Brazil | Comércio Mineiro | 5 | 1 |
| | Familia Arquibaldo | 7 | 1 |
| | Gourmet Lanchonetes | 9 | 3 |
| | Hanari Carnes | 14 | 1 |
| | Que Delicia | 9 | 2 |
| | Queen Cozinha | 13 | 3 |
| | Ricardo Adocicados | 11 | 4 |
| | Tradição Hipermercados | 6 | 1 |
| | Wellington Importadora | 9 | 1 |
| Canada | Bottom-Dollar Markets | 14 | 1 |

Customer Count: 91

Report execution complete.   00:00:00   91 rows

Fig. 14E

```
XML Report Definition Table
<?xml version="1.0" encoding="utf-8" ?>
<reportDefinition baseViewID="Customer" name="Report3" type="detail">
  <detailFields>
    <field id="3" ref="Company Name" />
    <field id="4" type="aggregate" ref="Orders">
      <relationPath relationID="Orders" />
    </field>
    <field id="5" name="Orders Shipped by United Package in 1997" type="aggregate"
allowAsGroupField="true" defaultSortDesc="true" alignment="right" function="count">
      <relationPath relationID="Orders" filter="1" />
    </field>
  </detailFields>
  <groupFields axis="1">
    <field id="2" type="rowRef">
      <relationPath relationID="Country" />
      <detailFields>
        <field id="1" ref="Country" />
      </detailFields>
    </field>
  </groupFields>
  <filter id="1" baseViewID="Order">
    <filterGroup operator="and">
      <field ref="Order Date">
        <filterValue operator="between">1/1/1997;12/31/1997</filterValue>
      </field>
      <field type="rowRef" showDeepSubfilterOption="true">
        <relationPath relationID="Shipper" />
        <filterValue operator="equals">
          <item key0="2" />
        </filterValue>
      </field>
    </filterGroup>
  </filter>
</reportDefinition>
```

Fig. 14F

```
SQL Query Table
SELECT q0.f2_k0 AS f2_k0,
       GROUPING(q0.f2_k0) AS f2_g,
       bv.CustomerID AS fpk_k0,
       GROUPING(bv.CustomerID) AS fpk_g,
       CASE WHEN GROUPING(q0.f2_k0)=0 THEN MIN(q0.f1) ELSE NULL END AS f1,
       CASE WHEN GROUPING(bv.CustomerID)=0 THEN MIN(bv.CompanyName) ELSE NULL END AS f3,
       CASE WHEN GROUPING(bv.CustomerID)=0 THEN MIN(q1.f4) ELSE NULL END AS f4,
       CASE WHEN GROUPING(bv.CustomerID)=0 THEN MIN(q2.f5) ELSE NULL END AS f5
FROM Customers bv INNER JOIN
    /* Country */
    (SELECT bv.CountryName AS f1,
            bv.CountryID AS f2_k0,
            bv.CountryID AS jk0
    FROM Country bv
    ) q0 ON bv.CountryID = q0.jk0

LEFT OUTER JOIN
    /* Orders */
    (SELECT COUNT(1) AS f4,
            bv.CustomerID AS jk0
    FROM Orders bv
    GROUP BY bv.CustomerID
    ) q1 ON bv.CustomerID = q1.jk0

LEFT OUTER JOIN
    /* Orders<filter:1> */
    (SELECT COUNT(1) AS f5,
            bv.CustomerID AS jk0
    FROM Orders bv
    WHERE ((bv.OrderDate BETWEEN '1997-01-01T00:00:00' AND '1997-12-31T00:00:00' AND
(bv.ShipVia =2)))
    GROUP BY bv.CustomerID
    ) q2 ON bv.CustomerID = q2.jk0

GROUP BY q0.f2_k0, bv.CustomerID WITH ROLLUP
HAVING NOT(GROUPING(q0.f2_k0)=1 AND GROUPING(bv.CustomerID)=1)
ORDER BY f2_g, f2_k0, fpk_g, fpk_k0
```

Fig. 14G (480)

Report1 - Employee Report

File  Edit  View  Debug  Window  Help

Fields | Filters | Sort | Options | View Report

Employee Count: 9  (482)   (483)
(481)

| Country | Full Name | Orders |
|---------|-----------|--------|
| UK | Buchanan, Steven | 42 | (484)
|  | Suyama, Michael | 67 |
|  | King, Robert | 72 |
|  | Dodsworth, Anne | 43 |
|  | Subtotal (UK) | 224 |
|  |  |  |
| USA | Davolio, Nancy | 123 |
|  | Fuller, Andrew | 96 |
|  | Leverling, Janet | 127 |
|  | Peacock, Margaret | 156 |
|  | Callahan, Laura | 104 |
|  | Subtotal (USA) | 606 |
|  |  |  |
| Total |  | 830 |

Report1

Report execution complete.          00:00:00    9 rows

Fig. 15C

| Report1 - Employee Report | | | | | | |
|---|---|---|---|---|---|---|
| File Edit View Debug Window Help | | | | | | |

Fields | Filters | Sort | Options | View Report

Filter On: Employee In Buchanan, Steven

Order Count: 42

| Company Name | Order Date | Shipped Date | Freight | Order Details | Ship Address |
|---|---|---|---|---|---|
| Berglunds snabbköp | 9/2/1997 | 9/11/1997 | $55.26 | 3 | Berguvsvägen 8 |
| Berglunds snabbköp | 2/3/1998 | 2/12/1998 | $109.11 | 3 | Berguvsvägen 8 |
| Blondesddsl père et fils | 9/4/1996 | 9/10/1996 | $5.74 | 2 | 24, place Kléber |
| Bon app' | 11/5/1997 | 11/14/1997 | $20.12 | 3 | 12, rue des Bouchers |
| Chop-suey Chinese | 7/11/1996 | 7/23/1996 | $22.98 | 3 | Hauptstr. 31 |
| Familia Arquibaldo | 8/29/1997 | 9/3/1997 | $176.81 | 3 | Rua Orós, 92 |
| Folk och fä HB | 12/10/1996 | 12/19/1996 | $5.44 | 1 | Åkergatan 24 |
| Frankenversand | 9/19/1997 | 9/23/1997 | $31.85 | 3 | Berliner Platz 43 |
| Godos Cocina Típica | 2/5/1998 | 2/9/1998 | $175.32 | 4 | C/ Romero, 33 |
| Godos Cocina Típica | 2/6/1998 | 2/11/1998 | $19.58 | 1 | C/ Romero, 33 |
| Hanari Carnes | 3/3/1998 | 3/5/1998 | $62.74 | 2 | Rua do Paço, 67 |
| La maison d'Asie | 11/20/1996 | 11/27/1996 | $19.64 | 3 | 1 rue Alsace-Lorraine |
| LILA-Supermercado | 1/9/1998 | 1/13/1998 | $163.97 | 4 | Carrera 52 con Ave. Bolívar #65-98 Llano l |
| LILA-Supermercado | 2/20/1998 | 2/26/1998 | $1.21 | 1 | Carrera 52 con Ave. Bolívar #65-98 Llano l |

Report1 | Order

Report execution complete. | 00:00:00 | 42 rows

Fig. 15D

```
XML Report Definition Table
<?xml version="1.0" encoding="utf-8" ?>
<reportDefinition baseViewID="Order" name="Order" type="detail">
  <detailFields>
    <field id="1" ref="Company Name">
      <relationPath relationID="Country" />
    </field>
    <field id="2" ref="Order Date" />
    <field id="10" ref="Shipped Date" />
    <field id="11" ref="Freight" />
    <field id="12" type="aggregate" ref="Order Details">
      <relationPath relationID="Order Details" />
    </field>
    <field id="3" ref="Ship Address" />
    <field id="4" ref="Ship City" />
    <field id="7" ref="Ship Region" />
    <field id="8" ref="Ship Postal Code" />
    <field id="5" ref="Country">
      <relationPath relationID="Ship Country" />
    </field>
  </detailFields>
  <measureFields>
    <field id="13" type="aggregate" ref="Orders" totalsOnly="true">
      <relationPath />
    </field>
    <field id="14" type="aggregate" ref="Avg Freight" totalsOnly="true">
      <relationPath />
    </field>
    <field id="15" type="aggregate" ref="Sum Freight" totalsOnly="true">
      <relationPath />
    </field>
  </measureFields>
  <sortFields>
    <field fieldID="1" sortDesc="false" />
  </sortFields>
  <filter type="primary">
    <field type="deepSubfilter" filter="1">
      <relationPath relationID="Employee" />
    </field>
  </filter>
  <filter id="1" baseViewID="Employee">
    <field type="rowRef">
      <filterValue operator="in">
        <item key0="5" />
      </filterValue>
    </field>
  </filter>
  <reportOptions>
    <displayTotals />
  </reportOptions>
</reportDefinition>
```

Fig. 15G

```
SQL Query Table
SELECT q0.f4_k0 AS f4_k0,
       GROUPING(q0.f4_k0) AS f4_g,
       bv.OrderID AS fpk_k0,
       GROUPING(bv.OrderID) AS fpk_g,
       CASE WHEN GROUPING(q0.f4_k0)=0 THEN MIN(q0.f3) ELSE NULL END AS f3,
       CASE WHEN GROUPING(bv.OrderID)=0 THEN MIN(bv.OrderDate) ELSE NULL END AS f1,
       CASE WHEN GROUPING(bv.OrderID)=0 THEN MIN(((q1.auto8) + (bv.Freight))) ELSE NULL
END AS f2
FROM Orders bv
     INNER JOIN
     /* Ship Country */
     (SELECT bv.CountryName AS f3,
             bv.CountryID AS f4_k0,
             bv.CountryID AS jk0
      FROM Country bv
     ) q0 ON bv.ShipCountryID = q0.jk0
     LEFT OUTER JOIN
     /* Order Details */
     (SELECT SUM(((bv.UnitPrice) * (bv.Quantity) * (1-(bv.Discount)))) AS auto8,
             bv.OrderID AS jk0
      FROM [Order Details] bv
      GROUP BY bv.OrderID
     ) q1 ON bv.OrderID = q1.jk0
WHERE ((bv.OrderDate >'1997-01-01T00:00:00' AND (bv.ShipVia =3)) AND (NOT
((bv.ShipCountryID =24))))
GROUP BY q0.f4_k0, bv.OrderID WITH ROLLUP
HAVING NOT(GROUPING(q0.f4_k0)=1 AND GROUPING(bv.OrderID)=1)
ORDER BY f4_g, f4_k0, fpk_g, fpk_k0
```

Fig. 15H (580)

| Order Date | Company Name | Order Total | Employee | Orders | Avg Order Total |
|---|---|---|---|---|---|
| 1996.07.04 | Vins et alcools Chevalier | $472.38 | Buchanan, Steven | 42 | $1,731.21 |
| 1996.07.05 | Toms Spezialitäten | $1,875.01 | Suyama, Michael | 67 | $1,159.61 |
| 1996.07.08 | Hanari Carnes | $1,618.43 | Peacock, Margaret | 156 | $1,565.62 |
| 1996.07.08 | Victuailles en stock | $695.40 | Leverling, Janet | 127 | $1,682.66 |
| 1996.07.09 | Suprêmes délices | $3,649.20 | Peacock, Margaret | 156 | $1,565.62 |
| 1996.07.10 | Hanari Carnes | $1,502.97 | Leverling, Janet | 127 | $1,682.66 |
| 1996.07.11 | Chop-suey Chinese | $579.60 | Buchanan, Steven | 42 | $1,731.21 |
| 1996.07.12 | Richter Supermarkt | $2,638.83 | Dodsworth, Anne | 43 | $1,875.22 |
| 1996.07.15 | Wellington Importadora | $531.77 | Leverling, Janet | 127 | $1,682.66 |
| 1996.07.16 | HILARION-Abastos | $1,201.81 | Peacock, Margaret | 156 | $1,565.62 |
| 1996.07.17 | Ernst Handel | $1,755.39 | Davolio, Nancy | 123 | $1,633.69 |
| 1996.07.18 | Centro comercial Moctezuma | $104.05 | Peacock, Margaret | 156 | $1,565.62 |
| 1996.07.19 | Ottilies Käseladen | $1,559.74 | Peacock, Margaret | 156 | $1,565.62 |
| 1996.07.19 | Que Delicia | $451.05 | Peacock, Margaret | 156 | $1,565.62 |
| 1996.07.22 | Rattlesnake Canyon Grocery | $632.29 | Callahan, Laura | 104 | $1,291.83 |
| 1996.07.23 | Ernst Handel | $2,019.86 | Dodsworth, Anne | 43 | $1,875.22 |
| 1996.07.24 | Folk och fä HB | $699.30 | Suyama, Michael | 67 | $1,159.61 |
| 1996.07.25 | Blondesddsl père et fils | $1,231.28 | Fuller, Andrew | 96 | $1,825.36 |
| 1996.07.26 | Wartian Herkku | $372.29 | Leverling, Janet | 127 | $1,682.66 |
| 1996.07.29 | Frankenversand | $3,745.18 | Peacock, Margaret | 156 | $1,565.62 |
| 1996.07.30 | GROSELLA-Restaurante | $1,167.49 | Callahan, Laura | 104 | $1,291.83 |
| 1996.07.31 | White Clover Markets | $646.76 | Buchanan, Steven | 42 | $1,731.21 |
| 1996.08.01 | Wartian Herkku | $1,512.54 | Davolio, Nancy | 123 | $1,633.69 |
| 1996.08.01 | Split Rail Beer & Ale | $52.54 | Suyama, Michael | 67 | $1,159.61 |
| 1996.08.02 | Rattlesnake Canyon Grocery | $1,554.03 | Suyama, Michael | 67 | $1,159.61 |
| 1996.08.05 | QUICK-Stop | $2,113.35 | Leverling, Janet | 127 | $1,682.66 |

Fig. 16D

```
XML Report Definition Table
<?xml version="1.0" encoding="utf-8" ?>
<reportDefinition baseViewID="Order" name="Report1" type="detail">
  <detailFields>
    <field id="1" ref="Order\Order Date" />
    <field id="2" ref="Customer\Company Name">
      <relationPath relationID="Order\Customer" />
    </field>
    <field id="3" type="expression" ref="Order\Order Total" dataType="numeric" />
    <field id="4" ref="Employee\Full Name">
      <relationPath relationID="Order\Employee" />
    </field>
    <field id="5" type="aggregate" ref="Order\Orders">
      <relationPath relationID="Order\Employee" />
      <relationPath relationID="Employee\Orders" />
    </field>
    <field id="6" type="aggregate" ref="Order\Avg Order Total">
      <relationPath relationID="Order\Employee" />
      <relationPath relationID="Employee\Orders" />
    </field>
  </detailFields>
</reportDefinition>
```

Fig. 16E

```
SQL Query Table
SELECT bv.OrderID AS fpk_k0,
       0 AS fpk_g,
       bv.OrderDate AS f1,
       q1.f2 AS f2,
       ((q2.auto8) + (bv.Freight)) AS f3,
       q0.f4 AS f4,
       q0.f5 AS f5,
       q0.f6 AS f6
FROM Orders bv INNER JOIN
     /* Employee */
     (SELECT bv.FullName AS f4,
             q0.f5 AS f5,
             q0.f6_v / q0.f6_c AS f6,
             bv.EmployeeID AS jk0
      FROM Employees bv LEFT OUTER JOIN
          /* Orders */
          (SELECT COUNT(1) AS f5,
                  SUM(((q0.auto19) + (bv.Freight))) AS f6_v,
                  COUNT(((q0.auto19) + (bv.Freight))) AS f6_c,
                  bv.EmployeeID AS jk0
           FROM Orders bv LEFT OUTER JOIN
               /* Order Details */
               (SELECT SUM(((bv.UnitPrice) * (bv.Quantity) * (1-(bv.Discount))))
                       AS auto19,
                       bv.OrderID AS jk0
                FROM [Order Details] bv
                GROUP BY bv.OrderID
                ) q0 ON bv.OrderID = q0.jk0

GROUP BY bv.EmployeeID
           ) q0 ON bv.EmployeeID = q0.jk0

) q0 ON bv.EmployeeID = q0.jk0

INNER JOIN
     /* Customer */
     (SELECT bv.CompanyName AS f2,
             bv.CustomerID AS jk0
      FROM Customers bv
      ) q1 ON bv.CustomerID = q1.jk0

LEFT OUTER JOIN
     /* Order Details */
     (SELECT SUM(((bv.UnitPrice) * (bv.Quantity) * (1-(bv.Discount)))) AS auto8,
             bv.OrderID AS jk0
      FROM [Order Details] bv
      GROUP BY bv.OrderID
      ) q2 ON bv.OrderID = q2.jk0

ORDER BY fpk_g, fpk_k0
```

Fig. 16F

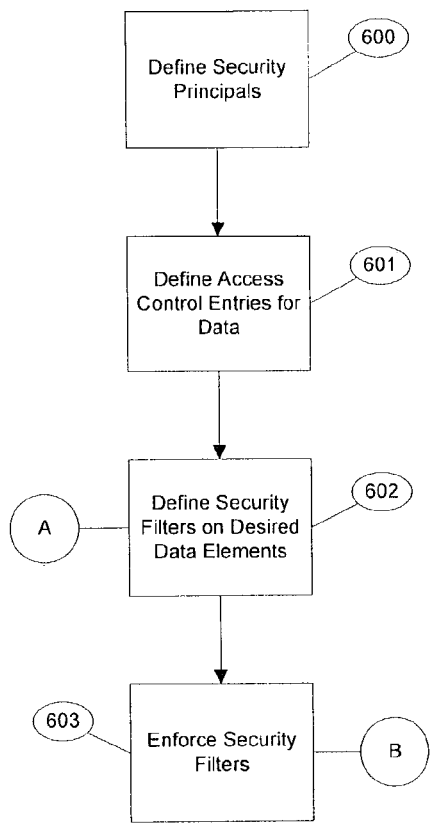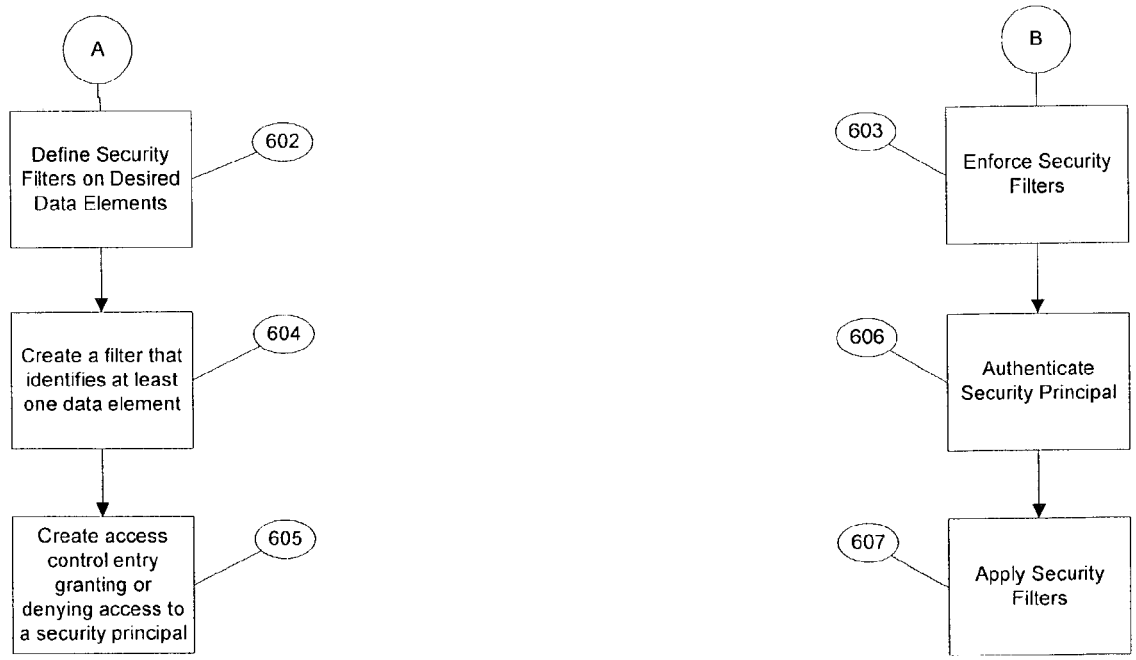
Fig. 17

METHOD AND SYSTEM FOR BUILDING A REPORT FOR EXECUTION AGAINST A DATA STORE

BACKGROUND OF THE INVENTION

The present invention relates to information processing and more particularly to query and reporting systems and methods related to information processing.

Organizations have always been large collectors of data. During the past two decades, the sharply increasing popularity and advancement of personal computers have introduced many new options and compelling opportunities for amassing great stores of data. Notwithstanding, much of the value in this captured data lies in the ability to retrieve and review it in certain ad hoc selections and presentations in order to discover information contained in the data.

Historically, institutions have generated countless reports an extracts of data to alleviate this problem. In most instances, programmers who understand the systems used to capture data develop these reports and extracts. However, developing suitable extraction and reporting tools for generating ad hoc queries against available data frequently has required too much time and human capital, significantly limiting the usefulness of the data.

Legacy systems have significantly contributed to the problem. In the 1970s, mainframe computers comprised the center of most database systems development. The 1980s brought new mini-computer platforms. The late eighties and early nineties brought the client-server architecture running on personal computer hardware and popular server platforms such as Unix, NetWare and Windows. Despite these changes in platforms, architectures, tools, and technologies, large amounts of data and large numbers of data analysis applications continue to reside in the mainframes of the 1970s. By some estimates, more than 70 percent of existing institutional data still resides on mainframes.

To cope with this problem, several significant technological advances have been made. First, the advent of more powerful personal computers and operating systems has resulted in an explosion of data storage in standardized data stores or databases and desktop tools to manipulate this data. Second, technological advances have resulted in newer enterprise-class applications to manage data and an understanding of the fundamental differences between transactional and analytical systems. These advances have given rise to the "data warehouse" concept for consolidating resources around data retrieval. Third, display applications have made significant progress in providing users with easier and better access to data.

Although the foregoing technological advances have made significant progress towards solving the problems associated with extracting useful information from data, several problems still exist. To be truly useful, information needs to be accessible and useable by a broad cross-section of information consumers. Current systems are too complex, too expensive, too rigid and too insecure to support broad access and use of information.

Prior systems are too complex to support access and use by a broad cross-section of information consumers. The bulk of the world's population simply does not have the skills necessary to use them. Most will likely never have the skills necessary to compose and submit database queries. Some have suggested that desktop applications are an answer to this problem. However, desktop database solutions typically result in fragmented data that is oriented towards very specific needs. Moreover, this approach to data management assumes the end user has the time to expend on managing the data in spreadsheets, files, and desktop databases. White some users may be proficient at data management, most undertake these tasks as a necessity. Given the choice, most users find it more efficient to focus on actual analysis.

Moreover, the solutions proffered by prior systems to address this complexity often do not work well. Many require information users to work through experts. However, many information consumers cannot provide specific, accurate requirements to a report writing expert on the first try. Thus, a typical query/report cycle involves several iterations to get the data and presentation correct and to validate the results.

Typically, prior systems offer few tools, if any, to unsophisticated information consumers for quickly and easily creating reports without programming assistance. Existing tools are limited to simplified wizard and web interfaces that simplify complexity by minimizing the number of options and inputs required of users. However, because designers of these wizards and web interfaces presume that specific types of data will be manipulated, these interfaces may be inflexible and lead to inaccurate tables or cross sections of data when applied to different types of data. They may also restrict the information user from accessing needed information.

Prior systems have often been too expensive to support broad access and use. The emergence of special data warehouses deploying online analytical processing (OLAP) and complex data models requires that data be transformed into multidimensional arrays or cubes, limiting both flexibility and timeliness of the data to some extent and requiting expensive applications and programming support. Because of such, current systems are so complex that they can only be deployed successfully in large enterprises that can afford them. Millions of small-to-midsize institutions also need access to business data for operational and decision-making purposes. While these institutions may not have formal, specialized data warehouses, they do need to perform reporting and analysis functions. Regardless of an organization's size, improving the ability to access and use data is critical to success.

Prior systems have frequently been too rigid to support broad access and use. Current systems limit user interaction with data. Users run reports typically created by experts. Users cannot generally look at fields or relations other than those included by experts. Users generally cannot drill down on data or drill through data to determine if the data makes sense.

Moreover, the various physical data layouts used in analytical systems have diminished the value of the data for many information users. Most transactional systems employ an entity-relationship (ER) data model. ER is a modeling technique that seeks to remove redundancy in data, thus increasing transactional speed. ER removes redundancy by recognizing that pieces or fields of information are related to other fields of information through one-to-one, one-to-many, and many-to-many relationships and by organizing these fields in several interrelated tables. A byproduct of ER modeling is that the relations incorporated into the data model generally embody business or logical relations. These relations are inherently understandable by humans because they are based upon the way humans manage data. Humans inherently know that customers have names, address and phone numbers, and that they place orders. Humans inherently know that orders are shipped through shippers, occur in sales regions, are taken by specific sales personnel and are for certain products.

Because ER-modeled systems result in numerous database tables, analytical systems typically do not handle them very well. As described above, transactional systems are generally modeled for data integrity and transactional speed. Typically, transactional systems only need to handle relatively small amounts of information. Most transactional systems only maintain data for a day, week, month or year. Accordingly, and because they typically utilize an ER data model, retrieving data from a transactional system often requires joining several database tables. Because transactional databases are relatively small, these joins do not require extensive processing power or memory. Analytical systems, however, are built to analyze large quantities of data. Accordingly, analytical systems contain a great deal of data. Frequently, data in analytical systems span several years or the entire life cycle of the associated institution. Because they contain extensive data, executing joins on multiple tables, typically requires a great deal of processing power and memory.

Analytical systems have attempted to overcome excessive processing and memory needs through alternative physical data modeling strategies. Most of the existing data modeling strategies require transformations of transactional data from their ER-modeled structures into more analytically friendly, flat data models. While these efforts are designed to increase processing speeds, they often result in the loss of some data and important business logic.

Because entity-relations are generally not maintained by analytical systems, existing ad hoc data query tools present flat data layouts to users. Typically, a user wishing to create a query against an analytical system is presented with a myriad of fields from which to choose. Sometimes, these fields are grouped into logical groupings. However, in each case the inherent business logic relations among the fields are typically lost. Further, once the user has selected certain fields, existing data query systems either automatically decide what joins to make on the tables associated with the fields, or present the user with a clumsy Boolean interface that itself is not aware of the relations among the selected fields. This can produce inconsistent results as fields are added or removed from a query, and makes generating a meaningful query very difficult. Missing or automatically interpreted join information can cause cross joins to be performed, among other errors, some of which are detected by the query reporting engine, while others are not, transparently returning erroneous results to the user and making report validity and data integrity a major issue for an organization.

Prior systems are also typically too insecure to support broad use. Most organizations cannot provide broad access to analytical data because of a lack of security for the data. Current systems rely on the underlying database system to provide security for the data. However, most database systems enforce security on an entire database or on tables or rows of the database. Therefore, organizations wanting to provide broad access to data are either required to expose sensitive data or restrict data access.

Thus, there is a need for a data query and reporting system that (1) allows non-technical computer users to build complex queries, (2) minimizes the need to have technical computer users build complex database queries by hand; (3) accommodates the need for a simple, easy-to-understand iterative system for generating and validating queries; (4) reduces the complexity and costs associated with retrieving useful information for organizations of all sizes, especially smaller businesses; (5) minimizes data transformations from transactional to analytical systems, preserving data and business logic, and promoting smarter queries; and (6) supports a robust security model, enabling organizations to protect sensitive data while providing broad data access.

SUMMARY OF THE INVENTION

According to the present invention, a system and method for building queries for execution against a data store is provided. The system and method empowers novice or casual computer users to easily and iteratively select elements or fields of the data store to create useful reports.

According to one embodiment, the present invention is implemented through a distributed application that runs on multiple computers but is displayed on a graphical user interface (GUT). This GUI, combined with common input devices such as a mouse and keyboard, minimizes the learning curve for use of the present invention. Thus, even a novice or casual user may quickly and easily understand and apply the present invention to a data store.

The present invention provides a simple-to-use data query and reporting system that retrieves data from a data store according to a user's desires in response to simple and efficient input commands. Using the invention, a user may select fields and relations associated with data. A user may also group data records by row, column, or by row and column. The user may also summarize the contents of select numeric or aggregation fields and present the results in the same report. Summary results may be presented for an entire report or for logical groupings of data.

The present invention defines a data store in terms of a relational abstraction. The relational abstraction generally parallels the entity-relationship inherent in transactional relational database management systems. Doing so preserves the business logic associated with such transactional systems for use by users of the invention. One skilled in the art will readily recognize that an entity-relationship abstraction may also be applied to data storage systems that are not in the genre of traditional relational database management systems.

The data store definition describes views, fields and relations of the data store. View definitions identify tabular structures of rows and columns in the data store. Field definitions describe columns of data accessible to the user in a particular view. Relation definitions describe associations between various views. Typically such definitions are associated with one or more tables and columns of a conventional relational database management system. However, one skilled in the art will recognize that any means of providing an entity-relationship view on data may be used as part of the invention.

The power of the present invention comes from empowering users to select a single base view as the starting point for generating a query. This base view is used to constrain the selection and creation of report fields.

The base view is used in the selection and creation of report fields as the starting point of a relation path to a destination view of a report field. Each relation path contains zero or more relationships and is dynamically generated by the invention as a report is built. In building a report, fields are selected or relationships are followed iteratively and recursively. In this fashion, the present invention enforces the cardinality of relations relative to the base view.

If a relation path is empty or includes only to-one relationships, a selected field is considered scalar relative to a row in the base view. If a relation path includes at least one to-many relationship, a selected field is considered aggregate relative to the base view, and must be paired with a function or expression that aggregates its values into a scalar value for each row in the base view.

The present invention improves report filtering and provides a means for quickly and easily constraining data based upon the base view of a report. In similar manner to iteratively and recursively selecting scalar and aggregate fields, fields may be selected as filter fields. As filter fields are selected, logical filter operators may be applied, filter fields may be nested into filter groups, and filter group operators may be applied.

As a user selects fields associated with the base view, an embodiment of the present invention iteratively and recursively captures user input for a report, and automatically generates an SQL query, which upon execution returns the desired result set of data. The SQL query includes a FROM clause based upon the base view's underlying SQL table or view. Fields on the base view with no relation path are selected and filtered directly in the query. Fields with a relation path cause nested subqueries to be generated, which are joined to the view of the outer query using the join keys specified for the relation.

One nested subquery is generated for each relation in the path, each containing a FROM clause for the relation's destination view. The subquery for each level of the relation path is nested within the previous level, similar to the recursive tree structure. Fields with fully or partially matching relation paths may reuse the same nested subqueries. The nested subqueries allow data across to-many relations to be aggregated before being joined with the base view rows. This approach allows reports involving complex aggregation to be returned using a single SQL query, without usage of temporary tables or intermediate processing. The present invention thus provides a means of easily validating reports, as the captured user request closely mirrors the automatically generated SQL query.

According to one embodiment, the present invention provides a robust security model, enabling organizations to protect sensitive data while providing broad data access. According to this embodiment, a person or process knowledgeable about the data contained in a data store and the organizational requirements to protect the data defines one or more security principals who will be given access to information contained in the data. Security principals may be users or groups of users, and the identities of and other information about security principals are typically maintained in a protected file, database or directory.

According to this embodiment of the present invention, the person or process also creates an entry in an access-control list for each element of the data, specifying in the entry if the security principal is to be granted or denied access to the element. The data elements may be course grained, as in the case of entire tables or views, or fine grained, defining permissions for specific fields, ranges of fields, or field aggregates.

According to this embodiment, the person or process also creates a security filter for each report view to be protected. The security filter must include at least one row of the view, otherwise data from the view could not be viewed. The security filter also includes an access control entry denying access to one or more specific data elements that might be specified in the view. Defining the access control entry to deny access permits the security filter to operate in a fashion similar to other filters pertaining to the invention.

Once security principals, access control entries and security filters are defined, access control is enforced on a report by requiring that each security principal be authenticated and by applying the security filters associated with the report according to the permissions associated with the security principal as defined in the access control list and the security filter.

That the invention improves over the drawbacks of prior database query and report applications and accomplishes the advantages described above will become apparent from the following detailed description of preferred embodiments and the appended drawings and claims.

BRIEF DESCRIPTION OF THE DRAWINGS

Other features and advantages of the present invention will be apparent from the following Detailed Description taken in conjunction with the accompanying Drawings, in which:

FIG. 3A is a tabular diagram of certain metadata software objects associated with the sample database depicted in FIG. 2.

FIG. 3B is a tabular diagram of certain metadata software objects associated with the sample database depicted in FIG. 2.

FIG. 3C is a tabular diagram of certain metadata software objects associated with the sample database depicted in FIG. 2.

FIG. 3D is a tabular diagram of certain metadata properties associated with an embodiment of the present invention.

FIG. 3E is a series of tables illustrating extensible Markup Language (XML) examples of metadata software objects associated with an embodiment of the present invention.

FIG. 12C is an XML snippet illustrating the iterative generation of a query associated with the definition of a query according to an embodiment of the present invention.

FIG. 13I is a tabular diagram of the XML and SQL queries generated in connection with advanced filters according to an embodiment of the present invention.

FIG. 14B includes windows illustrating a means of defining subfilters according to an embodiment of the present invention.

FIG. 14E is a window illustrating a report incorporating subfilters according to an embodiment of the present invention.

FIG. 14F is a tabular diagram of the XML report definition generated in connection with subfilters according to an embodiment of the present invention.

FIG. 14G is a tabular diagram of SQL generated in connection with subfilters according to an embodiment of the present invention.

FIG. 15C is a window illustrating a report incorporating drill through hot spots according to an embodiment of the present invention.

FIG. 15D is a window illustrating a report incorporating a drill through report according to an embodiment of the present invention.

FIG. 15G is a tabular diagram of the XML generated in connection with a drill through report according to an embodiment of the present invention.

FIG. 15H is a tabular diagram of the SQL generated in connection with a drill through report according to an embodiment of the present invention.

FIG. 16D is a window illustrating a report incorporating a loop back report according to an embodiment of the present invention.

FIG. 16E is a tabular diagram of the XML generated in connection with a loop back report according to an embodiment of the present invention.

FIG. 16F is a tabular diagram of the SQL generated in connection with a loop back report according to an embodiment of the present invention.

FIG. 17 is a logic flow diagram illustrating a method for providing security for a report according to an embodiment of the present invention.

DETAILED DESCRIPTION

Figure 1:
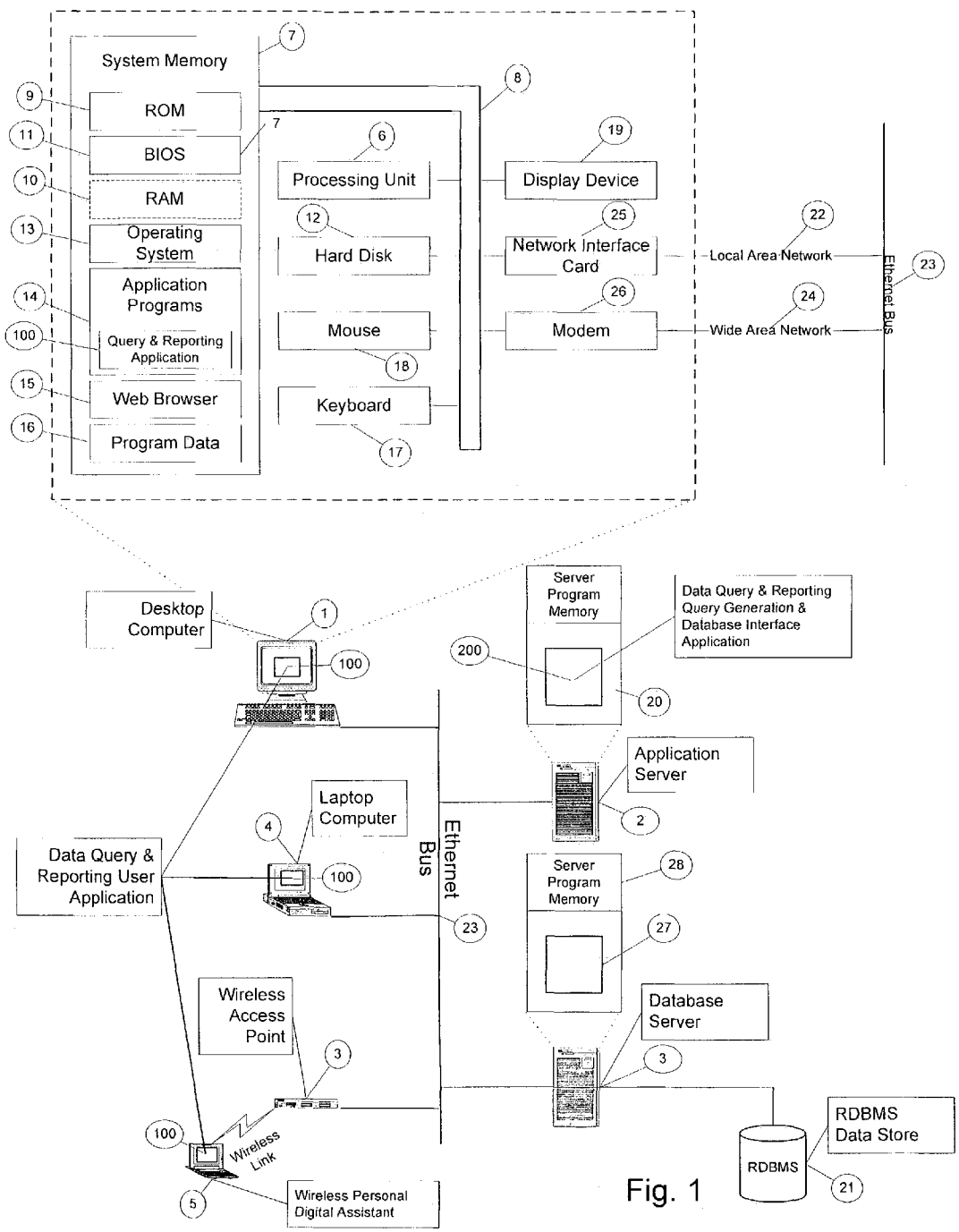
FIG. 1 is a block diagram of a distributing computing system that provides an exemplary operating environment for the present invention.

The present invention may be embodied in a computer database query and reporting system that groups and displays selected database data based upon base views, and the fields and relations associated with those base views. Selected database data is displayed on a display surface according to row, column, summary and group criteria chosen by a user. The display surface is typically an active window on a display device of a simple application program, but the display surface may alternately be a window of a web browser or any application program operable for displaying and manipulating data. The display surface is typically a monitor, but may alternately be a printer, flatscreen LCD display, television, and soon.

In one embodiment of the invention, the display surface includes a query construction window and a query reporting window. The query construction window includes a recursive tree structure area, a column drop area, a group drop area and a measures drop area. The recursive tree structure area is a display item used to display database views and associated fields and relations, is typically located at the left of the query construction window and is column-shaped. The group drop area is a display item used for adding fields from the recursive tree structure area to create row groupings of a report, is typically located to the right of the recursive tree structure area, and is column-shaped. The column drop area is a display item used for adding fields from the recursive tree structure area to create columns of a report, is typically located to the right of the group drop area, and is column-shaped. The measures drop area is a display item used for adding fields from the recursive tree structure area to create summary or total fields of a report, is typically located to the right of the column drop area, and is column-shaped. Alternate embodiments may use different means of displaying the names of database fields and relations. Alternative embodiments may use more drop areas, or a single drop area. Alternate embodiments may also change the shape of the drop area display items to fit various displays; for example, the drop areas may be round, square, triangular, or a custom shape as needed, or may be located in a pull-down menu or in some other type of user interface configuration. For example, the drop areas may be located in combined windows on the display screen, or may be represented by icons or buttons rather than blank fields.

According to another embodiment of the invention, the database query and reporting system may add columns to a report. To add columns, a user selects a field from the list of fields in the recursive tree structure area and drops the field in the column drop area by initiating a drag-and-drop command, or, provided the column drop area is active, by double-clicking the desired field, or by clicking an arrow-transfer-button display item. The database query and reporting system captures this action by adding the field to the list of columns and by displaying the selected field name as a column heading name.

Similarly, in another embodiment of the invention, the database query and reporting system may add row groupings to a report. To add row groupings, a user selects a group field from the list of fields in the recursive tree structure area and drops the field in the group drop area by initiating a drag-and-drop command, or, provided the group drop area is active, by double-clicking the desired field, or by clicking an arrow-transfer-button display item. The database query and reporting system captures this action by adding the field to the list of row groupings and by displaying the selected field name as a group heading name.

According to another embodiment of the invention, the database query and reporting system may add numeric summary or aggregation measures to a report. To add measures, a user selects an aggregation or measures field from the list of fields in the recursive tree structure area and drops the field in the measures drop area by initiating a drag-and-drop command, or, provided the measures drop area is active, by double-clicking the desired field, or by clicking an arrow-transfer-button display item. The database query and reporting system captures this action by adding the field to the list of measures and by displaying the selected field name as a measure heading name.

Likewise, according to yet another embodiment of the present invention, the database query and reporting system may add fields from related database views to a report. Typically, the recursive tree structure area will include a list of relations, which are related tables or views. To add fields from a related database view or report, a user initiates a double-click command on a relation. The database query and reporting system will respond by replacing the previously existing list of fields and relations in the recursive tree structure area with a new list based upon the selected relation and the cardinality existing between the base view and the destination view of the relation. The user may then add fields from the recursive tree structure area to the column, group and or measures drop areas, as noted above.

Once a user has selected the desired fields to be grouped and displayed in a report, in one embodiment of the invention, the user may select to view a corresponding report. Typically, a user will view a corresponding report by selecting a view report button. Alternate embodiments may allow a user to review a report by changing focus on a window, or may automatically display a report after each field is added, and so on.

In the present invention, the list of fields and relations displayed in the recursive tree structure area is based upon a base view. Typically, the database query and reporting system will retrieve a list of tables and views from a database server and display them on a display surface. A user may then select one of the tables or views. Based upon the user's selection, the database query and reporting system will generate a hierarchical or entity-relationship map of all tables, views, fields and relations of the selected table or view and the tables and views related to the selected table or view.

In the present invention, access to views, fields and relations is managed by a robust security model, enabling organizations to protect sensitive data while providing broad data access. Security is enforced through the model by using access control lists and security filters. Users and groups of users, or security principals, are defined in the access control lists, and also in security filters.

Furthermore, the described features, structures, or characteristics may be combined in any suitable manner in one or more embodiments. In the following description, numerous specific details are provided, such as examples of programming, user selections, network transactions, database queries, database structures, physical structures, etc., to provide a thorough understanding of embodiments of the invention. One skilled in the relevant art will recognize, however, that the invention can be practiced without one or more of the specific details, or with other programs, user selections, database queries, database structures, physical structures, etc. In other instances, well-known structures, methods, or operations are not shown or described in detail to avoid obscuring aspects of the invention.

As used herein, a "user" refers not only to a person using the present invention, but also to a program, application, operating system, function call, or any other entity that may make use of the present invention. Thus, an operating system that manipulates or otherwise employs the present invention is classified as a user.

FIG. 1 and the following discussion are intended to provide a brief, general description of a suitable computing environment in which the invention may be implemented. While the invention will be described in the general context of application programs running on operating systems in a distributed computing environment where tasks are linked through a communications network, those skilled in the art will recognize that the invention also may be implemented in varying types of computer environments, including desktop computers, laptops, hand-held devices, multiprocessor systems, microprocessor-based or programmable consumer electronics, minicomputers, mainframe-computers, and the like. In a distributed computing environment, application programs may be located in both local and remote memory storage devices.

With reference to FIG. 1, according to one embodiment of the present invention, a computer system for implementing the invention includes a conventional Desktop Computer 1, an Application Server 2 and a Database Server 3. Typically, the Desktop Computer 1, the Application Server 2 and the Database Server 3 will operate in a networked environment using logical connections. Although FIG. 1 depicts a system including a Desktop Computer 1, it will be appreciated by those skilled in the art that other types of computing devices such as a Laptop Computer 4, or a Personal Digital Assistant 5, may also be used.

Typically, the Desktop Computer 1 includes a Processing Unit 6, System Memory 7, and a System Bus 8 that couples the System Memory 7 to the Processing Unit 6. The System Memory 7 includes Read Only Memory (ROM) 9 and Random Access Memory (RAM) 10, and a Basic Input/Output System (BIOS) 11 that contains the basic routines that help to transfer information between elements within the Desktop Computer 1, such as during start-up, and the ROM 9. The Desktop Computer 1 further typically includes a Hard Disk Drive 12. The Hard Disk Drive 12 is connected to the System Bus 8. The Hard Disk Drive 12 and its associated computer-readable media provide nonvolatile storage for the Desktop Computer 1. Although the description of computer-readable media above refers to a hard disk, it will be appreciated by those skilled in the art that other types of storage devices and media that are readable by a computer, such as a removable magnetic disk, a CD-ROM disk, a magnetic cassette, a flash memory card, a digital video disk, Bemoulli cartridge, and the like, may also be used included in, or attached to, the Desktop Computer 1.

A number of program modules may be stored in the Hard Disk Drive 12 and the RAM 10, including an Operating System 13, one or more Application Programs 14, a Web Browser Program 15, and Program Data 16. These program modules include a Data Query And Reporting User Application (DQR Application) 100 configured for implementing an embodiment of the present invention. A user may enter commands and information into the Desktop Computer 1 through conventional input devices such as a Keyboard 17 or a pointing device such as a Mouse 18. Other input devices (not shown) may include a pen, touch-operated device, microphone, joystick, game pad, satellite dish, scanner, or the like. A Display Device 19, such as a display screen, is also connected to the System Bus 8 via an interface. In addition to the Display Device 19, desktop computers typically include other peripheral output devices (not shown), such as speakers, scanners or printers.

Application Server 2 and a Database Server 3 may be personal computers, minicomputers or mainframe computers, or another common application platform, and may also include many or all of the elements described relative to the Desktop Computer 1. Typically, the logical connections depicted in FIG. 1 include a Local Area Network (LAN) 22 running over an Ethernet Network Bus 23 or a Wide Area Network (WAN) 24. Such networking environments are commonplace in offices, enterprise-wide computer networks, intranets and the Internet. Typically, Database Server 3 stores and manages data by means of a special set of files or folders, such as an RDBMS Data Store 21 and makes that data available to other computer programs through Application Programming Interface 27, which runs in Server Program Memory 28 of Database Server 3.

When used in a typical networking environment, the Desktop Computer 1 is connected to the LAN 22 through a Network Interface Card 25. When used in a WAN networking environment, the Desktop Computer 1 typically includes a Modem 26 or other means for establishing communications over the WAN 24, such as the Internet. The Modem 26, which may be, internal or external, is connected to the System Bus 8. In a networked environment, Application Programs 20, or portions thereof may be executed on Application Server 3 and stored in the server memory and storage devices. These application programs include a Data Query And Reporting Query Generation And Database Interface Application (Query Engine) 200 configured for implementing an embodiment of the present invention. Typically, the Query Engine 200 also includes an intermediate mapping or metadata layer that is used when communicating with a database server. It will be appreciated that the network connections shown are exemplary and other means of establishing a communications link between the computers may be used.

Figure 2:
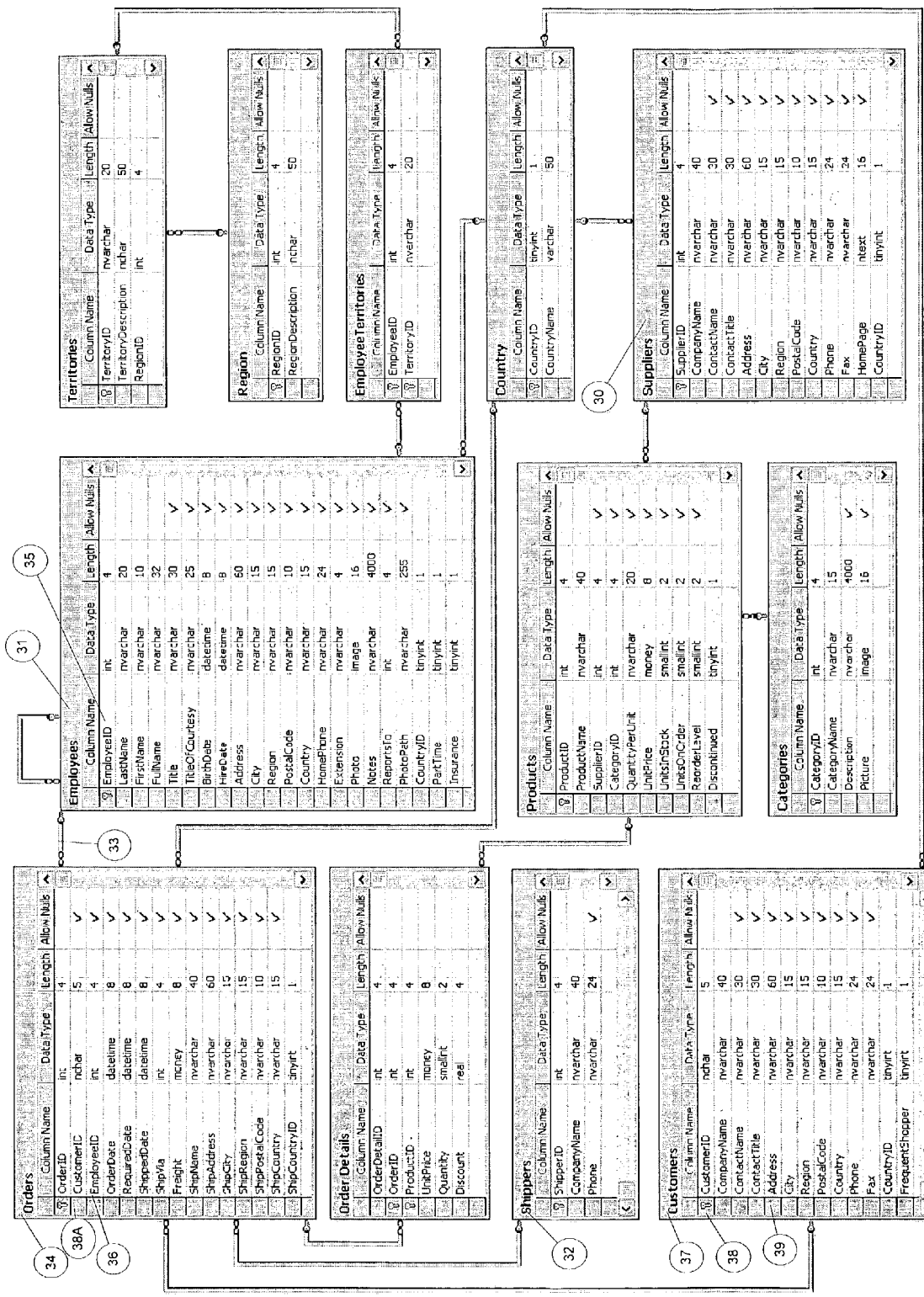
FIG. 2 is a tabular diagram of a sample database.

FIG. 2 is a block diagram illustrating the main tables, fields and the relations of a sample database, which has been derived from the Northwind database provided by Microsoft Corporation with its database server products. This modified Northwind database is used extensively in the embodiments illustrated below to show how the various embodiments of the DQR Application 100 and Query Engine 200 interact with a Data Store 21. Tables in the database are depicted in the large blocks of FIG. 2, such as a Suppliers Table 30, an Employees Table 31 and a Shippers Table 32. FIG. 2 also depicts connector lines between the tables to designate relations, such as a Relation 33 between the Employees Table 31 and the Orders Table 34. As depicted in FIG. 2, the key symbol and the infinity symbol ($\infty$) designate the cardinality of relationships, thus the key symbol designates a "one-to" or a "to-one" relationship, and the infinity symbol designates a "many-to" or "to-many" relationship. Thus, the cardinality of the Relation 33 is expressed as one-to-many from the perspective of the Employees Table 31 in FIG. 2. As also shown in FIG. 2, the Relation 33 is linked between the EmployeeID Field 35 in the Employees Table 31 and the Employee ID Field 36 in the Orders Table 34.

FIG. 3A, FIG. 3B and FIG. 3C are tables illustrating the mappings between the sample Northwind database tables, columns and relations and the views, fields and relations of an embodiment of DQR Application 100 and Query Engine 200, as used in one embodiment of the present invention. Such mappings are known by those skilled in the art as metadata, or data describing other data. Typically, such metadata mappings are constructed by personnel familiar with a data store and the data contained therein.

In the present example metadata, a "Customer View" Table 40 depicts a mapping between the sample Northwind database described in FIG. 2 and the DQR Application 100. Referring to Customer View Table 40 in FIG. 3A, a Company Name Field 41 is mapped to a CompanyName Field 42 in the Customers Table 37 of FIG. 2. Such is denoted by Balloon Number 43 in FIG. 3A. One skilled in the art will readily recognize the mappings between the metadata denoted in FIG. 3A, FIG. 3B and FIG. 3C and the tables, columns and relations of FIG. 2.

FIGS. 3D and 3E further disclose the organizational structure of the metadata. In the present invention, metadata for a database is organized in a specific manner to facilitate ad hoc data analysis thereof. In one embodiment of the present invention, metadata is organized through at least four specific software objects. Such objects have methods and properties associated with them. Table 50 of FIG. 3D describes properties associated with database objects. For example, an Object Property dbUtilityTypeName D01 references a string containing the name of the object type used, to access the referenced database, which could be a name readily understandable by humans or an alphanumeric reference to the database. An Object Property connectionString D02 references a string containing the location, access method and security associated with a database. One skilled in the art will recognize that other property names and property types could readily be substituted for those presented in FIG. 3D. Further, one skilled in the art will also recognized that other software conventions such as functions, structures and the like could be used instead of objects.

According to one embodiment of the present invention, instances of the objects described in FIG. 3D are implemented through use of extensible Markup Language 1.0 (XML). Table 60 of FIG. 3E includes an XML description of an instance of the Database object described in the Table 50 for the Northwind sample database described in FIG. 2. Referring to FIG. 3E, note that a dbUtilityTypeName Property 61 specifies that SQL Server is the access method for the Northwind database. Note also that a coninectionString Property 62 indicates the Northwind database is located on the local machine and accessed through integrated security. One skilled in the art will readily recognize that different database access service providers and securities interfaces may be used.

As shown in FIG. 3E, a Table 63 includes the XML description of an instance according to the description of the Table 51 of the Customer View 40. In one embodiment of the present invention, each view described by the metadata has a corresponding XML object definition. In the Table 63, the xsi:type="view" Tag 64 specifies the object as a view object; the databaseID="1218" Tag 65 specifies a shorthand notation referencing the modified Northwind database; and the sourceTable="Customers" Tag 66 indicates that the Customer View is mapped to the Customers Table 37 in FIG. 2. The <primaryKey keyColumn="CustomerID" dataType="Text"/> Tag 67 indicates that the key field for the Customer View 40 is the CustomerID Field 38. The <defaultFields> Tag 68 enumerates the source fields displayed when the user fails to specify a field after following a relation that terminates on the Customer View 40. In the present case, the XML Tag <field ref="northwind\Customer\Company Name"/> 69 references the Company Name Source Field 41 of FIG. 3A. The XML Tag <defaultAggregateFields> 70 enumerates the source fields containing numeric values associated with the Customer View 40, which are available for providing numeric summaries of data contained in a report. In the present embodiment, the XML Tag <field ref="1228" type="aggregate"/> 71 references the Customers Aggregation Field 44 of FIG. 3A.

Table 72 of FIG. 3E provides an XML description of the Address Field 45 of the Customer View 40 of FIG. 3A and the Customer View XML Object 63 in FIG. 3E. In one embodiment of the invention, each source field to be exposed for a view is similarly defined. The xsi:type="savedSourceField" XML Tag 73 identifies an Address Object 72 as a data or source field. The sourceolumn="Address" XML Tag 74 identifies the Address Field 39 as the data source for the Address Object 72.

As shown in FIG. 3E, an Orders relation Object Table 76 is an instance of a Relation object conforming to the Table 53, which provides an XML description of the Orders Relation 46 of FIG. 3A. According to one embodiment of the invention, each relation is similarly defined. Referring to the Orders Relation Object Table 76 of FIG. 3E, an xsi:type="relation" Tag 77 defines the object as a relation object. The relation definition also includes a ViewID="northwind\Order" Property 78, which in the present embodiment indicates that following a relation from the Customer View 40 to the Order View 47 will expose the fields and relations associated with the Order View 47. A reverseID="northwind\Order\Customer" Property 79 indicates, should the Orders Relation 46 be followed, that the path back to the Customer View 40 will occur through use of the Customer Relation 48. A relationType="OneToMany" Property 81 indicates that the relation from the Customer View 40 to the Order View 47 is one-to-many. The join type and the join keys for the Orders relation Object Table 76 are specified by a joinType="LeftOuterJoin" property 80 and the < joinKey sourceColumn="CustomerID" destColumn="CustomerID" dataType="Text"/>XML Tag 82, respectively. In this case, because the relationship is identified as a one-to-many relation, the join is specified as a left outer join. A left outer join of the Customer View 40 and the Order View 47 will include all records from the Customers Table 37 and the corresponding records in the Orders Table 34 where the CustomerID 38 and the CustomerID 38A are equal.

A Table 83 of FIG. 3E includes an XML description of the Customer Relation 48 of the Order View 47 of FIG. 3B. The Table 83 represents the reverse path associated with the Orders Relation 46. In this case, a toViewID="northwind\Customer" Property 84 points to the Customer View 63, a reverseID="northwind\Customer\Orders" Property 85 points to the Orders Relation Object Table 76, a relationType="ManyToOne" Property 86 indicates that the relation is many-to-one, and a joinType="InnerJoin" Property 77 indicates that the join is an inner join. An inner join will include records from both the Orders Table 34 and the Customers Table 37 where the values of the join keys specified by the <joinKey sourceColumn="CustomerID" destColumn="CustomerID" dataType="Text"/> XML Tag 88 are equal.

Figure 4:
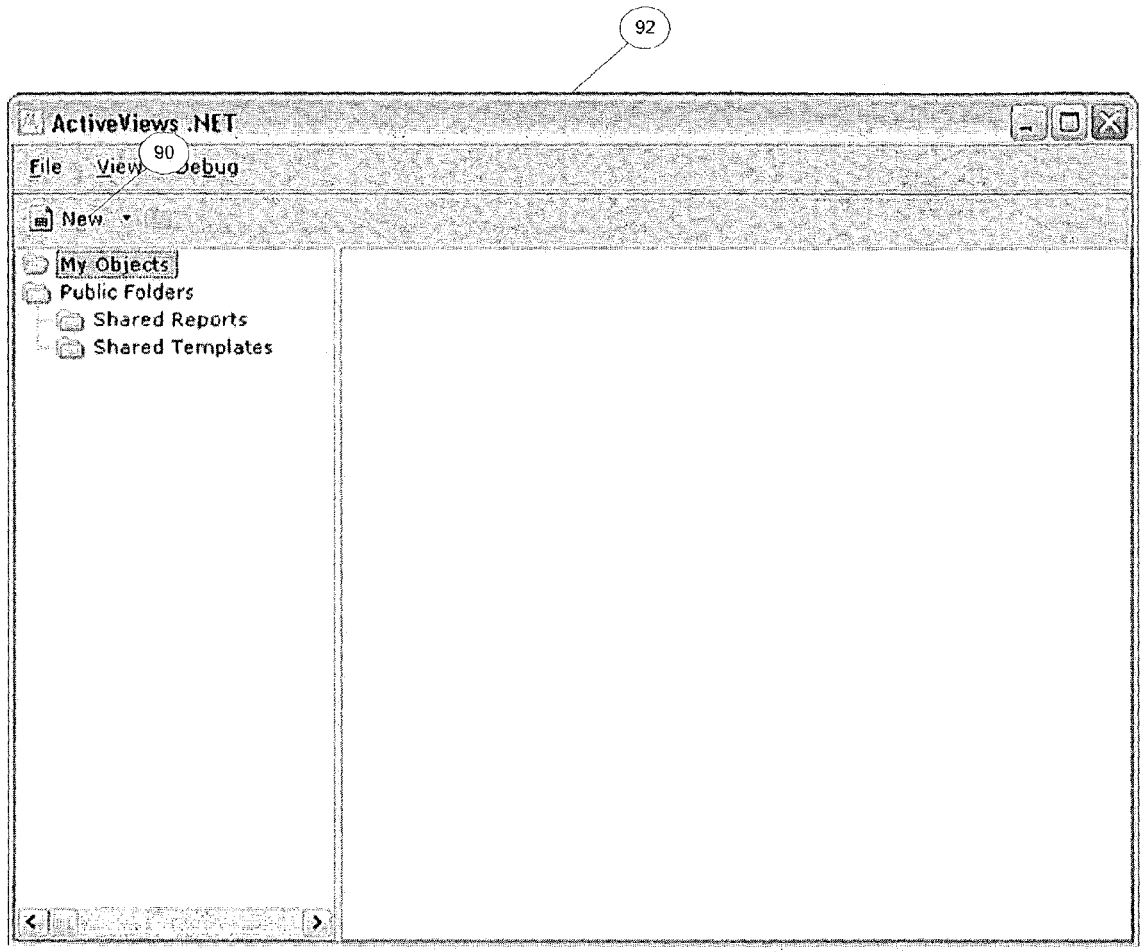
FIG. 4 is a main display window of an embodiment of the present invention.

One embodiment of the present invention provides a user the means to iteratively generate queries. FIG. 4 depicts a main or initial display Window 92 of an embodiment of the DQR Application 100. From this Window 92, a user of the DQR Application 100 may select a New Button 90 to create a new report.

Figure 5:
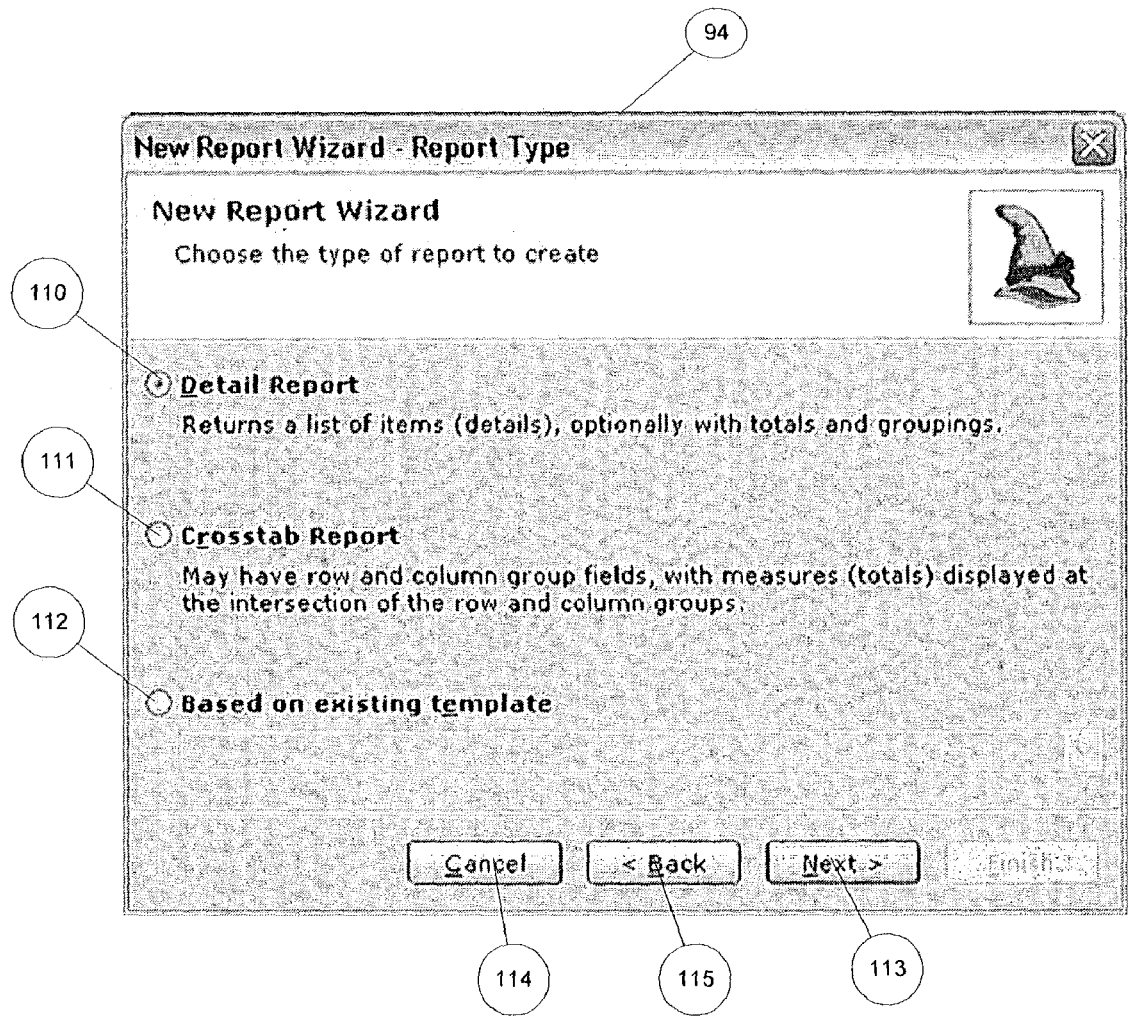
FIG. 5 is a window display illustrating a software wizard used in an embodiment of the present invention.

FIG. 5 depicts a display Window 94 according to one embodiment of the DQR Application 100 that is useful for guiding a user through the process of creating a report. One skilled in the art will appreciate that various other interfaces may be used to facilitate creation of a report, including a menudrive interface, a programmatic interface, a verbal interface, etc. In the embodiment shown, a user may select a Detail Report Radio Button 110 to create a new detail report. A detail report in the depicted embodiment is a list based upon one or more source fields of a database view. In this embodiment, a user may also select a Crosstab Report Radio Button 111 to create a tabulated report based upon the intersection of two source fields that bear a many-to-many relationship to each other. A user may also select a Based Upon Existing Template Radio Button 112 to create a report based upon a previously saved report or template. Once a user has selected a report type, a user may select a Next Button 113 to proceed to the next step in creating a report. A user may also select a Cancel Button 114 to stop building a report, or may select a Back Button 115 to return to the Window 92.

Figure 6A:
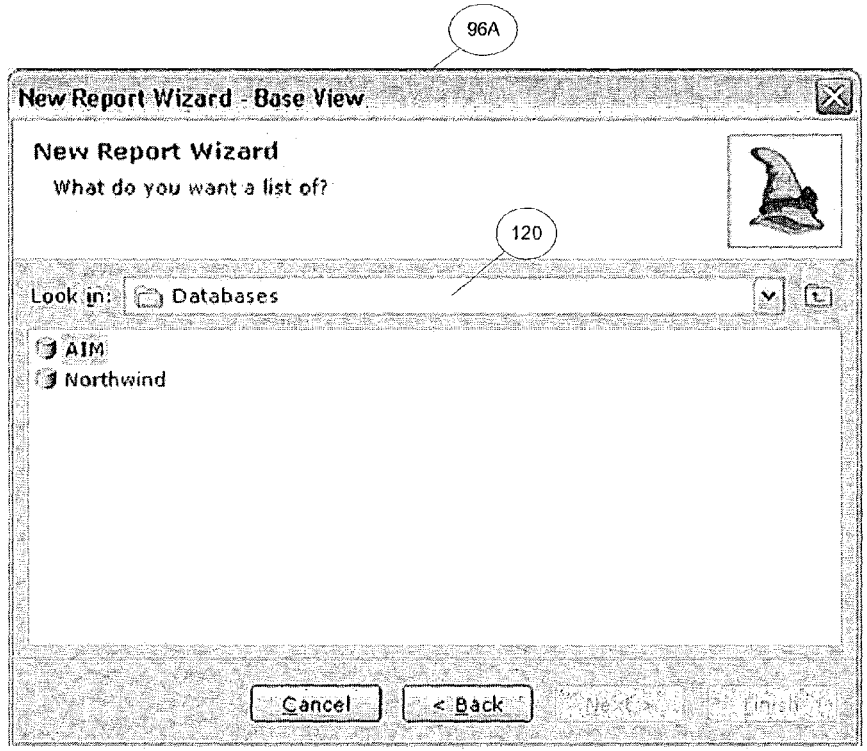
FIG. 6A is a window display illustrating selection of a database according to an embodiment of the present invention.
Figure 6B:
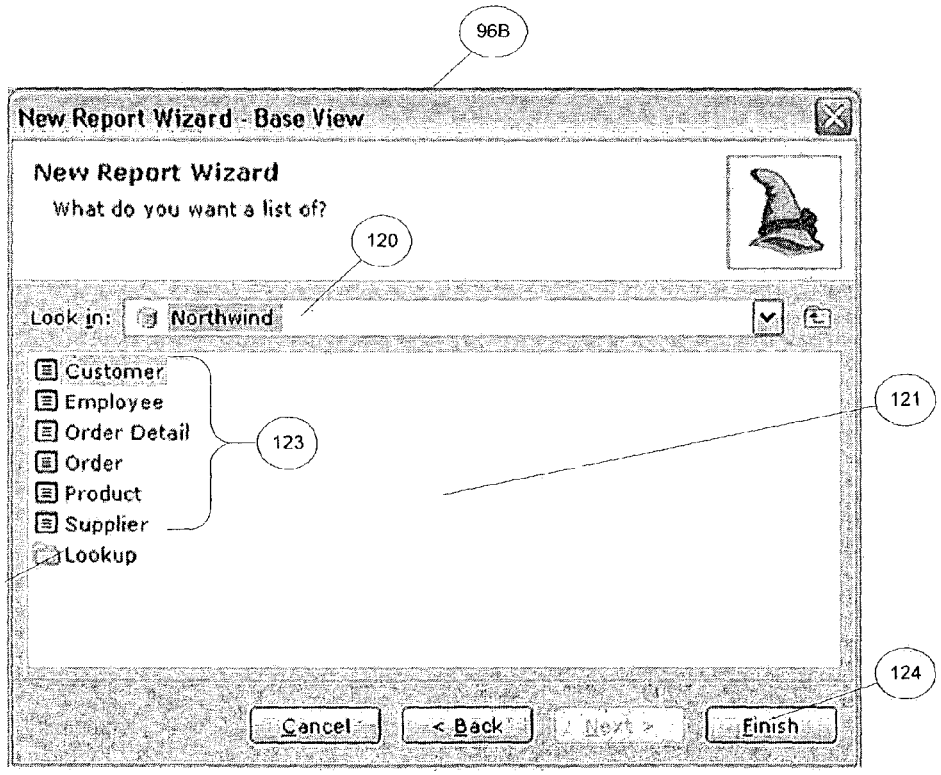
FIG. 6B is a window display illustrating selection of a base view according to an embodiment of the present invention.

FIGS. 6A and 6B depict display Windows 96A and 96B, respectively, of an embodiment of the DQR Application 100 that allows a user to select a database view as the base view for use in a list type report. The user may select a database known to the DQR Application 100 and the Query Engine 200, as described by metadata associated with the database (an example of which is provided in FIGS. 3A–3E) by selecting one of the databases included in a Look In Drop Down Box 120. In the depicted embodiment, once a user has selected a database, the views associated with the database as described by the metadata are displayed in a View List 121 of FIG. 6B. In the present example, the views described in FIGS. 3A–3C appear in the View List 121.

In the depicted embodiment, views may be organized into subfolders, such as a Lookup Folder 122. This facility is provided for databases having a large number of defined views. In the depicted embodiment of the present invention, the base view is set by selecting a view from a List 123 and either selecting a Finish Button 124 or double-clicking on the selected view. This base view, in conjunction with the associated metadata described in FIGS. 3A–3C, as exposed by the Query Engine 200 and the DQR Application 100, is used in the invention to provide an entity-relationship map of the database relative to the selected base view.

Figure 7:
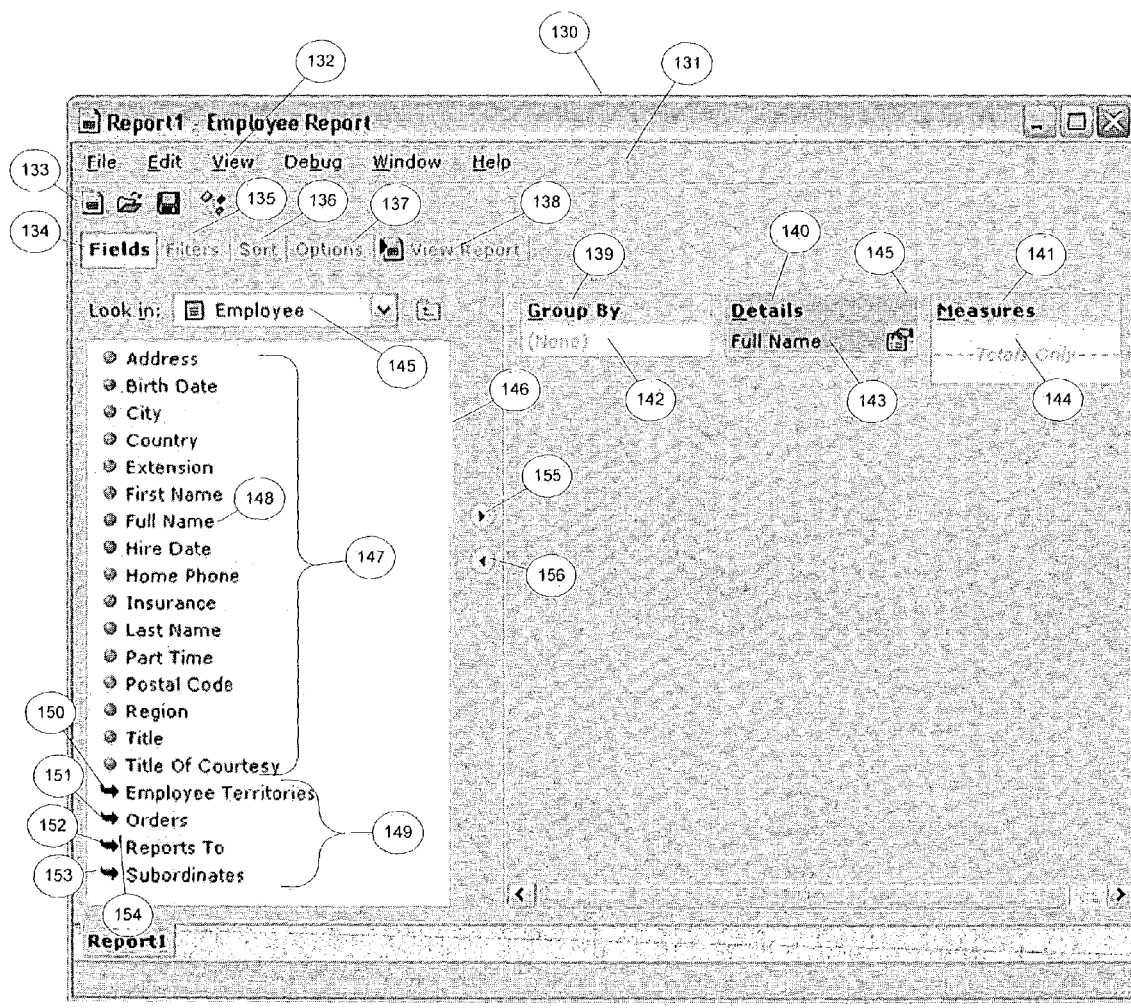
FIG. 7 is a window display illustrating a detail field drop area according to an embodiment of the present invention.

The entity-relationship map of the present invention may be exposed through a database entity-relationship grouping and display system and according to rules of the invention enforcing proper display and element selection and iterative query generation. FIG. 7 depicts a display Window 130 of the grouping and display system according to one embodiment of the DQR Application 100. Those skilled in the art will recognize that the Window 130 is a conventional window of a modern desktop application. However, those skilled in the art will also recognize that other conventional and non-conventional display means, screens and windows could be used. In the depicted embodiment, a Menu,Bar 131 contains several menu items, including a View Menu Item 132, which in one embodiment of the invention shows the iterative nature of queries generated. A Toolbar 133 contains a Filters Button 135, a Sort Button 136, an Options Button 137 and a View Report Button 138. The Tool bar 133 and related buttons are used in this embodiment of the invention to display certain windows and build iterative queries.

A Group By Box 139, a Details Box 140 and a Measures Box 141 are standard label boxes. The boxes below the Group By, Details and Measures areas of the display window, numbered respectively 130, 131 and 132, are drop box areas where a user may drag or locate fields when building queries. Note that in the depicted embodiment, a Details Drop Box Area 143 has been selected by default, as denoted by the darker gray colored background surrounding the Details Label 140. With such selection, a user may select from a Selection Area 146 one or more fields from a Field Group 147 that pertains to the Employee View 49, which is the view based upon the Employees Table 31 of the FIG. 2, as shown in a Look In Drop Down Box 145 of FIG. 7. In the depicted embodiment and present example, one of the fields directly associated with the Employee View 49 is a Full Name Source Field 148, which has been selected according to the present invention as shown in the Details Drop Area 143. In the present example, a user may also follow relations between the Employee View 49 and the other views described in FIGS. 3A-3C, including an Employee Territories Relation 150, an Orders Relation 151, a Reports To Relation 152 and a Subordinates Relation 153. In the present example, the Reports To Relation 152 is visually designated as a to one relation, as denoted by a superscripted "1"154.

Figure 8:
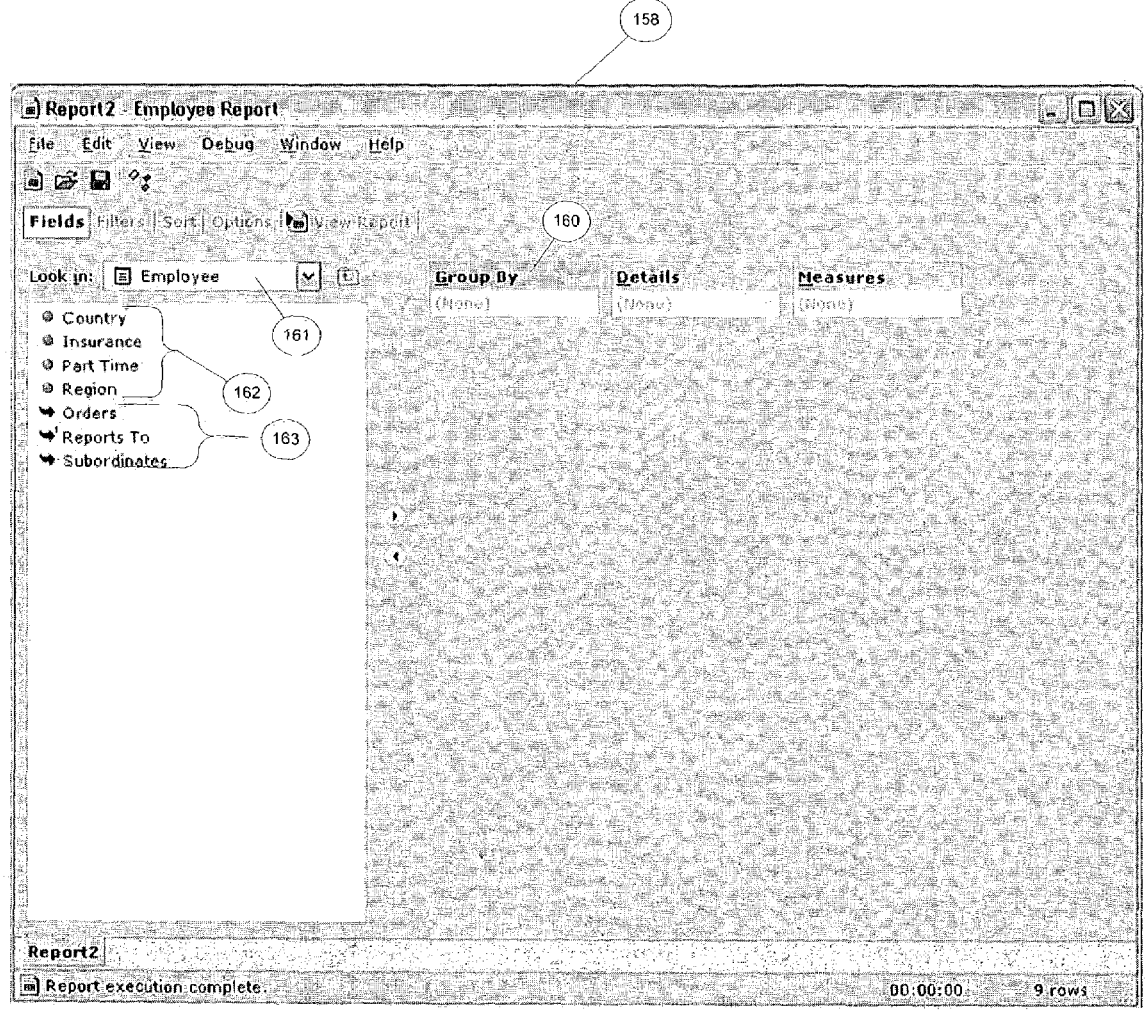
FIG. 8 is a window display illustrating a group field drop area according to an embodiment of the present invention.

FIG. 8 depicts a display Window 158 of an embodiment of the DQR Application 100 that illustrates selection of a Group By Drop Area 160. When the Group By Drop Area 160 is selected, the DQR Application 100 displays only those fields of the Employee View 49 as are designated in a Look In Drop Down Box 161 that can be used for grouping. Each such field will have been designated previously as a field available for grouping by setting an allowAsGroupField Property F05 (see FIG. 3D) to true. In the present example, the fields highlighted by a Balloon 162 may be selected and the relations highlighted by a Balloon 163 may be followed.

Figure 9:
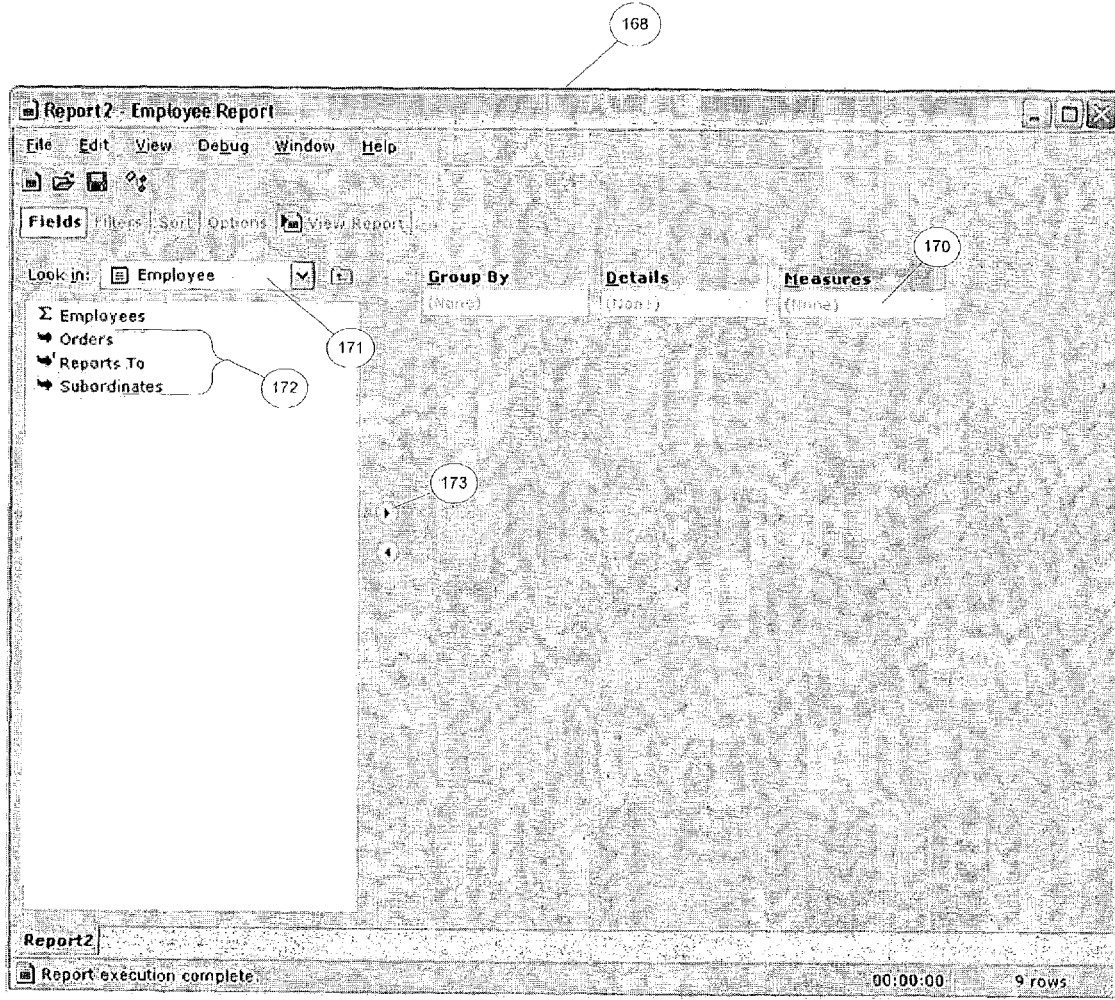
FIG. 9 is a window display illustrating a measure field drop area according to an embodiment of the present invention.

FIG. 9 depicts a display Window 186 of an embodiment of the DQR Application 100 illustrating selection of a Measures Drop Area 170. In the depicted embodiment, the Measures Drop Area 170 provides a means to incorporate numeric summaries or totals into a report. When the Measures Drop Box 170 is selected, only those fields pertaining to the selected view, in the present example the Employee View 49, as designated in a Look in Drop Box 171, are available for selection. In the present example, the total number of employees in the Northwind database of FIG. 2 can be added to the Measures Drop Box 170. A user may also choose to follow one of the relations identified by a Balloon 172. In the present embodiment, a user chooses to follow a relation by double-clicking on the relation name. Should a user drag a relation name to the Measures Drop Area 170 or left-click on a relation name followed by clicking an Add Button 173 while the Measures Drop Area 170 is the default drop area, the DQR Application 100 will add the fields identified by a defaultAggregateFields Property V06 (See FIG. 3D) for the view to the Measures Drop Area 170.

Figure 10A:
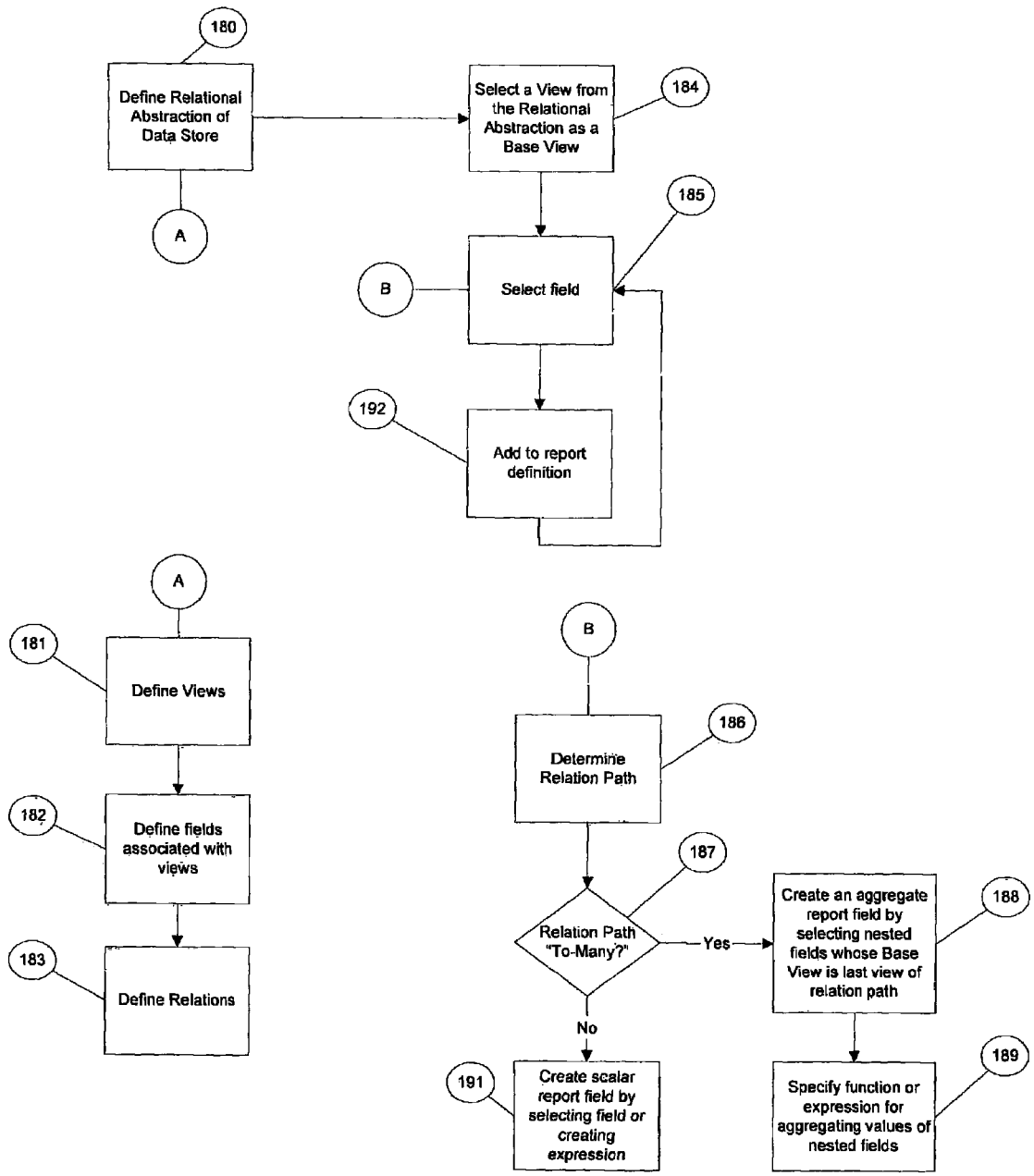
FIG. 10A is a logic flow diagram illustrating a method for generating a report according to an embodiment of the present invention.

FIG. 10A displays a flowchart detailing the steps of operation of the method of selecting a base view, using that base view to constrain data selection, and creating reports. In step 180, a relational abstraction of a data store is created. Steps 181, 182 and 183 describe the steps of creating the relational abstraction. In Step 181, views of the data to be available for access from the data store are created. In Step 182, fields to be associated with such views are defined. In Step 183, relations between views are defined. In one embodiment of the present invention, a metadata layer that references the Northwind sample database is created, as depicted in FIGS. 3A through 3E and as described above. One skilled in the art will readily recognize that a similar abstraction may be created for data stores of all types, including data stores that are not based upon relational database methodologies.

Once a relational abstraction of a data store has been created, reports may be generated. In Step 184, a view is selected. This is the base view of a report. Based upon that selected base view, fields maybe selected in Step 185. Such fields may be either directly associated with the base view, or they may be associated with other views defined in, Step 182. In Step 186, a relation path from the base view selected in Step 184 to a destination view is determined by following a series of relations defined in Step 183. If no relations are followed, the relation path is empty. A relation path indicates whether the cardinality of a related view relative to the base view is to-one to-many.

In Step 187, a decision is made based upon the relation path determined in Step 186. If the cardinality of the relation path is to-one, a scalar report field may be created by selecting a field in the destination view, or creating an expression that references one or more fields, as shown in Step 191. If the cardinality of the relation path is to-many, an aggregate report field may be created by selecting or creating one or more fields whose base view is the last view of the relation path, as shown in Step 188, and specifying a function or expression for aggregating the values of the nested fields, as shown in Step 189. Such functions or expressions may be of various types. For example, a function may simply sum the values of a nested field. In the Northwind sample database, such a function might sum the shipping costs of all orders for a particular customer. According to one embodiment of the invention, in Step 192, a scalar field or expression from step 191, or a function or expression from Step 189 is added to a report definition. The field selection process as outlined in Steps 185 through 192 is repeated recursively until the report definition meets the requirements of a user, whether that user is a person or a process.

Figure 10B:
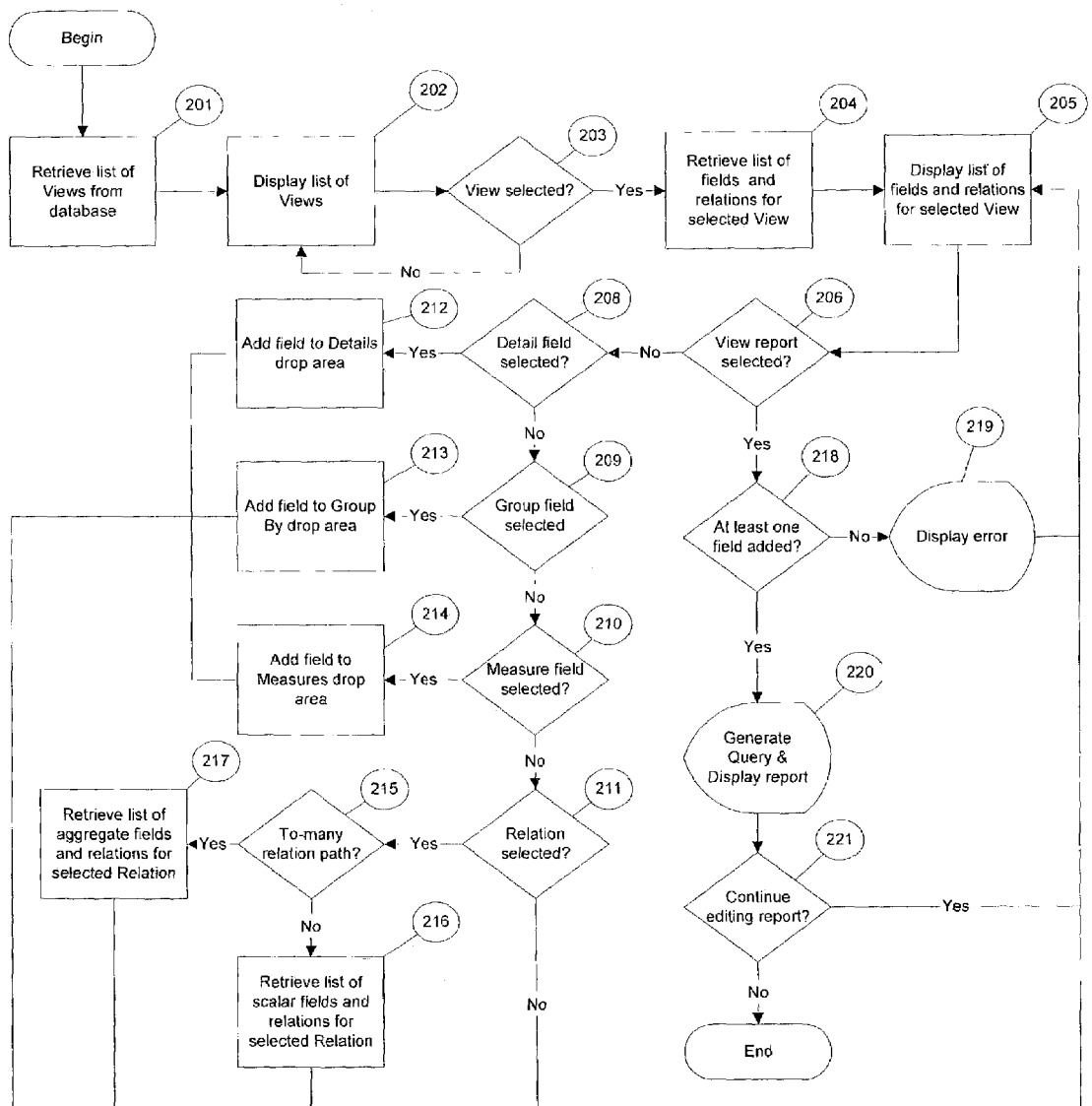
FIG. 10B is a logic flow diagram illustrating a method for displaying and creating queries according to an embodiment of the present invention.

FIG. 10B displays a flowchart detailing the steps of operation of a database entity-relationship grouping and display system according to one embodiment of the invention. In Step 201 an embodiment of the DQR Application 100 running on the Desktop Computer 1 requests a list of available databases and the list of metadata views identified in FIGS. 3A, 3B and 3C, from the Query Engine 200 running on the Application Server 2. The Query Engine 200 responds with the names of available databases and views, including the Northwind example database described in FIG. 2, and displays them through the Window 96A shown in FIG. 6.

In step 202, the DQR Application 100 displays the name of the Northwind database described in FIG. 2 and a list of the other available databases in the Look In Drop Down Box 120 on the Display Device 19. Step 202 also displays the metadata views described in FIGS. 3A, 3B and 3C in the View List Box 121 through the Window 96B shown in FIG. 6A.

In Step 203, a user sequentially selects the Employee View 49 from the View Group List 123 and the Finish Button 124, which causes the YES branch of Step 203 to be followed. If a user does not select a view, the NO branch of Step 203 is followed and the DQR Application 100 continues to display the Window 96B of FIG. 6A.

In Step 204, the DQR Application 100 requests the fields and relations listed in the Employee View 49 from the Query Engine 200. In Step 205, the DQR Application 100 then displays the list of fields and relations of the Employee View 49 on the Display Device 19, displaying the Window 130 described in FIG. 7.

In Step 206, the DQR Application 100 awaits user input in the form of selecting fields, such as those highlighted by the Balloon 147, or relations, such as those highlighted by Balloon 149, in FIG. 7. If the View Report Button 138 is selected, the YES branch of step 206 is followed to Step 218. If no fields have been added, the NO branch of Step 218 is followed to Step 219, an error is displayed directing the user to select at least one field, and the DQR Application 100 continues to display the list of fields and relations of the selected view, such as the Employee View 49. If the user selects a field or relation, the DQR Application 100 proceeds to Step 208.

In Step 208, the DQR Application 100 monitors detail field selections. If a user does not select a detail field, the DQR Application 100 continues through the NO branch to Step 209. If a user selects a detail field, the DQR Application 100 proceeds through the YES branch to Step 212. In Step 212, the DQR Application 100 adds the name of the selected field to the Details Drop Box Area 143, and continues to Step 205 to display the fields and relations associated with the selected view.

In Step 209, the DQR Application 100 monitors group field selections. If a user selects a group field, the DQR Application 100 proceeds through the YES branch to Step 213. If a user does not select a group field, the DQR Application 100 continues through the No branch to step 210.

In Step 210, the DQR Application 100 monitors measure field selections. If a user selects a measure field, the DQR Application 100 proceeds through the YES branch to Step 214. If a user does not select a measure field, the DQR Application 100 continues through the NO branch to Step 211.

In Step 211, the DQR Application 100 monitors the selection of relations. If a user selects a relation, the DQR Application 100 proceeds through the YES branch to Step 215. If a user does not select a relation, the DQR Application 100 continues through the NO branch to Step 205.

In Step 215, if the cardinality of the relation path ending with the selected relation is to-one, the DQR Application 100 follows the NO branch of Step 215 to Step 216. In Step 216, the DQR Application 100 retrieves the fields and relations associated with the followed relation and processing passes to Step 205. If the cardinality is to-many, the YES branch of Step 215 is followed to Step 217 where the DQR Application 100 limits retrieval of the fields associated with destination view to those fields that have a Field Type Property F07 (see FIG. 3D) set to "aggregate" and then processing is passed to Step 205. In this manner, the cardinality of the destination view relative to the base view constrains field selection. If the cardinality is to-many, only aggregated values associated with the destination view may be returned, thereby ensuring that each row returned by the DQR Application 100 represents exactly one row in the base view selected for the report.

In Step 218, if at least one field has been added to the report, the YES branch is followed to Step 220, where the DQR Application 100 verifies and generates a suitable database query and displays the report on the Display Device 19. In Step 221, if the Fields Button 134 is selected, the YES branch is followed to step 205. Otherwise the process terminates.

Figure 11A:
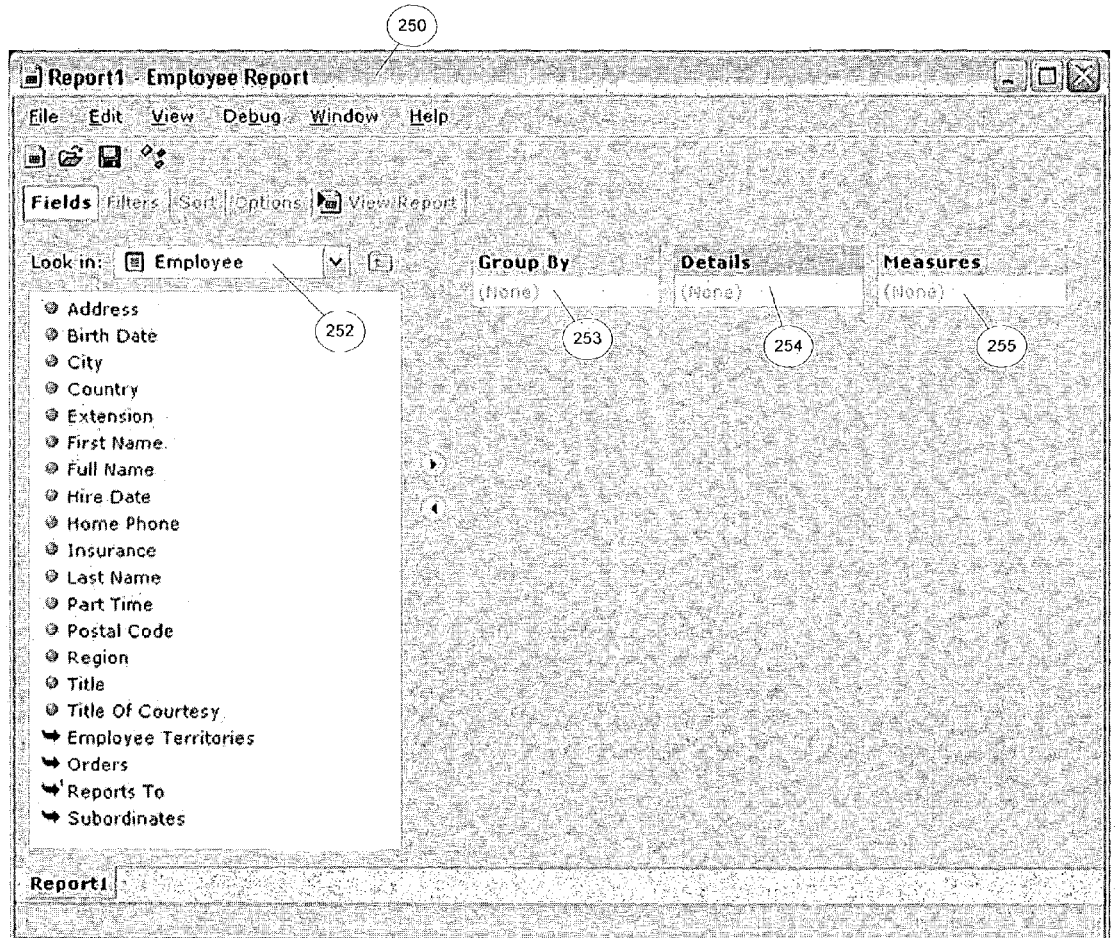
FIG. 11A is a window display and related XML snippet illustrating iterative generation of a report definition according to an embodiment of the present invention.

FIGS. 11A through 11J depict the iterative manner of query generation according to one embodiment of the present invention. In each case, a change of selected fields iteratively and automatically changes an XML file, which file contains one embodiment of a self-contained report definition of the present invention. FIG. 11A depicts a Window 250 and an XML Report Definition Table 251 according to one embodiment of the invention. The Window 250 illustrates the selection of the Employee view 49 in a Look In Box 252. The absence of any fields in a Group By Drop Area 253, a Details Drop Area 254 and a Measures Drop Area 255 of the Window 250 indicates that in the present example no fields have been selected. The XML Definition Table 251 was automatically generated by the DQR Application 100 upon selection of the Employee View 49. A baseViewID="Employee" XML Tag 252 specifies that the starting view of the report is the Employee View 49.

Figure 11B:
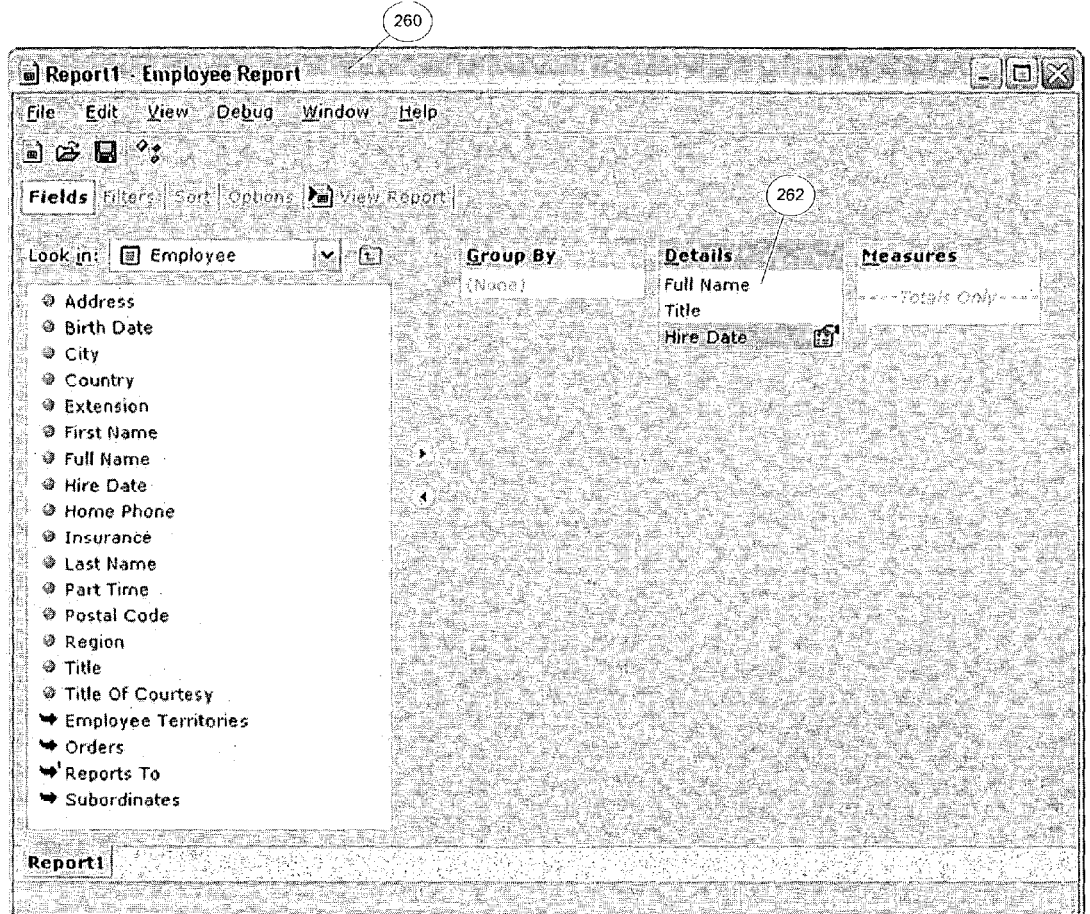
FIG. 11B is a window display and related XML snippet illustrating iterative addition of fields and corresponding generation of a report definition according to an embodiment of the present invention.

FIG. 11B depicts a Window 260 and an XML Report Definition Table 261. The Window 260 is an iteration of the Window 250. The XML Report Definition Table 261 is an iteration of the XML Report Definition Table 251. In the Window 260, the Full Name, Title and Hire Date fields of the Employee View 49 have been added to the Details Drop Area 262. A <detailFields> XML Tag 263 indicates the addition of the Full Name, Title and Hire Date fields of Employee View 49.

Figure 11C:
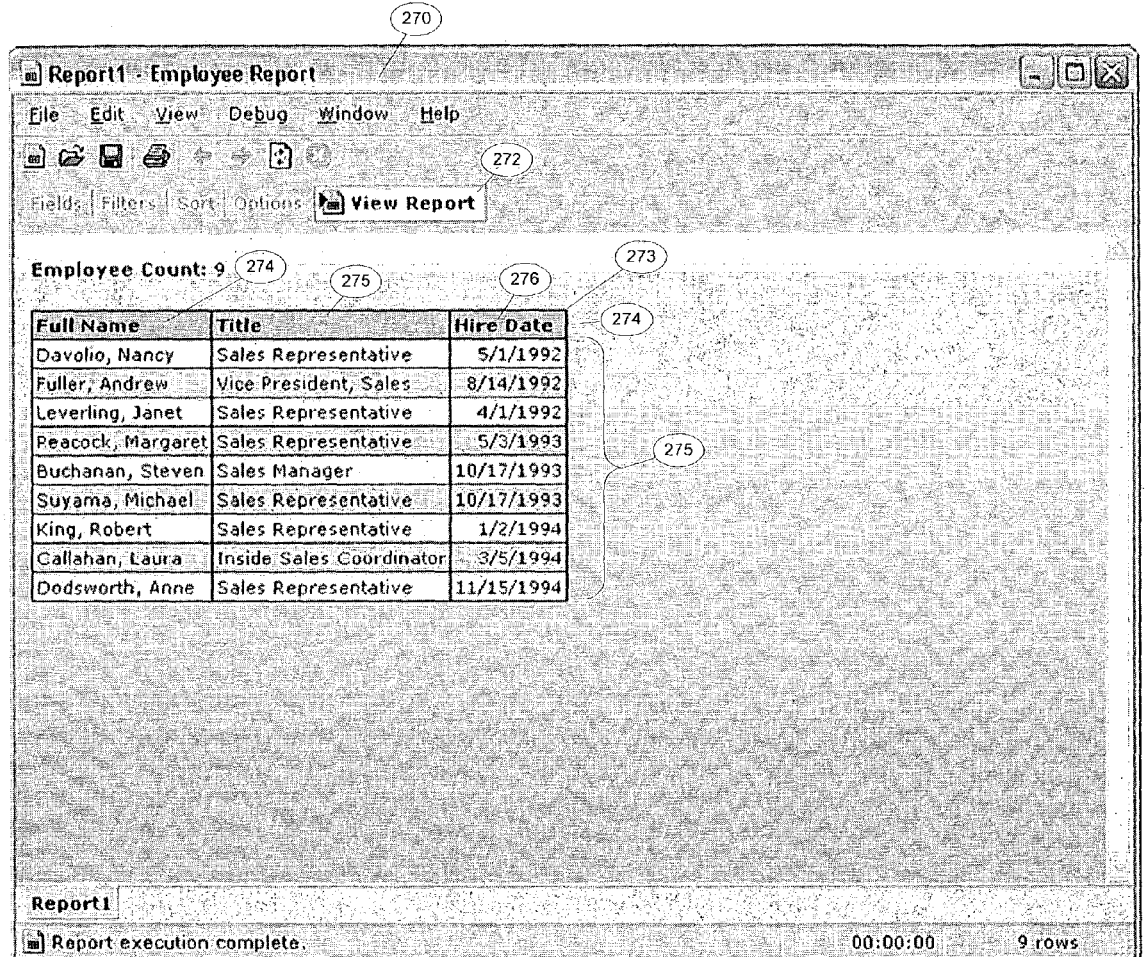
FIG. 11C is a display of a report and related structured query language (SQL) according to iterative report generation according to an embodiment of the present invention.

FIG. 11C includes a Window 270 and an SQL Query Table 271. The Window 270 results from user selection of a View Report Button 272 and the selections described with reference to FIG. 11B. The Window 270 includes a Report Table 273. The Report Table 273 includes a Header Row 274 and Several Data Rows 275. The table 273 is comprised of three columns, Columns 276, 277 and 278. Each of these Columns corresponds to the detail fields inserted in the <detailFields> XML Tag 263 as recorded in the XML Report Definition Table 261. The SQL Query Table 271 was derived from the XML Report Definition Table 261. One skilled in the art will readily recognize the syntax and structure of the SQL statements included in the SQL Query Table 271.

Figure 11D:
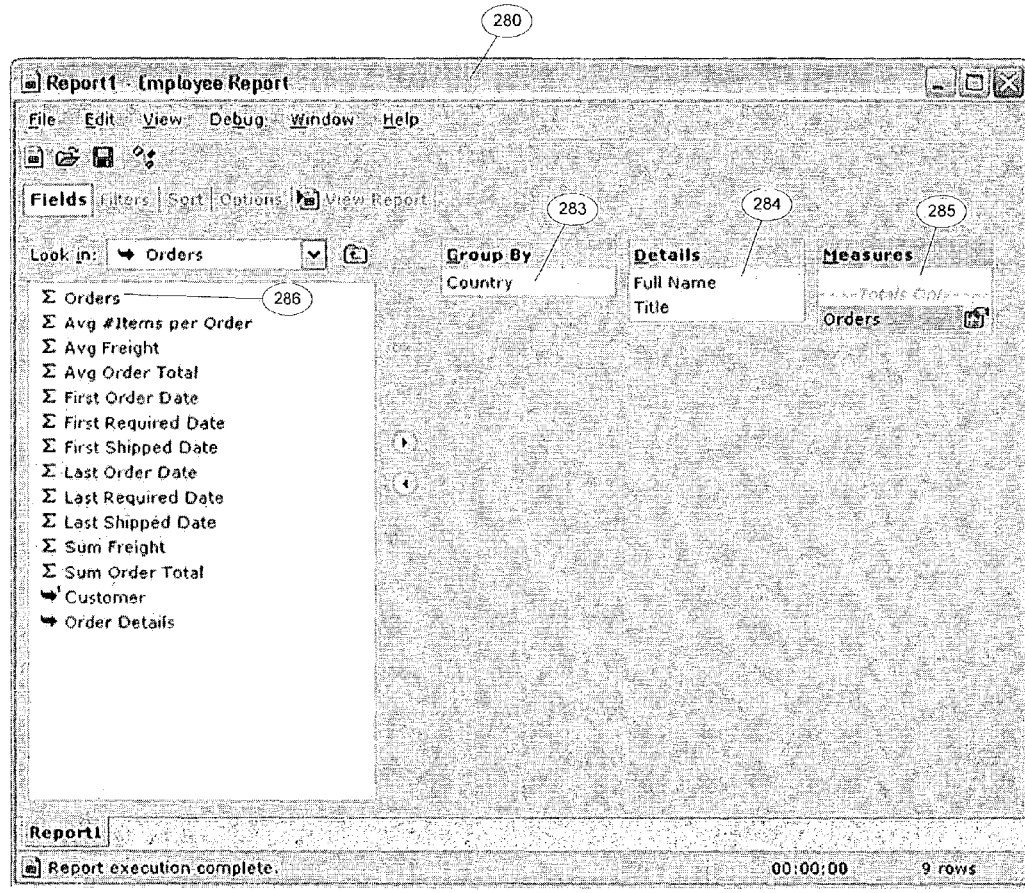
FIG. 11D is a display and related XML snippet illustrating the iterative addition of fields from a base view and related views according to an embodiment of the present invention.

FIG. 11D includes a Window 280 and an XML Report Definition Table 281. The Window 280 is an iteration of the Window 260. The XML Report Definition Table 281 is the corresponding iteration of the XML Report Definition Table 261. Several changes have been made between the Window 260 and the Window 280, including that the Hire Date field of the Employee View 49 has been removed firm a Details Drop Area 284, the default field for the Country relation of the Employee View 49 has been added to a Group By Drop Area 283, and the Orders relation of the Employee View 49 has been followed and the Orders Aggregation Field 286 of the Order View 47 has been added to a Measures Drop Area 285. These changes have caused several iterative changes to the XML Report Definition Table 281, including removal of the Hire Date field from an XML Detail Fields 287, addition of a new XML section, noted by a <groupFields> XML Tag 288 and addition of the default field of the Country relation of the Employee View 49 as a group, addition of a new XML section, noted by a <measureFields> XML Tag 289, and addition of the Orders Aggregation Field 286 of the Order View 47.

Figure 11E:
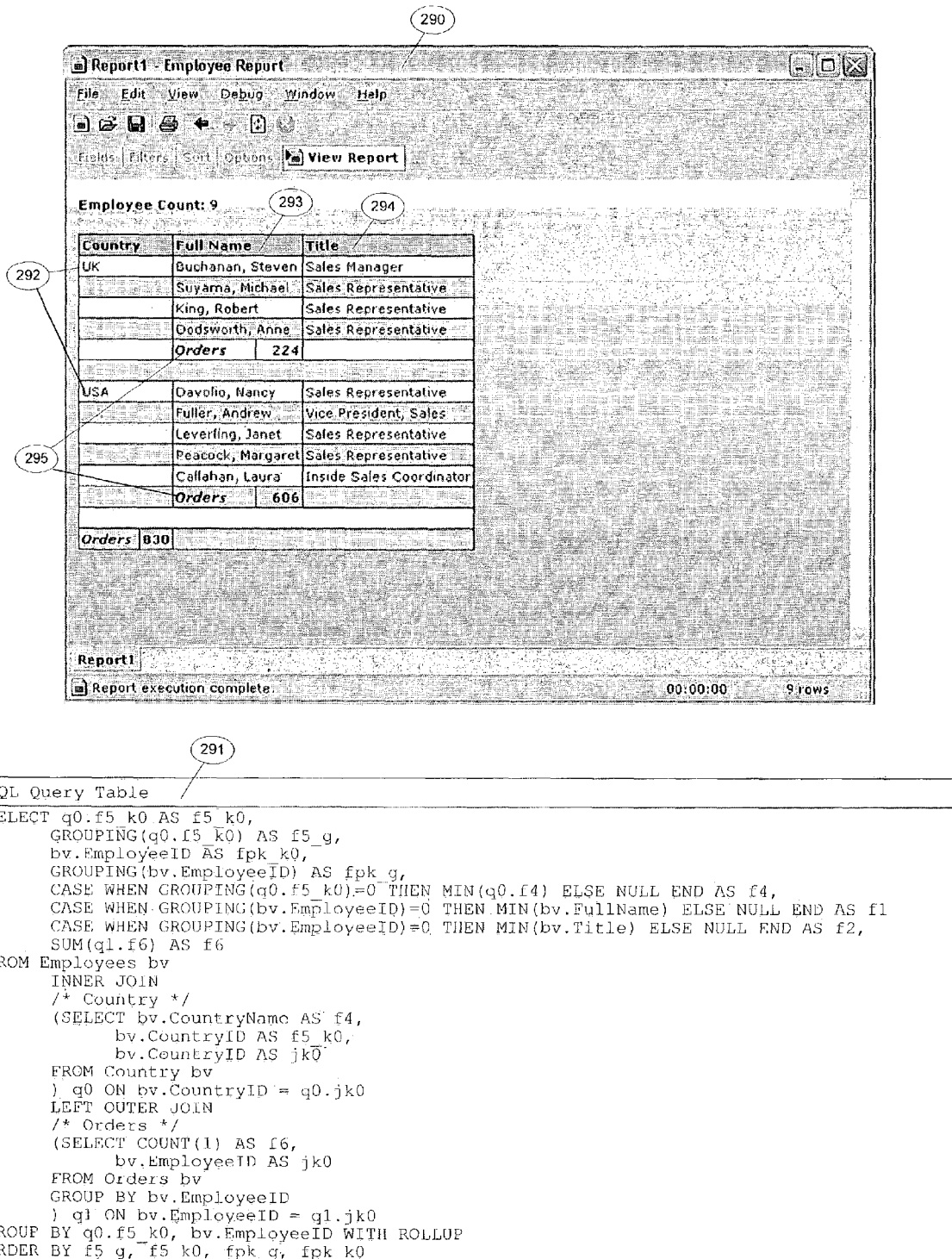
FIG. 11E is a display and related SQL query illustrating a report resulting from the iterative addition of fields from a base view and related views according to an embodiment of the present invention.

FIG. 11E includes a Window 290 and an SQL Query Table 291. The Window 290 results from conversion of the XML Report Definition Table 281 into SQL and execution of the query contained in the SQL Query Table 291. The resulting report depicted in the Window 290 includes a Full Name Column 293 and a Title Column 294. The Window 290 also illustrates a Country Group 292 and a Summary 295, which result from the Orders aggregation field of the Order View 47. One skilled in the art will recognize the SQL query included in the SQL Query Table 291.

Figure 12A:
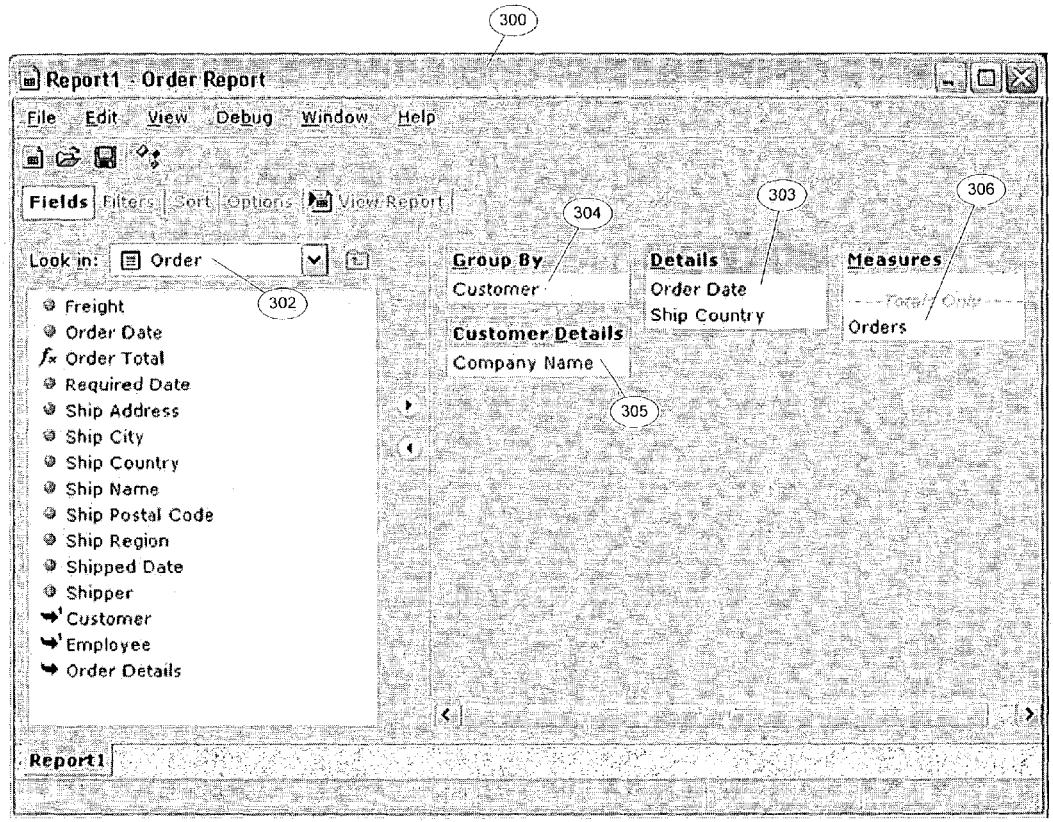
FIG. 12A is a display and related XML snippet illustrating the selection of fields prior to construction of a filter according to an embodiment of the present invention.

FIGS. 12A through 12D show windows and reports incorporating the use of filters for the present invention. FIG. 12A illustrates a Window 300 and an XML Report Definition Table 301. The Window 300 is an embodiment of the present invention based upon selecting the Order View 47. The Order Date field of the Order View 47 and the Country Name field of the Ship Country relation have been included in a Details Drop Area 303. The Orders aggregation field of the Order View 47 has been included in a Measures Drop Area 306. Based upon following the Customer Relation 48 of the Order View 47, the default field Company Name of the Customer View 40 has been included in a Group By Drop Area 305. The XML Report Definition Table 301 includes the iteratively created XML definition corresponding to the foregoing selections.

Figure 12B:
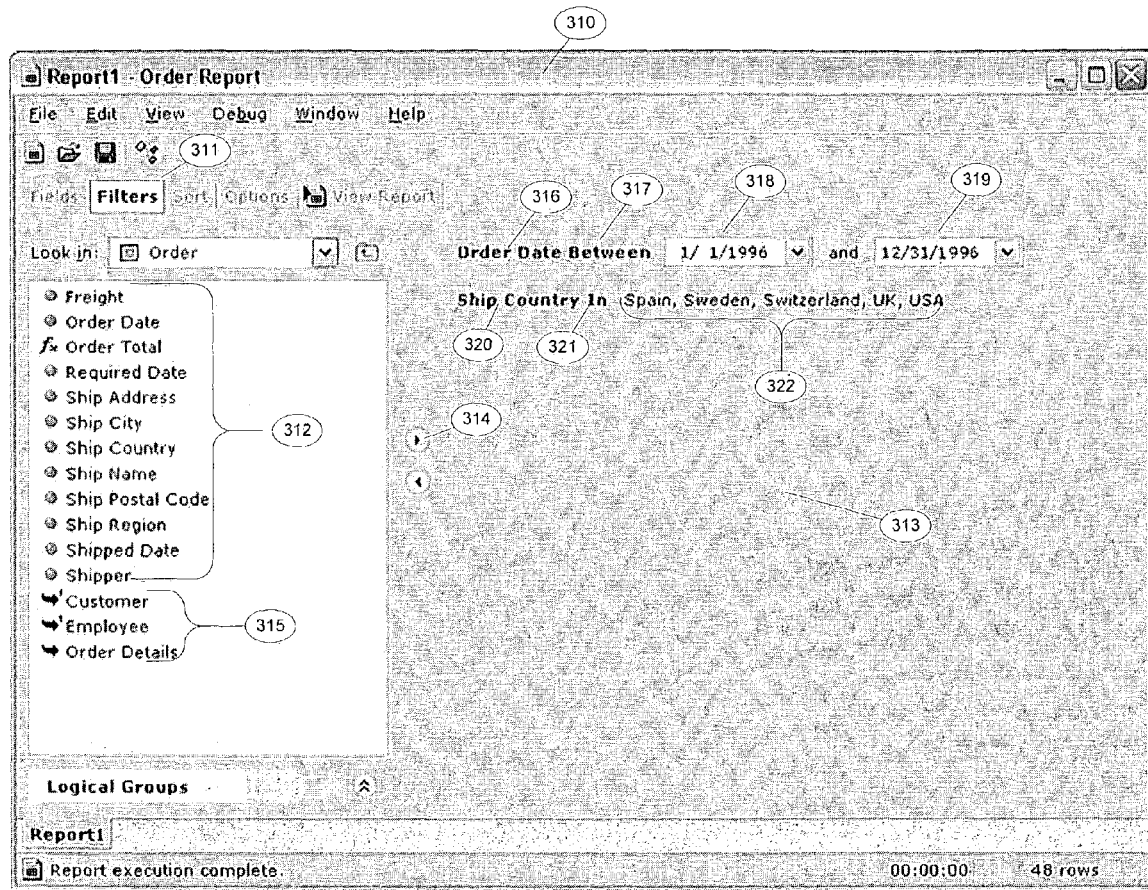
FIG. 12B is a display illustrating the construction of a filter according to an embodiment of the present invention.
Figure 12D:
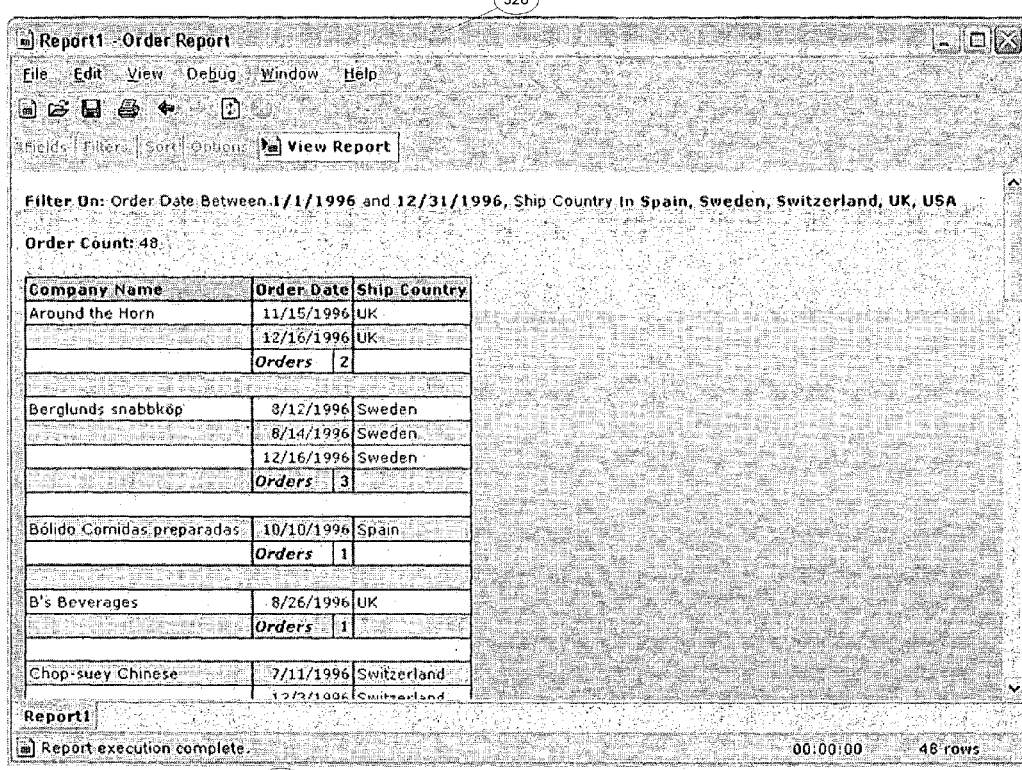
FIG. 12D is a display illustrating a report and the associated SQL query based upon a filter generated according to an embodiment of the present invention.

FIG. 12B depicts a Window 310, which discloses how the entity-relationship or hierarchical map may be used in the present invention to construct a report filter. The Window 310 results from user selection of a Filters Button 311. Fields from a List 312 may be selected by dragging and dropping field names to a Panel 313. Likewise, fields from the List 312 may be selected by double-clicking or by selecting a Button 314. Relations from a List 315 may also be followed, leading to other fields that may be selected similarly. As presented, the Panel 313 illustrates the selection of an Order Date Field 316 and a Ship Country Field 320. The Order Date Field 316 is connected to a Drop Down Box 318 by a Between Operator 317. Several other operators are available for filters, including "Equals," "Greater than," "Less than," "Greater than or equal to," "Less than or equal to," "In" and "Not." Coupled with the Between Operator 317, Drop Down Boxes 318 and 319 indicate that the current query will return only records with the Order Date 316 between Jan. 1, 1996 and Dec. 31, 1996. The Ship Country Field 320 is connected to a Country List 322 by an In Operator 321, disclosing that the current query will return only records having a value of Ship Country equal to the list of countries in the Country List 322. An XML Report Definition Table 324 depicted in FIG. 12C results iteratively from the selections described with reference to the windows shown in FIGS. 12A and 12B. FIG. 12D contains a Report Window 326 and an SQL Query Table 328, both of which result from execution of the query disclosed in FIG. 12C.

FIGS. 13A through 13I show windows and queries for advanced filter options according to the present invention. Heretofore, users have been subjected to extremely complex scripting languages or notational Boolean logic elements to build advanced queries. The present invention provides a simplified filter display and creation system.

Figure 13A:
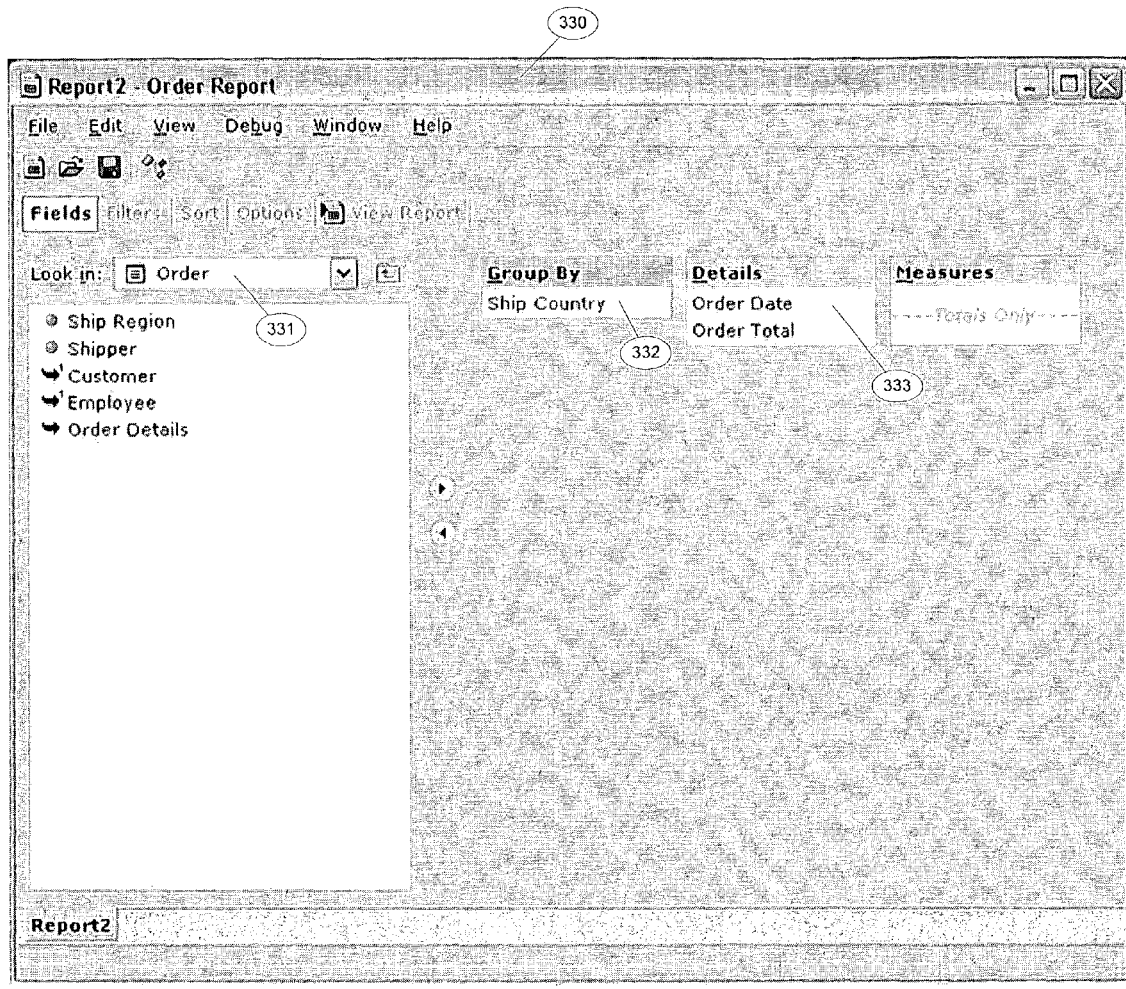
FIG. 13A is a display illustrating the iterative generation of an advanced filter according to an embodiment of the present invention.

FIG. 13A illustrates a Window 330 according to one embodiment of the present invention. According to a Look In Drop Down box 331 of window 330, the Order View 47 has been selected as the base view. The Ship Country field of the Order View 47 has been selected as a group field and is displayed in a Group By Drop Area 332. The Order Date and Order Total fields of the Order View 47 have been selected as columns and are displayed in a Details Drop Area 333.

Figure 13B:
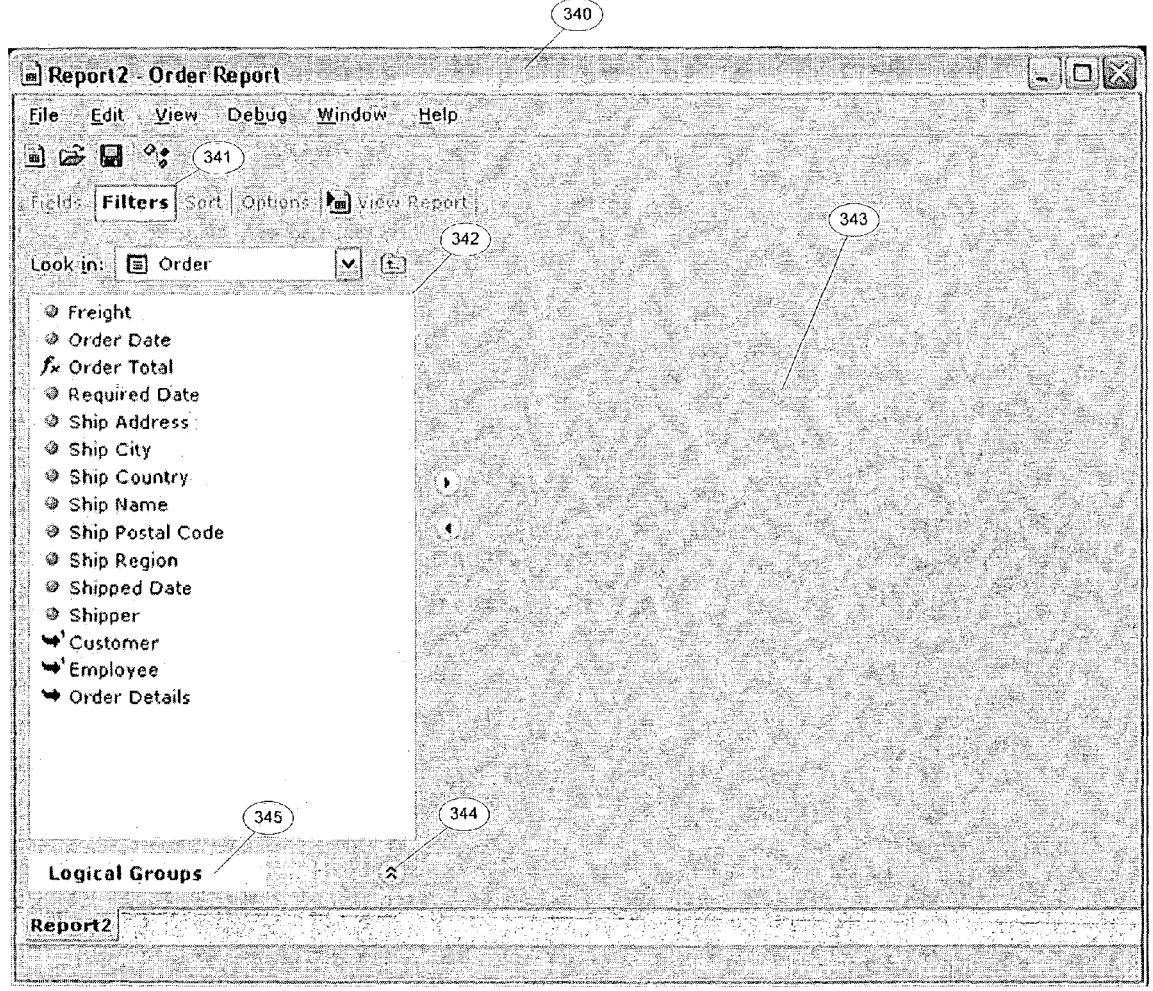
FIG. 13B is a display illustrating an exemplary filter construction window according to an embodiment of the present invention.

FIG. 13B illustrates a Window 340, an iteration of the Window 300 caused by selection of a Filters Button 31. The Window 340 represents an embodiment of the main filter display and generation window of the present invention. The Window 340 includes a Display Box 342, which contains a listing of fields and relations according to the Order View 47, which is the base view. The Window 340 also includes Blank Panel 343, which is a panel used for displaying filters upon creation and manipulation. The Window 340 also includes an Expand Button 344, which is used to expand filter options based upon logical groups, as denoted by a Display Box 345.

Figure 13C:
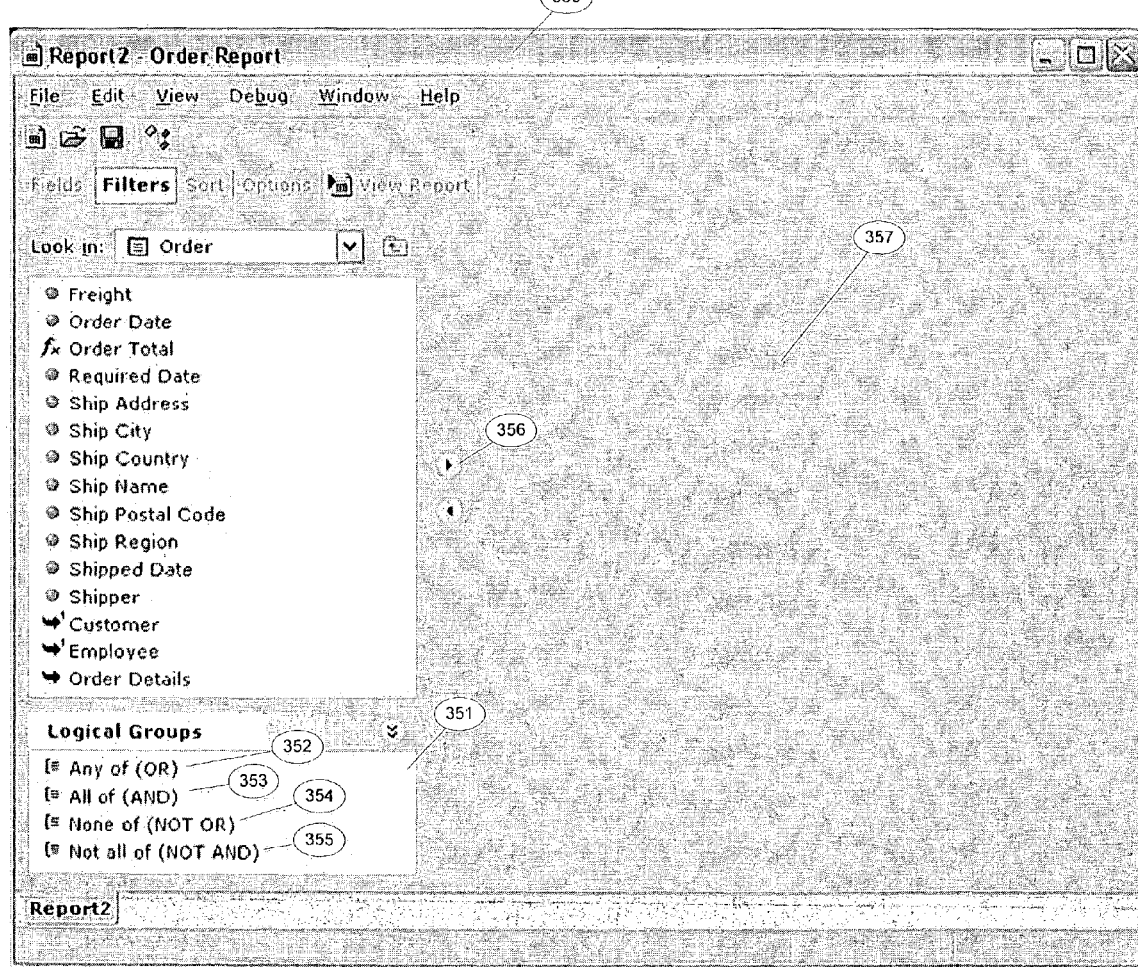
FIG. 13C is a display illustrating a filter construction window containing advanced logical elements according to an embodiment of the present invention.

FIG. 13C illustrates a Window 350, which results from selection of the Expand Button 344 of Window 340. The Window 350 includes a Logical Groups Box 351, which contains four logical elements, numbered 352 through 355. A Logical Element (Any of (OR)) 352 is useful for building filters according to a Boolean OR. A Logical Element (All of (AND)) 353 is useful for building filters according a Boolean AND. A Logical Element (None of (NOT OR)) 354 is useful for building filters according a Boolean NOR. A Logical Element (Not all of (NOT AND)) 355 is useful for building filters according a Boolean NAND. One skilled in the art will recognize that logical elements could be incorporated into Window 350 to cover the other cases of Boolean logic. Such logical elements can be selected by double-clicking or dragging and dropping the logical element on a Blank Panel 357. Alternatively, a logical element may be selected by left-clicking-on the logical element and a Selection Button 356.

Figure 13D:
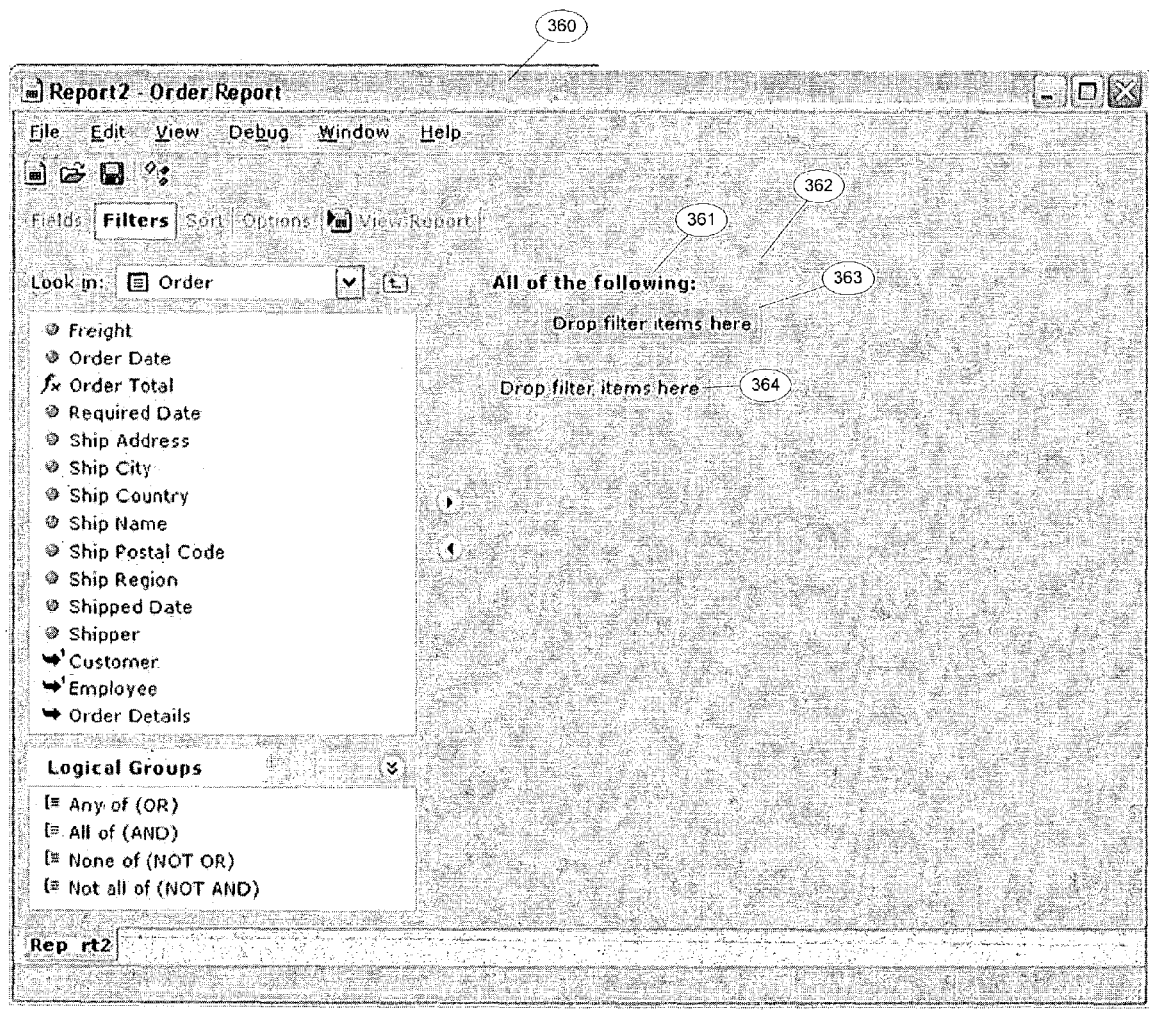
FIG. 13D is a display illustrating a construction window containing a Boolean AND logical grouping and associated drop area according to an embodiment of the present invention.

As depicted in FIG. 13D. A Window 360 illustrates the addition of the All of (AND) Logical Element 353 from Window 350. Upon selection, a Text Box 361 is displayed on a Panel 362. In addition, an Indented Drop Area 363 appears, indicating that fields may be dropped there to build a filter group. A Drop Area 364 also appears, indicating that additional filter groups or items may be added at the top level.

Figure 13E:
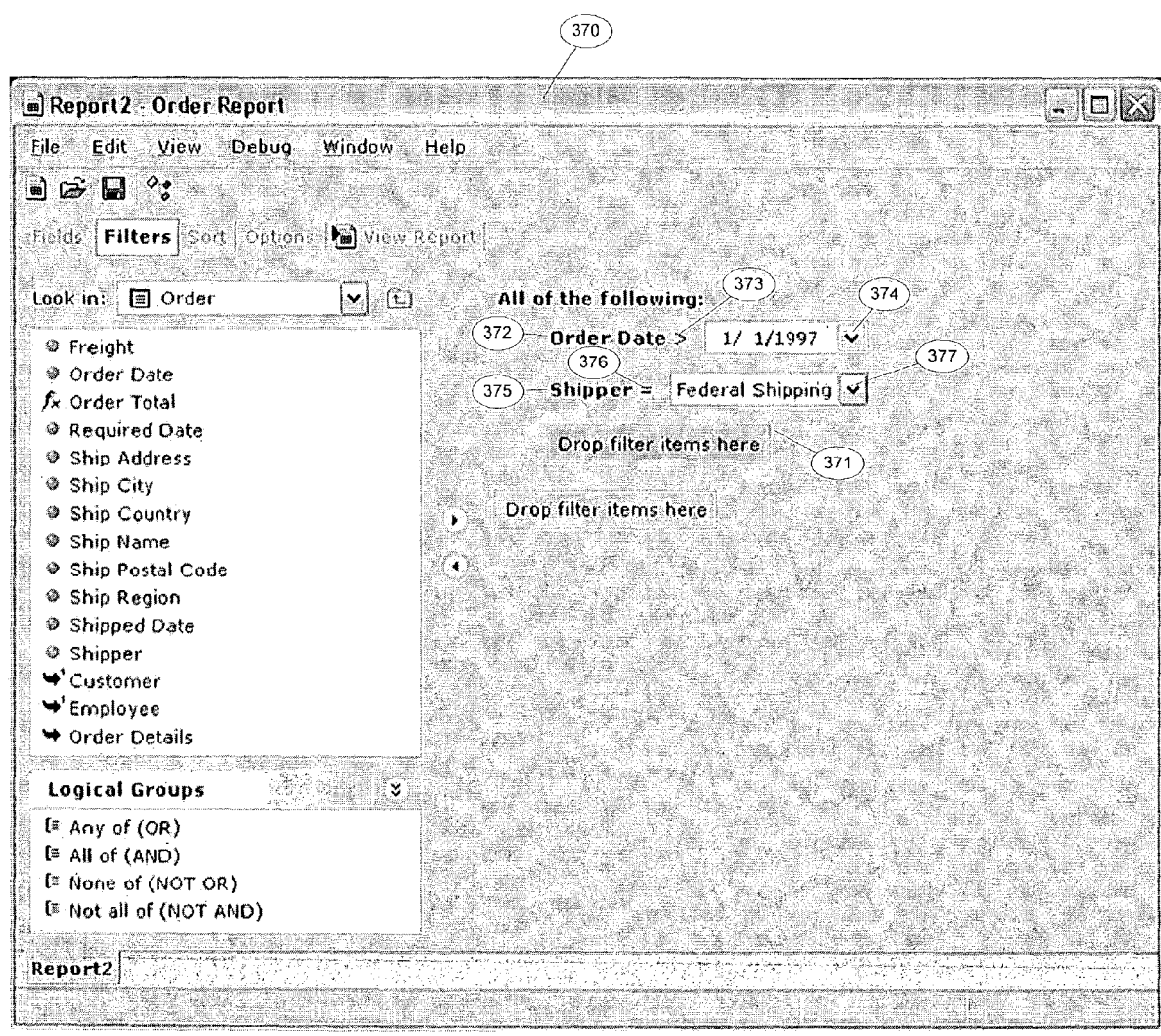
FIG. 13E is display illustrating advanced filter development with associated fields, operators and selection elements according to an embodiment of the present invention.

A Window 370, depicted in FIG. 13E, illustrates the addition of the Order Date and Shipper fields of the Order View 47 to the Window 360. As fields are added to the Indented Drop Area 363, fields, operators and applicable window elements displace the Drop Box, and the DQR Application 100 displays another Drop Box 371 indicating that additional fields may be added. In the Window 370 the Order Date field 372 is followed by a Greater Than Operator 373, which is aligned with a Calendar Drop Down Box 374. Selecting the Calendar Drop Down Box 374 causes the DQR Application 100 to display a standard monthly calendar for date selection. Likewise, a Shipper Field 375 is followed by an Equals Operator 376 that is aligned with a Drop Down Box 377. Selecting the Drop Down Box 377 causes the DQR Application 100 to retrieve and display the list of Shippers from the Shippers Database Table 32.

Figure 13F:
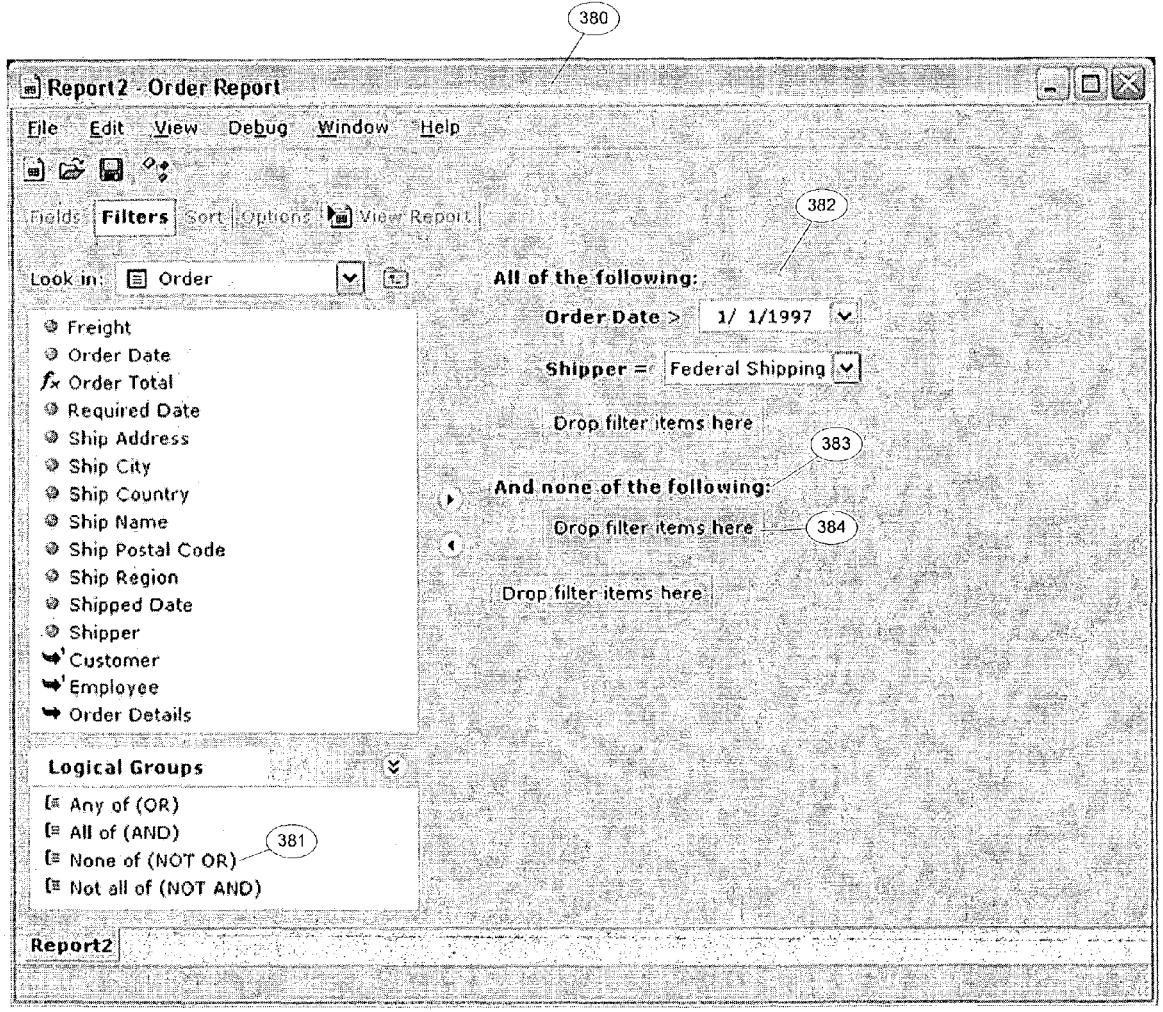
FIG. 13F is a display illustrating a construction window containing both Boolean AND and Boolean NOT OR logical groupings and associated drop areas according to an embodiment of the present invention.

As depicted in FIG. 13F, a Window 380 shows the result of the addition of an additional logical element to the Window 370. In this case, a None of (NOT OR) Logical Element 381 has been selected. Upon selection, text 383 is added to a Panel 382 and a Drop Area 384 is displayed.

Figure 13G:
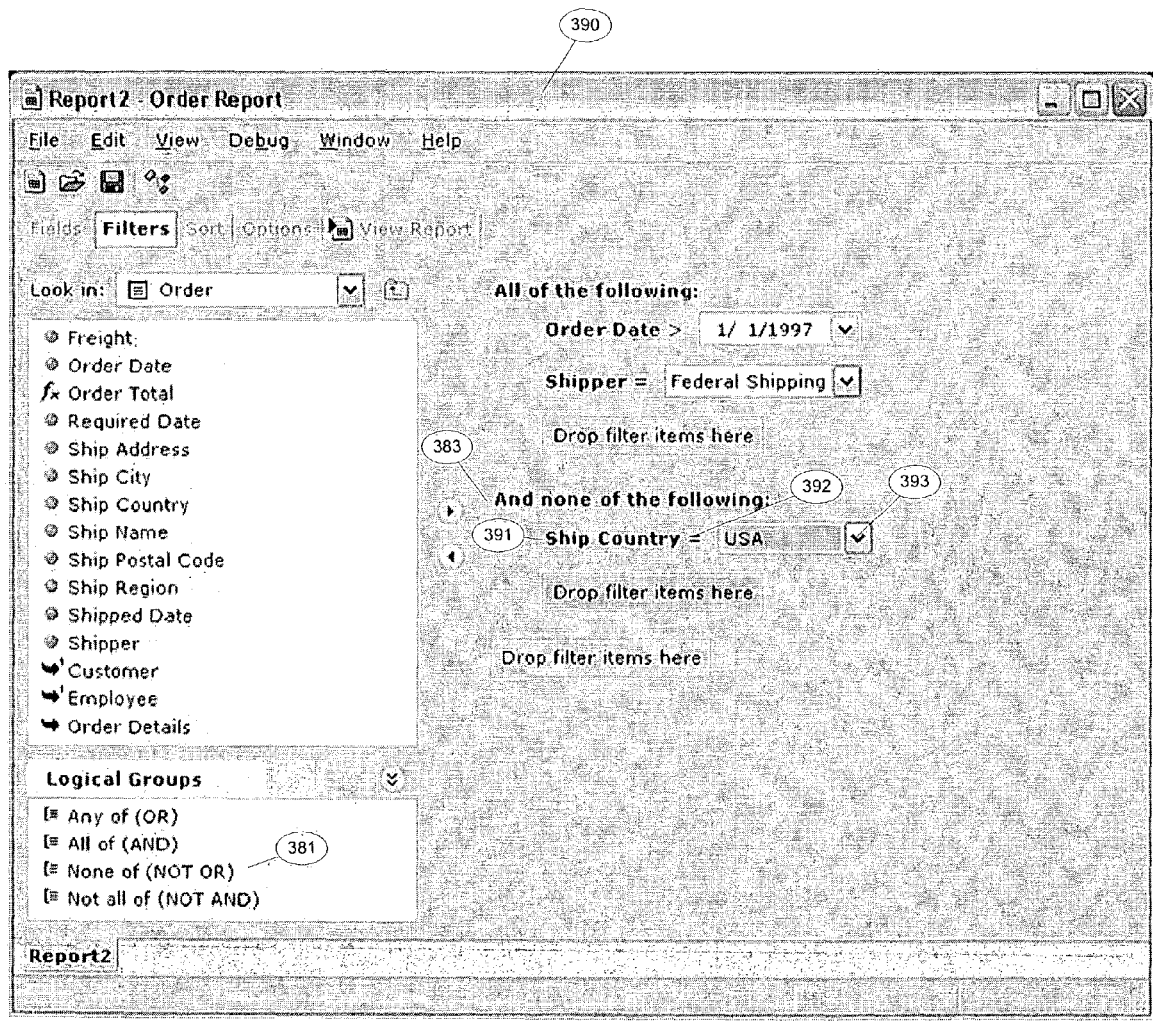
FIG. 13G is a display illustrating the addition of data elements to an advanced filter generation window according to an embodiment of the present invention.

Upon the addition of a field to the None of (NOT OR) Logical Element 381 of the Window 380, a Window 390 is generated as depicted in FIG. 13G. According to the present embodiment of the invention, a Ship Country Field 391 appears below the None of (NOT OR) Logical Element 383. The Ship Country Field 391 is also followed by an Equals Operator 392, which in turn is followed by a Drop Down Box 393. The Drop down box is linked to the Country table of the Northwind database shown in FIG. 2. In the present case, USA appears selected in the Drop Down Box 393. As depicted in the Window 390, the constructed query would return all records in the Orders Table 34 of FIG. 2 that were shipped outside of the United States using Federal Shipping after 1996.

Figure 13H:
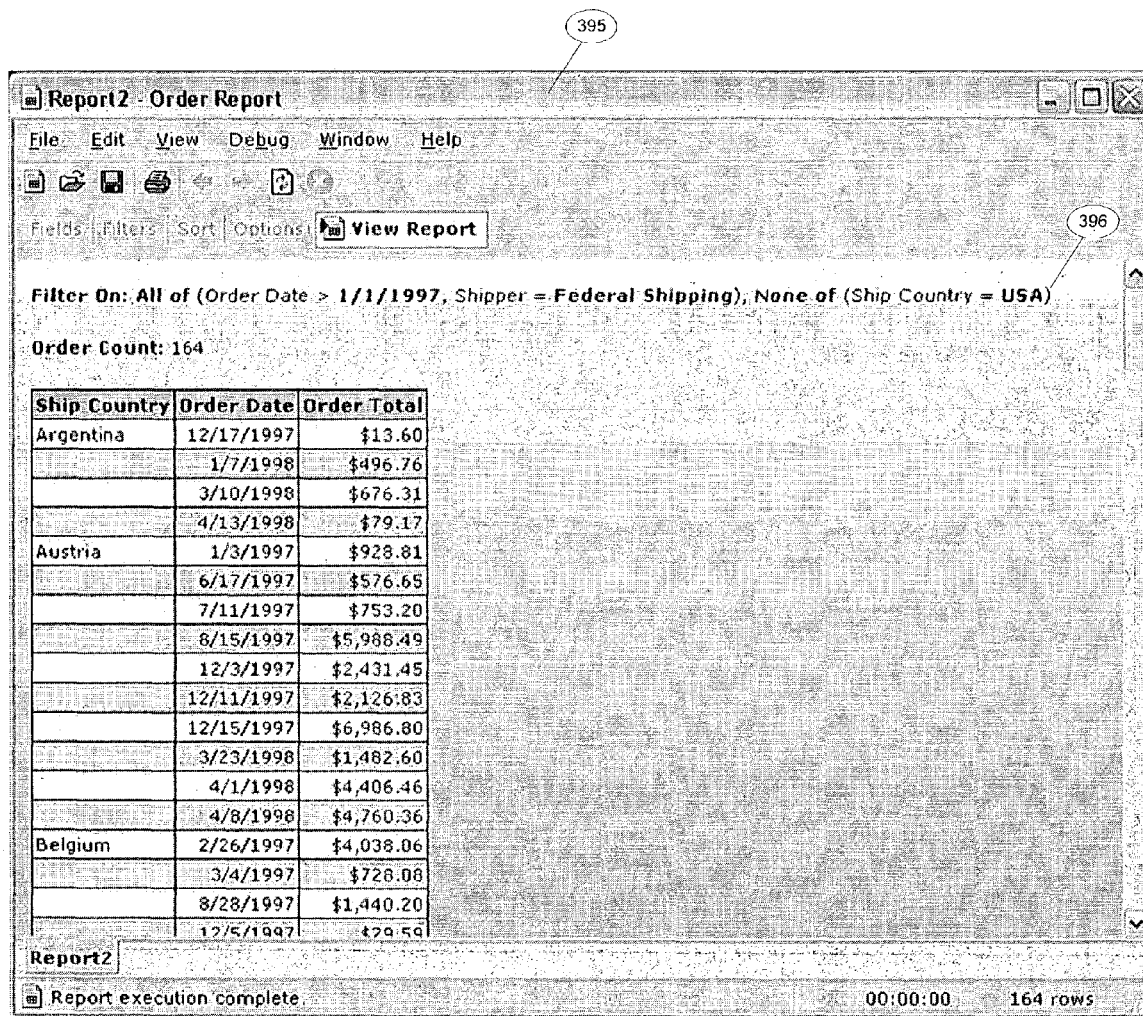
FIG. 13H is a display illustrating a report based upon a query incorporating advanced filters according to an embodiment of the present invention.

A Window 395 depicted in FIG. 13H illustrates the results of running the query created in FIGS. 13A through 13G. Note that the filter constructed in FIGS. 13A through 13G is displayed in the Window area 396.

FIG. 13I illustrates the XML report definitions and SQL query generated by the DQR Application 100 in response to the steps depicted and explained with reference to FIGS. 13A through 13G. Section 398 has been added to the XML report definition to define the report filter.

FIGS. 14A through 14F show windows and queries for building subfilters according to one embodiment of the present invention. According to the present invention, subfilters provide a means of filtering the rows that contribute to an aggregated value.

Figure 14A:
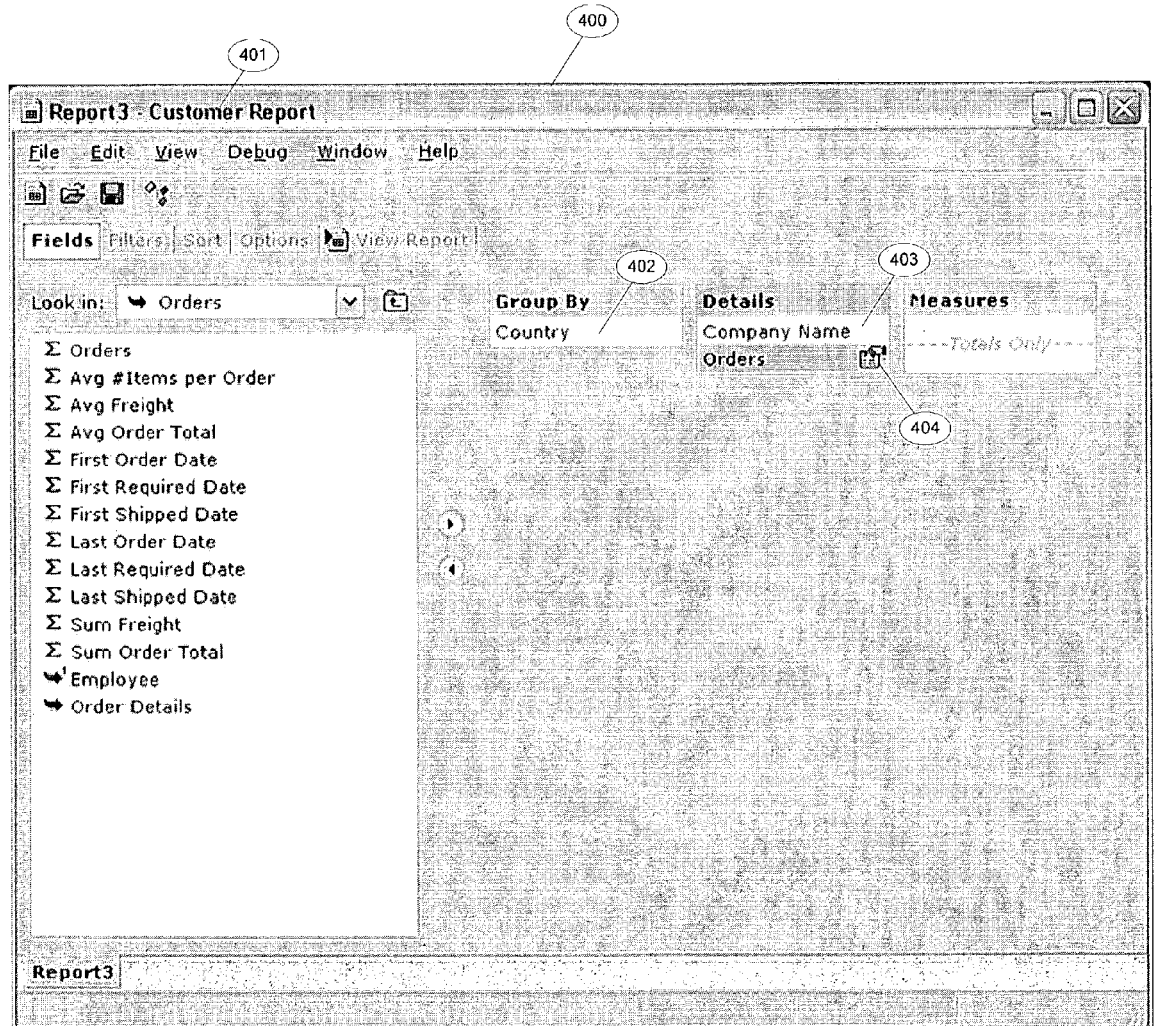
FIG. 14A is a window illustrating a method of incorporating subfilters into a report according to an embodiment of the present invention.

FIG. 14A illustrates a Window 400 of an embodiment of the DQR Application 100. In the Window 400, a report has been set up that is based on the Customer View 40, as noted in a Window Title Block 401, which will be grouped on a Country Field 402 and will display columns for a Company Name 403 and Orders 403. Note that Orders 403 is based upon following the Orders Relation 46 of the Customer View 40, which includes by default the Orders aggregation field of the Order View 47. If a report were run based upon the situation shown in the Window 400, all customers contained in the Customers Table 37 would be returned, and each customer would occupy a single row in the report. The resulting report would include 3 columns, one for the group by value of Country, and two detail columns, one containing the results of retrieving the CompanyName field of the Customers Table 37 and one containing the count of all orders contained in the Orders Table 34 associated with each customer. Note that an Icon 404 indicates that properties may be set for the associated field, in this case the Orders aggregation field.

FIG. 14B depicts a Window 405 that results from selecting the Icon 404 of the Window 400. The Window 405 includes several elements, including a General Tab 406 and a Filters Tab 407. The General Tab 406 displays a Name Label 408 that is followed by a Text Box 409. The text Box 409 contains the name of the column as it will appear in a report and can be modified by the user. In the present case, the Text Box 409 contains "Orders." The General Tab 406 also contains a Description Label 410 and a Text Box 411. The Text Box 411 contains text that typically gives a description of what the associated field contains. In the embodiment depicted in FIG. 14B, the Text Box 411 describes that the Orders aggregation field of the Order View 47 contains the number or count of orders associated with a customer. The Window 405 also includes a Save As Button 412 and a Close Button 413. Selection of the Save As Button 412 causes the DQR Application 100 to save the current field as a persistent object that can be reused in this or other reports. The Close Button 413 causes the Window 405 to close and return to the Window 400. When the Close Button 413 is selected any changes made to field properties are maintained for the current report only.

A Window 415 shown in FIG. 14B displays the window elements associated with selecting the Filters Tab 407 of the Window 405. The Window 415 displays a Text Label 416, which illustrates the currently selected Orders field, a Filter Operator 417, which illustrates an In Hotlink 417 as the filter operator, and a Text Label 418, which indicates that it can be selected as a means of building a subfilter. A subfilter can be constructed according to the present window because the Orders field is an aggregation field of the Orders Relation 46, which relation defines a one-to-many relationship from the Customer View 40 to the Order View 47. Subfilters are meaningful only where a relationship is to-many and an aggregate field is thus required.

Figure 14C:
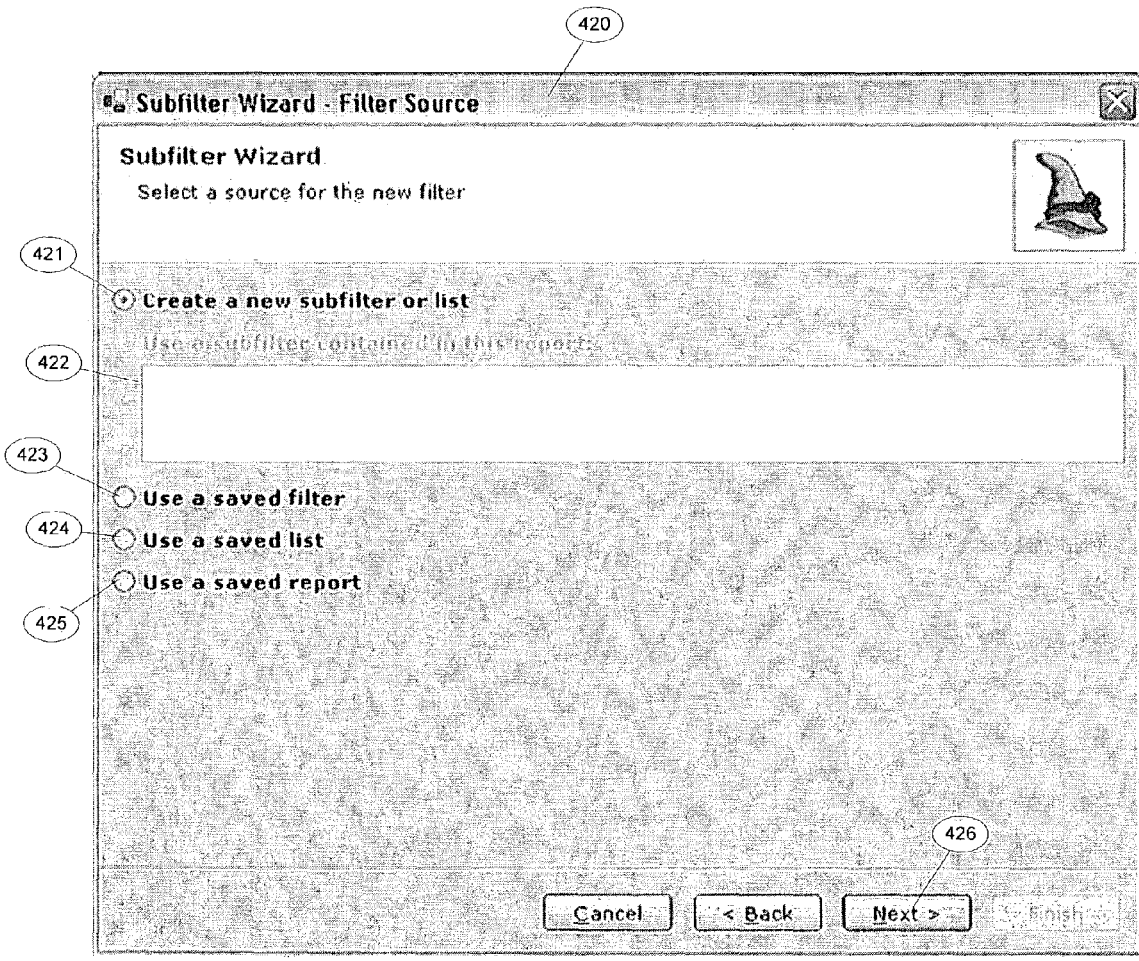
FIG. 14C is a window illustrating various user options for defining subfilters according to an embodiment of the present invention.

A Window 420 shown in FIG. 14C depicts a subfilter wizard useful for building subfilters. This Window 420 results from selecting the Text Label 418 shown on the Window 415. The Window 420 includes several window elements. Window Element 421 is a radio box that permits the user to create a new subfilter. Window Element 422 is a list box that contains any subfilters previously defined during the report development session. Window Element 423 is a radio button that permits a user to select a previously defined and saved Order subfilter. Window Elements 424 and 425 permit a user to use a previously saved Order list or report as a subfilter. Window Element 426 is a button that permits the user to proceed to the next step in creating a subfilter.

Figure 14D:
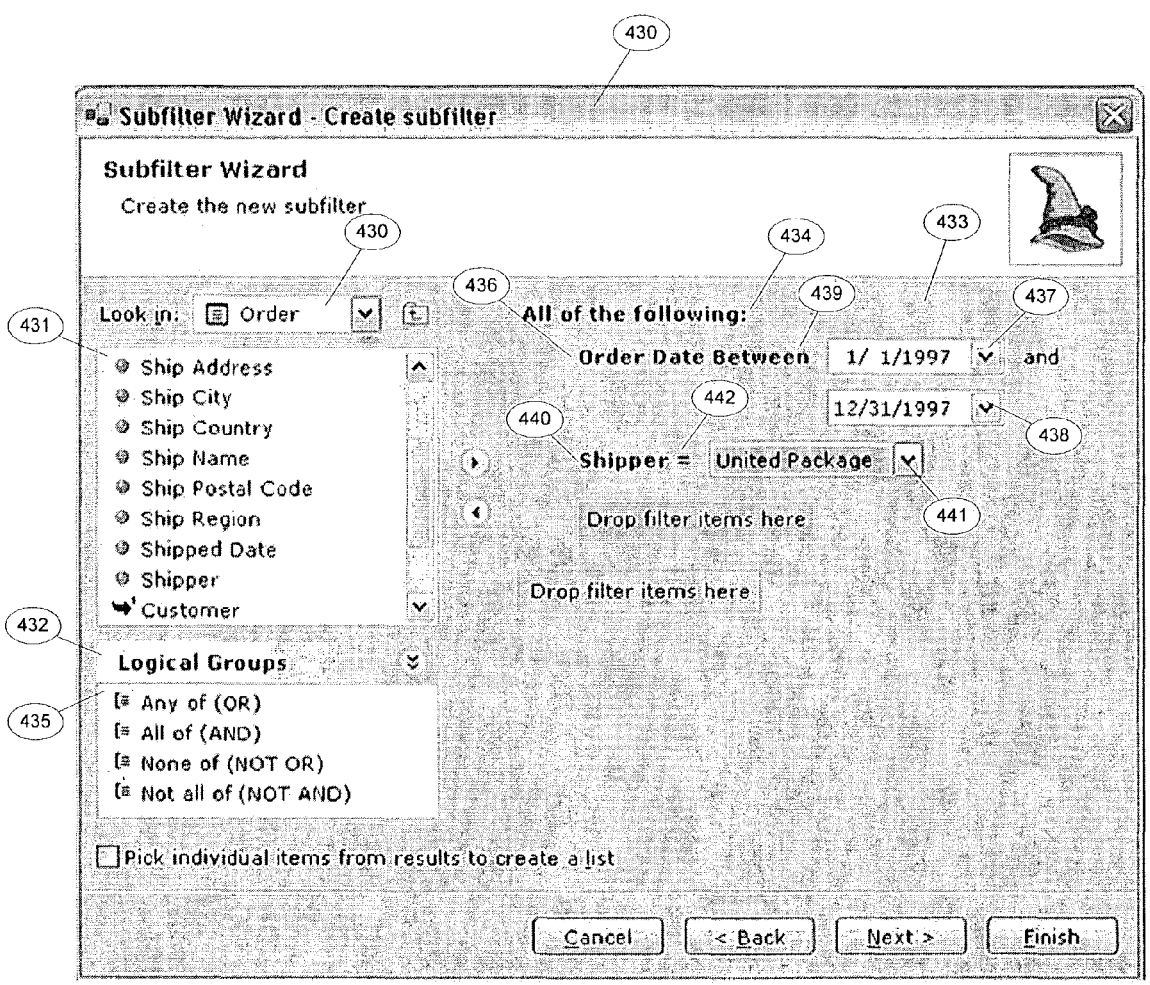
FIG. 14D is a window illustrating definition of subfilters according to an embodiment of the present invention.

A Window 430 shown in FIG. 14D illustrates the results of first selecting the Window Element 421 and then the Window Element 426 of the Window 420 (see FIG. 14C) and then creating a subfilter. The Window 430 includes several familiar window elements. The Window Element 430 includes a List 431 that includes the fields and relations associated with the Order View 47. A Window Element 432 includes the logical elements discussed in connection with FIG. 13C. A Window Panel 433 includes a Label 434 that results from selecting a Logical Group 435. An Order Date Label 436 representing the Order Date field associated with the Order View 47 has been added to the Logical Filter 434. The Order Date Label 436 is connected to Calendar Drop Down Boxes 437 and 438 by a Between Operator 439. A Shipper Label 440 has been added to the Logical Group 434 and is connected to a Drop Down Box 441 by an Equals Operator 442. As demonstrated by comparison of FIGS. 14A and 14D, when a subfilter has been created and incorporated into a report, an embodiment of the present invention will return a three column report of all customers, including a column showing the number of orders each customer placed in 1997 that were shipped using United Package.

Window 450 shown in FIG. 14E illustrates the results of running the query generated by the selections made in the process described with reference to in FIGS. 14A through 14D. FIGS. 14F and 14G disclose the resulting XML report definition and SQL query generated by the DQR Application 100 in creating the report displayed on the Window 450.

The process of an automatic drill through according to one embodiment of the present invention is depicted in FIGS. 15A through 15H. Drill through is displaying a report containing the row or rows represented by a field value in the results of another report. The base view concept of the present invention allows drill through reports to be created automatically, using the relation path of the field and any applicable filters, including the report filter, group value filters, and aggregate subfilters as necessary.

Figure 15A:
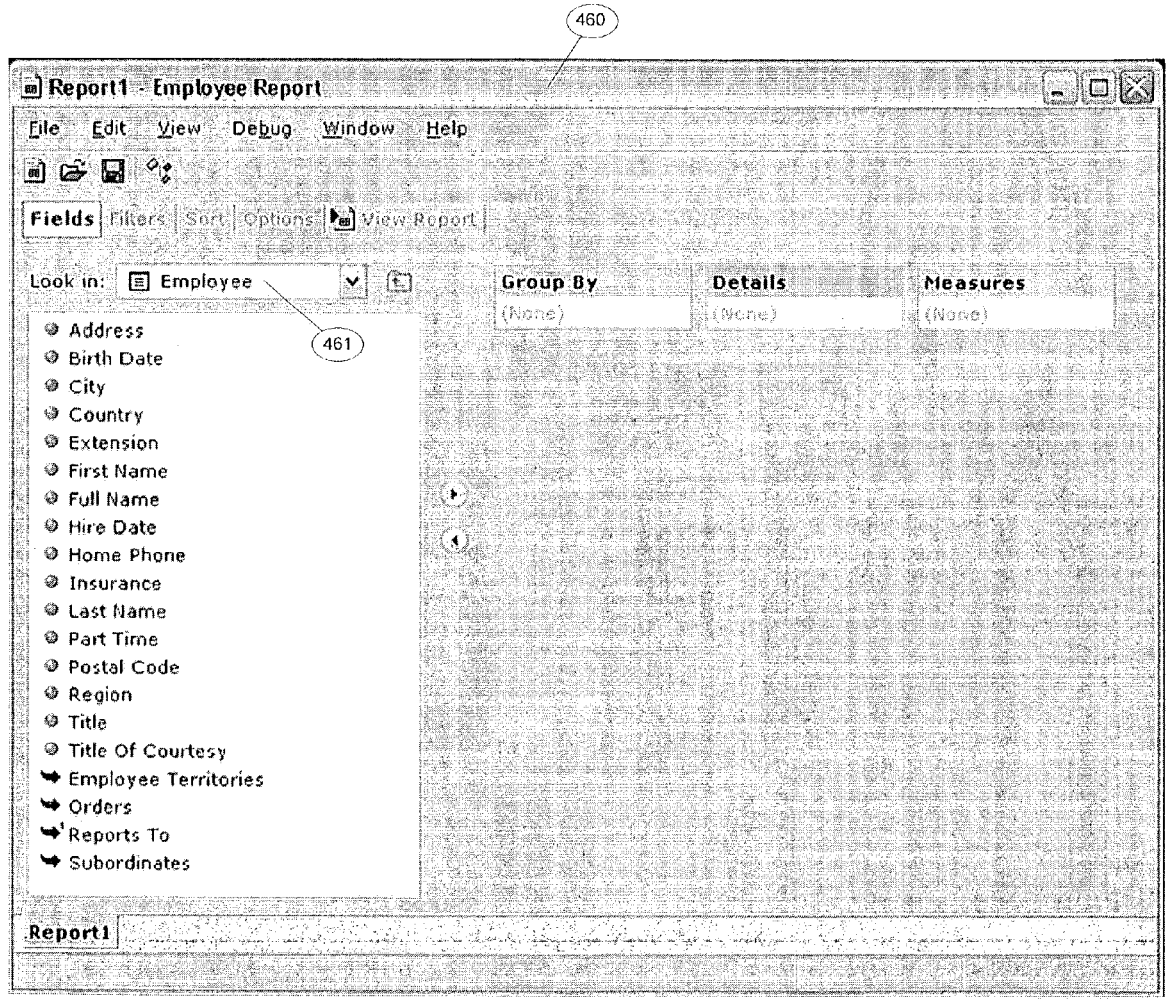
FIG. 15A is a window illustrating iterative development of a drill through report according to an embodiment of the present invention.
Figure 15B:
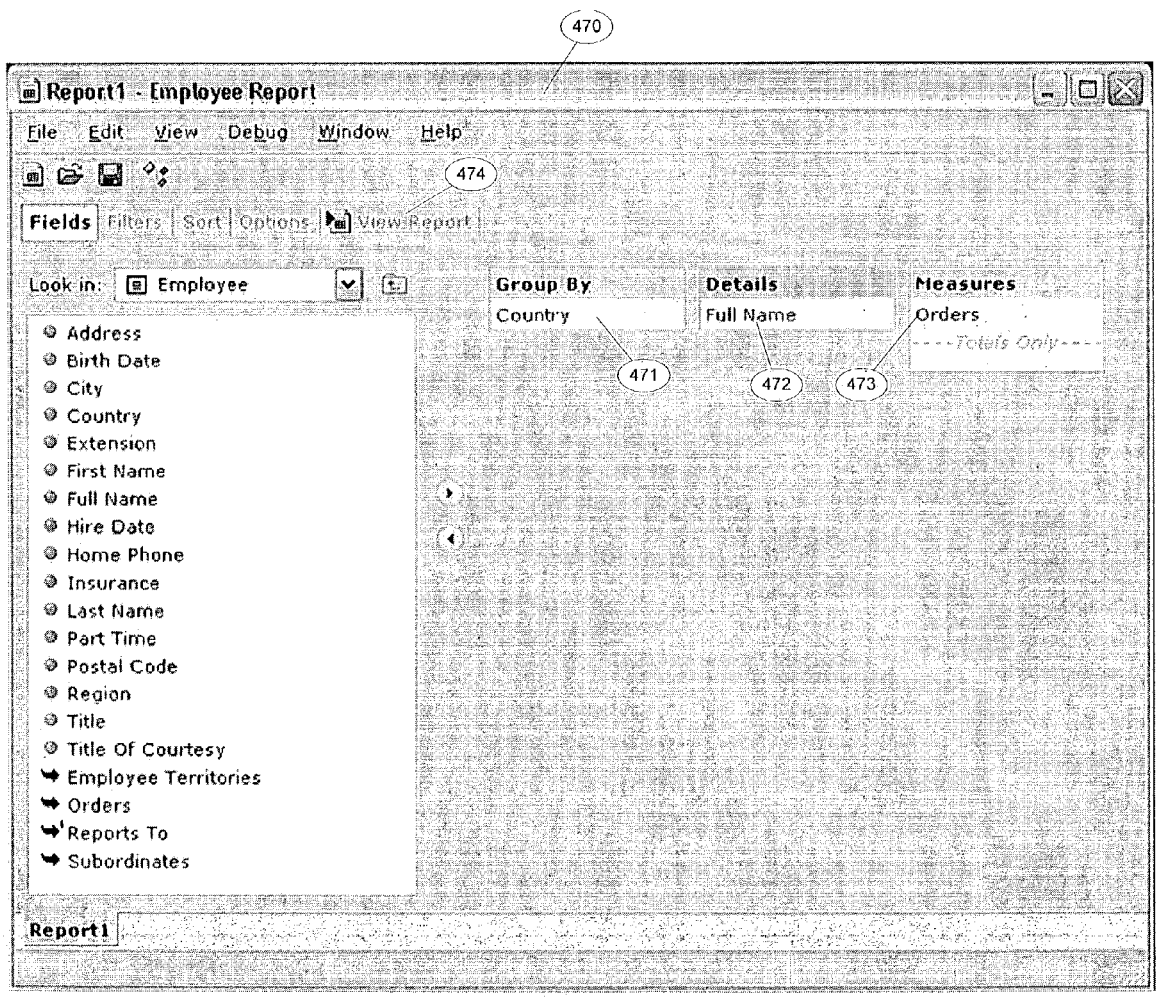
FIG. 15B is a window illustrating iterative development of a drill through report according to an embodiment of the present invention.

FIG. 15A illustrates a Window 460 of DQR Application 100. The Window 460 is based on the Employee View 49 as the initial base view, as shown in a Look In Box 461. A Window 470 shown in FIG. 15B discloses an iterative change in the Window 460, wherein the Country relation of the Employee View 49 has been added to Group By A Drop Area 471, the Full Name field of the Employee View 49 has been added to a Details Drop Box 472 and the Orders aggregation field of the Order View 47 has been added to a Measures Drop Area 473.

Executing the query resulting from selecting a View Report Button 474 shown on the Window 470 results in a Window 480, depicted in FIG. 15C. The report displayed in the Window 480 has three columns, a Country Column 481, a Full Name Column 482 and an Orders Column 483. The Country Column 481 was generated because the Country relation of the Employee View 49 was added to the Group By Drop Area 471. The Full Name Column 482 resulted from adding the Full Name field of the Employee View 49 to the Details Drop Box 472. The Orders Column 483 resulted from placing the Orders aggregation field of the Order View 47 in the Measures Drop Area 473. Because the Orders Column 483 is an aggregation field, each of the numbers represented in the Orders Column 483 represents the count of orders from the Orders Table 34 for each employee in the Employees Table 31. In the present example, each of the numbers in the Orders Column 484 can be left-clicked with a mouse to access a hot spot or link associated with the number. This hot spot capability is traditional in many documents and is available in most web browsers. In the present case, the DQR Application 100 provides such a hot spot or link capability based upon the allowDrill Field Object Property F06 according to the Table 52 of FIG. 3D. In the present case, the allowDrill property of the Orders aggregation field of the Order View 47 is true and accordingly any of the numbers in the Orders Column 483 can be selected or "drilled on" as it is typically described.

Selecting the Hot Spot 484 causes the DQR Application 100 to generate a Window 490, as depicted in FIG. 15D. The Window 490 is a report, as denoted by the highlighting of a View Report Button 491. However, the Window 490 is not a report based upon the Employee View 49. Instead, it is a report based upon the Order View 47. A Tab 492, which includes the text "Order" reveals this fact, as does a Label 499. Columns 493 through 498 also evidence this fact. The fields associated with Columns 494, 495, 496 and 498 are all from the Order View 47. However, a label 500 reveals that the query that generated the Window 490 includes a filter.

Figure 15E:
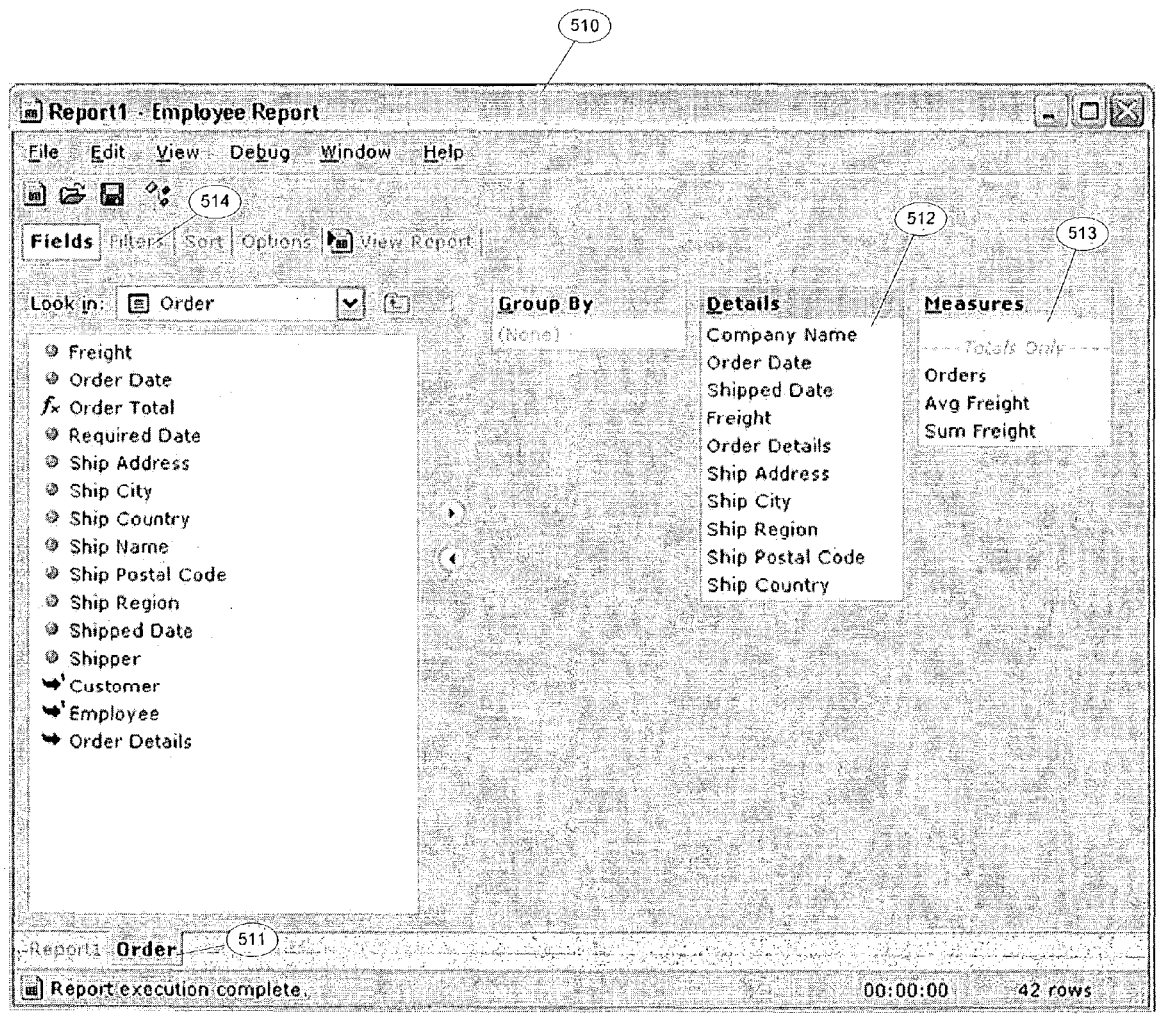
FIG. 15E is a window illustrating field elements of a drill through report according to an embodiment of the present invention.

A Window 510 shown in FIG. 15E results from selecting a Fields Button 501 of the Window 490. The Window 510 is a window associated with the report shown in the Window 490. This association is highlighted by a Tab 511, which continues to display "Orders." The Window 510 illustrates the group fields, detail fields and measures fields in generating the Window 490. Several fields have been added to a Details Drop Area 512. Likewise, several fields have been added to a Measures Drop Area 513.

Figure 15F:
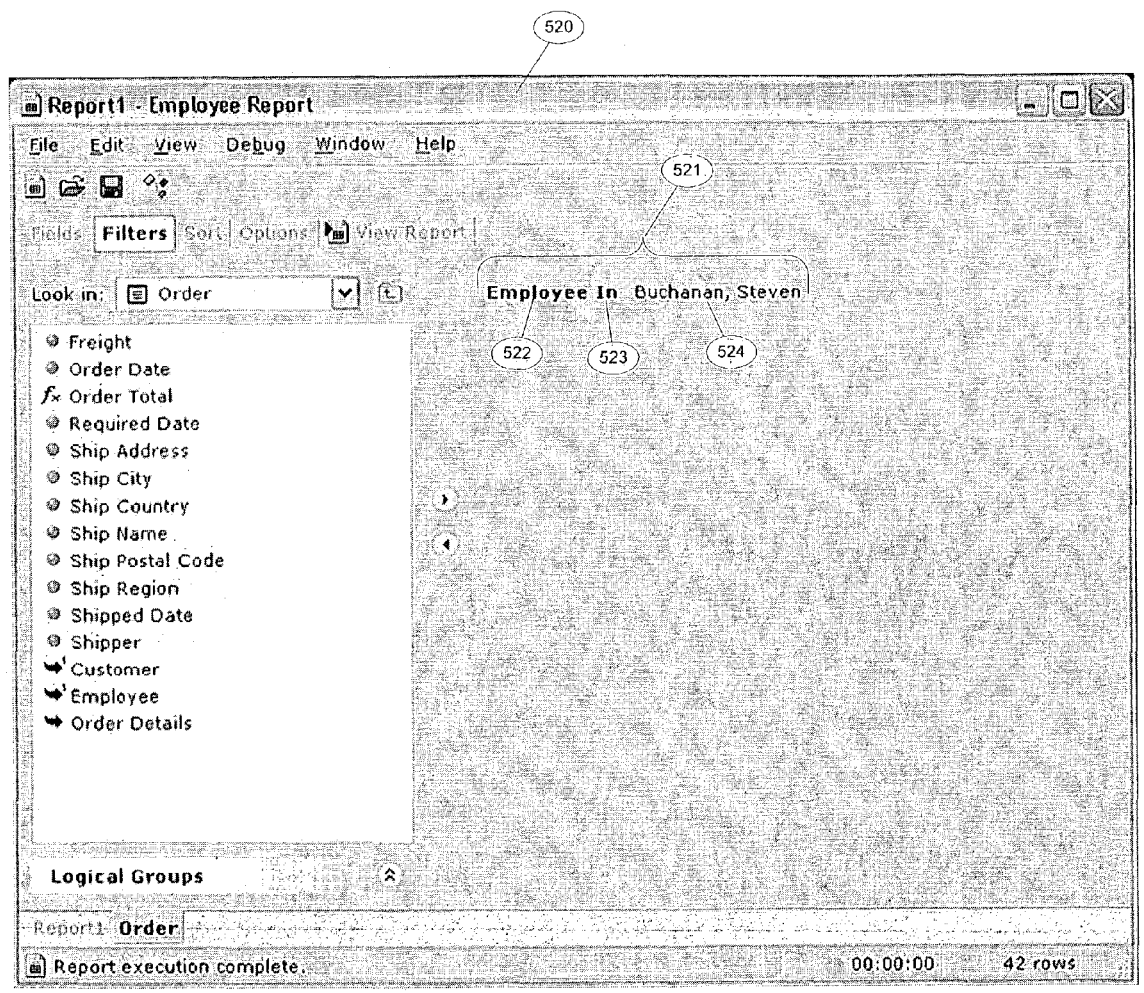
FIG. 15F is a window illustrating filter elements of a drill through report according to an embodiment of the present invention.

The filters associated with the Windows 490 and 510 can be seen by selecting a Filters button 514. Selection of the Filters Button 514 generates a Window 520 as depicted in FIG. 15F. The Window 520 illustrates one filter, a Filter 521. In this embodiment of the invention, the Filter 521 comprises three elements, a Label 522 that includes the word "Employee," a Label 523 that includes the "In" operator, and a Label 524 that includes the name "Buchanan, Steven." The Label 524 refers to the name associated with the Hot Spot or Link 484 of FIG. 15C. Thus, the drill through operation produced a report based upon the Order View 47, but filtered by the parameters of Employee View 49 that were selected prior to selecting the Hot Spot 484. FIGS. 15G and 15H disclose the XML report definition and SQL query that produced the Windows 490, 510 and 520.

FIGS. 16A through 16F depict the windows and processes of a loop back operation according to one embodiment of the present invention. Loop back is the concept of following relations of a database from one view through one or more other views back to the original view. According to the present invention, loop back allows non-technical users to build complex queries by merely following the relations exposed by views defined in the meta data.

Figure 16A:
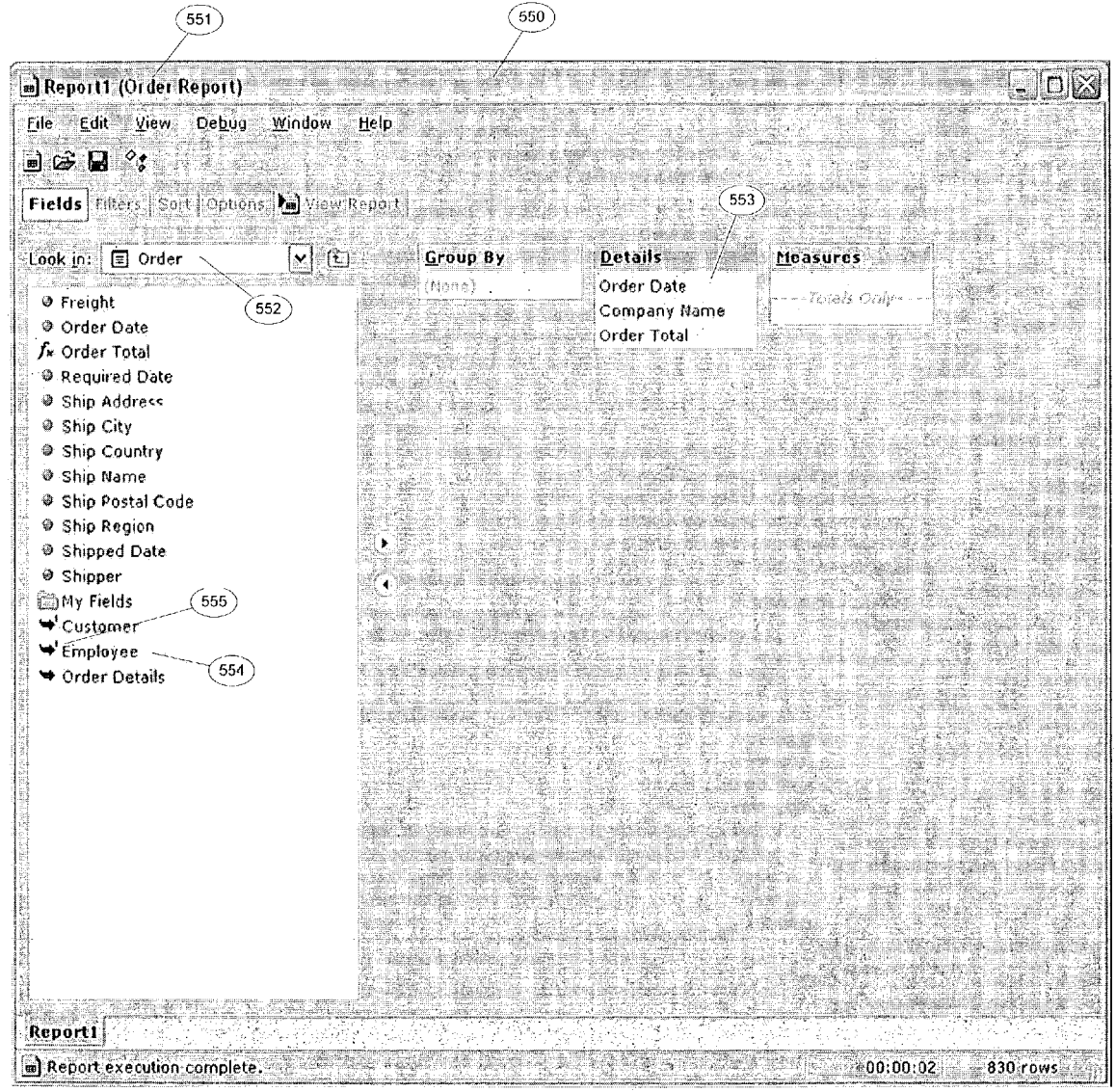
FIG. 16A is a window illustrating iterative development of a loop back report according to an embodiment of the present invention.

FIG. 16A depicts a Window 550 of the DQR Application 100. The Window 550 illustrates the start of a loop back query. The query is based upon the Order View 47, as noted by a Title Bar 551 and a Drop Down Box 552. Two fields from the Order View 47, the Order Date field and the Order Total field, have been dropped on a Details Drop Area 553. One field from the Customer View 40, the Company Name field, has been dropped on the Details Drop Area 553 as well. A relation 554 depicts the Employee Relation 52 of the Order View 47 that will be followed to build a loop back query. With respect to the Employee Relation 52, the Window 550 provides visual feedback through a superscripted "1" noted by a Balloon 555, that the relation is to-one.

Figure 16B:
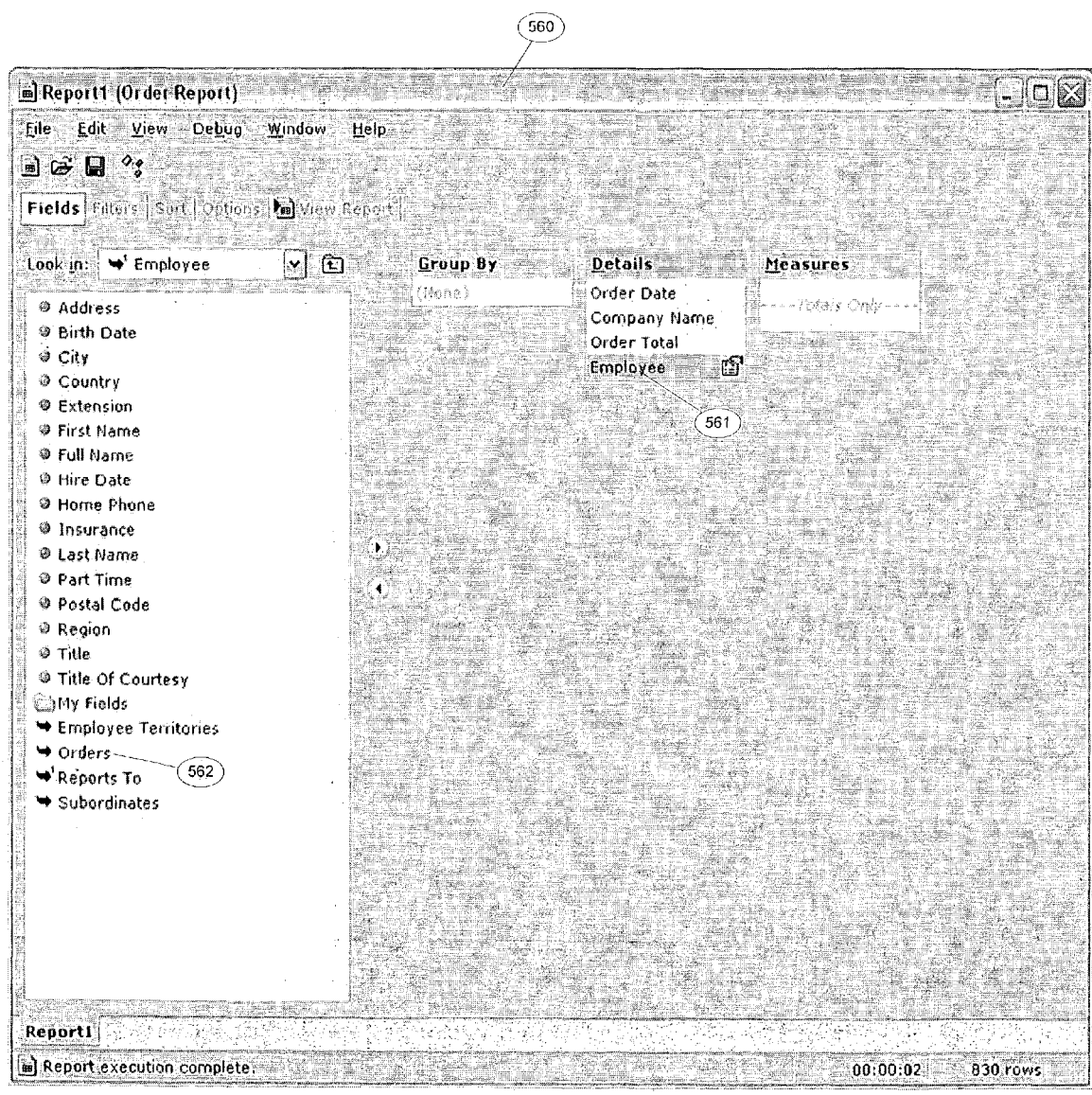
FIG. 16B is a window illustrating iterative development of a loop back report according to an embodiment of the present invention.

FIG. 16B depicts a Window 560 that illustrates the fields and relations associated with following the Relation 554 to the Employee View 49. The Window 560 also illustrates that the Full Name Field 53 has been dropped on a Details Drop Area 561. The Window 560 also displays the Orders Relation 54 of the Employee View 49, which will be followed back to the Order View 47 to create a loop back.

Figure 16C:
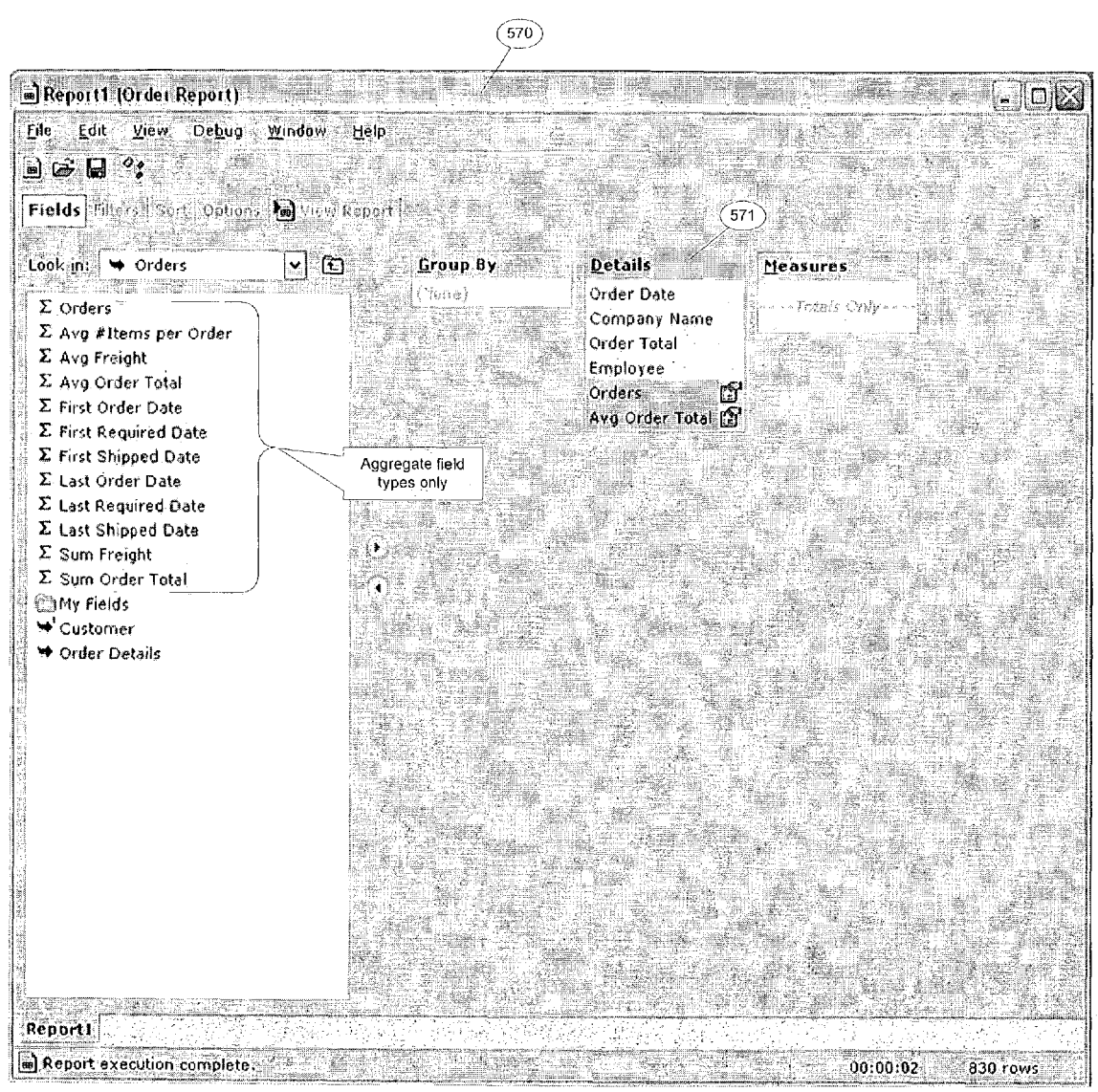
FIG. 16C is a window illustrating iterative development of a loop back report according to an embodiment of the present invention.

FIG. 16C depicts a Window 570 that illustrates the fields and relations associated with following the Relation 562 to the Order View 47. However, the Window 570 illustrates fields of the Aggregate Field Type F07 (see FIG. 3D) only. Thus, the Window 570 illustrates the constraining nature of relationships in the present invention. The loop back query was started with the Order View 47, meaning each row returned represents a single row in the Orders Table 34. The Employee Relation 52 is a many-to-one relationship, meaning that a query incorporating related rows from the Employee View 49 will only return one Employee row for each corresponding row of the Order View 47. Accordingly, all of the source fields of the Employee View 49 could be selected without aggregation. However, because the relationship through the Orders Relation 54 back to the Order View 47 is one-to-many, only aggregate fields are available. The Window 570 also illustrates that the Orders and Avg Order Total aggregate fields were added to a Details Drop Area 571.

FIG. 16D shows a Window that results from selecting a View Report Button 581 and illustrates a report based upon the loop back query constructed using the DQR Application 100, as discussed with reference to FIGS. 16A, 16B and 16C. A Balloon 582 illustrates that the number of records returned by the loop back query is 830. This is the exact number of rows contained in the Orders Table 34. The Window 580 also illustrates a multicolumn table containing the data resulting from the loop back query. Columns 583 and 585 show data from the Order Date and Order Total fields selected according to FIG. 16A from the initial or base view, the Order View 47. Column 584 includes data from the Company Name field of the Customer View 40. Column 586 includes data from Full Name field of the Employee View 49. Columns 587 and 588 include data from Orders and Avg Order Total aggregate fields, respectively, of the Order View 47 according to selecting the Orders Relation 54 of the Employee View 49, as depicted in FIG. 16C. FIGS. 16E and 16F show the XML report definition and SQL query generated by the DQR Application 100 in building the loop back query. The loop back query presented herein illustrates how a user may construct a complex query in a simple manner.

FIG. 17 displays a flowchart depicting the steps of the method of providing security for a report. In Step 600, security principals are defined. Security principals include users or groups of users. In Step 601, access control entries are made to a file or other access control list maintenance system or facility. The access control entries define elements of data in a data store to be protected and whether security principals are to be given or denied access to the data elements. Data elements may be course grained, meaning that access control can be implemented on data elements that contain or include other data elements, such as databases and views.

In Step 602, security filters are specified for views that require protection according to organizational needs. In Step 604, if a security filter is defined on a view, at least one row pertaining to the view is included in the security filter and is enabled for access. In Step 605, each data element to be protected in a view is included in an access control entry and security principals to be denied or granted access to the data element are included in the access control entry. In Step 603, security is enforced on a report.

In Step 606, a security principal desiring to create or execute a report is authenticated. This authentication will typically be accomplished through user authentication means characteristic of computer systems. In Step 607, assuming that a security principal has been authenticated and attempts to create or run a report, the security filter, as described in the Step 602, will be applied to the report by comparing the authenticated security principal with the access control entry contained in the security filter for each data element. If the authenticated security principal does not match an access control entry contained in the security filter, the authenticated security principal will be given access the corresponding data.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention as defined by the following claims.

It will be obvious to those of skill in the art that the invention described in this specification and depicted in the FIGURES may be modified to produce different embodiments of the present invention. Thus, the present invention has several advantages over the prior art without sacrificing any of the advantages of the prior art. Although two embodiments of the invention have been illustrated and described, various modifications and changes may be made by those skilled in the art without departing from the spirit and scope of the invention.

What is claimed is:

1. A method for building a report, comprising the steps of:
defining a relational abstraction of a data store, the defined relational abstraction including a plurality of views, fields associated with the plurality of views, and relations between the plurality of views;
selecting one of the plurality of views as a base view of a report; and
creating at least one report field using the views, fields and relations associated with the base view, wherein the at least one report field is created by:
a) specifying a relation path from the base view to a predetermined destination view, the relation path including one or more relations;
b) if the specified relation path contains any to-many relations, creating an aggregate field by:
i) creating at least one nested field to be aggregated, where a relation path of the created at least one nested field begins at a destination view of the created aggregate field; and
ii) specifying an expression for aggregating values associated with the created at least one nested field; and
c) if the specified relation path does not contain any to-many relations, creating a scalar field, by:
i) referencing a source field from the destination view; or
ii) creating an expression field that includes at least one nested field, where a relation path of the at least one nested field begins at a destination view of the created expression field.

2. The method of claim 1 wherein information returned in a report is limited by specifying a filter that limits any rows returned in the report.

3. The method of claim 2 wherein a filter is specified that limits any rows returned in the report by:
a) creating a plurality of fields for use as filter fields; and
b) specifying at least one logical filter operator and at least one corresponding filter value on each filter field.

4. The method of claim 3 wherein filter fields are organized into nested filter groups, filters are specified for each of the nested filter groups and an output of applying the filters of the nested filter groups are used to combine results of the report.

5. The method of claim 2 wherein results of the report are sorted by at least one field.

6. The method of claim 2 wherein results of the report are grouped by at least one field.

7. The method of claim 1 wherein information returned in a report containing the created at least one aggregate field is limited by specifying a filter on the destination view associated with the created at least one aggregate field.

8. The method of claim 1 wherein a filter is specified that limits any rows returned in the report by:
a) creating a plurality of fields for use as filter fields; and
b) specifying at least one logical filter operator and at least one corresponding filter value on each filter field.

9. The method of claim 8 wherein filter fields are organized into nested filter groups, filters are specified for each of the nested filter groups and an output of applying the filters of the nested filter groups are used to combine results of the report.

10. The method of claim 1 wherein results of the report are sorted by at least one field.

11. The method of claim 1 wherein results of the report are grouped by at least one field.

12. The method of claim 1 wherein a total aggregate field is created that provides a total of the created aggregate field based upon relations contained in the relation path for the created aggregate field.

13. The method of claim 1 wherein an SQL query that includes report fields is generated, by:
a) generating an initial SELECT statement with a FROM clause that references the base view of the report;
b) adding each report field having an empty relation path to a first subsequent SELECT statement; and c) adding each report field having a non-empty relation path to a second subsequent SELECT statement, by:
   i) adding a JOIN clause from the base view of the report to an initial nested SELECT statement and a FROM clause referencing a destination view associated with a first relation in the non-empty relation path; and
   ii) adding a subsequent nested SELECT statement inside the initial nested SELECT statement for each successive relation in the non-empty relation path.

14. The method of claim 13 wherein a report filter is added to the SQL query by adding a WHERE clause to an outer SELECT statement.

15. The method of claim 13 wherein a filter specified on a to-many relationship in a relation path of an aggregate field is added to the SQL query by adding a WHERE clause to a corresponding nested SELECT statement.

16. The method of claim 13 wherein the SQL query is optimized by consolidating nested SELECT statements associated with report fields where relation paths are equal to or are a prefix of each other.

17. The method of claim 1 wherein a reusable field definition is created that includes any filters specified on to-many relationships in a relation path associated with a field.

18. The method of claim 1 wherein a reusable filter definition is created that includes filter groups and fields associated with the report and operators and values that correspond to the filter groups and fields.

19. The method of claim 1 further comprising the steps of:
a) defining a security principal;
b) creating an access control entry for at least one element of information in the data store, which access control entry grants or denies access to the security principal;
c) defining a security filter on a view, by:
   i) creating a filter that identifies at least one row in the view; and
   ii) creating an access control entry denying the security principal access to any information to be excluded by the filter; and
d) enforcing the access controls on a report, by:
   i) authenticating the security principal; and
   ii) applying the security filter to the report.

20. The method of claim 1 further comprising the steps of:
a) creating a reusable list of keys or row identifiers by specifying a filter on a view and selecting at least one of resulting keys or rows; and
b) using the list as a set of filter values in conjunction with an IN or NOT IN filter operator.

21. The method of claim 1 wherein the report field includes two or more non-consecutive references to a particular view.

22. A computer-readable storage medium storing instructions executable by a processor to perform a method according to claim 2.

* * * * *